(12) United States Patent
Tagami

(10) Patent No.: US 11,657,834 B2
(45) Date of Patent: May 23, 2023

(54) MAGNETIC DISK DEVICE AND METHOD OF WRITE PROCESSING OF POSTCODE

(71) Applicants: Kabushiki Kaisha Toshiba, Tokyo (JP); Toshiba Electronic Devices & Storage Corporation, Tokyo (JP)

(72) Inventor: Noaki Tagami, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/468,413

(22) Filed: Sep. 7, 2021

(65) Prior Publication Data

US 2022/0301584 A1  Sep. 22, 2022

(30) Foreign Application Priority Data

Mar. 19, 2021  (JP) .............................. JP2021-045855

(51) Int. Cl.
  *G11B 5/596*  (2006.01)
  *G11B 5/012*  (2006.01)
  *G11B 21/10*  (2006.01)

(52) U.S. Cl.
  CPC .......... *G11B 5/012* (2013.01); *G11B 5/59638* (2013.01); *G11B 21/106* (2013.01)

(58) Field of Classification Search
  CPC .............. G11B 5/5543; G11B 20/1217; G11B 2020/1238; G11B 2020/1281; G11B 20/10; G11B 5/59633; G11B 20/14; G11B 20/16
  USPC ....................................................... 360/75, 48
  See application file for complete search history.

(56) References Cited

U.S. PATENT DOCUMENTS

| | | | | |
|---|---|---|---|---|
| 7,564,637 | B2* | 7/2009 | Kudo ................. | G11B 5/59633 360/48 |
| 8,625,219 | B2 | 1/2014 | Nonaka et al. | |
| 9,070,411 | B1 | 6/2015 | Ellis et al. | |
| 9,384,768 | B1 | 7/2016 | Asakura | |
| 10,438,620 | B1* | 10/2019 | Ellis .................... | G11B 5/59688 |
| 11,087,796 | B2* | 8/2021 | Tagami ............ | G11B 20/10268 |
| 11,152,025 | B2* | 10/2021 | Tsuruoka ........... | G11B 20/1217 |
| 2021/0056989 | A1 | 2/2021 | Tsuruoka et al. | |

* cited by examiner

*Primary Examiner* — Nabil Z Hindi
(74) *Attorney, Agent, or Firm* — Allen & Overy LLP

(57) ABSTRACT

According to one embodiment, a magnetic disk device includes a disk including a first region with a first format efficiency and a second region with a second format efficiency lower than the first format efficiency, a head that writes data to the disk and reads data from the disk, and a controller that selects a first postcode to be written to the first region from a plurality of postcodes with different lengths and writes the first postcode to the first region, and selects a second postcode to be written to the second region from a plurality of postcodes with different lengths and writes the second postcode to the second region.

19 Claims, 31 Drawing Sheets

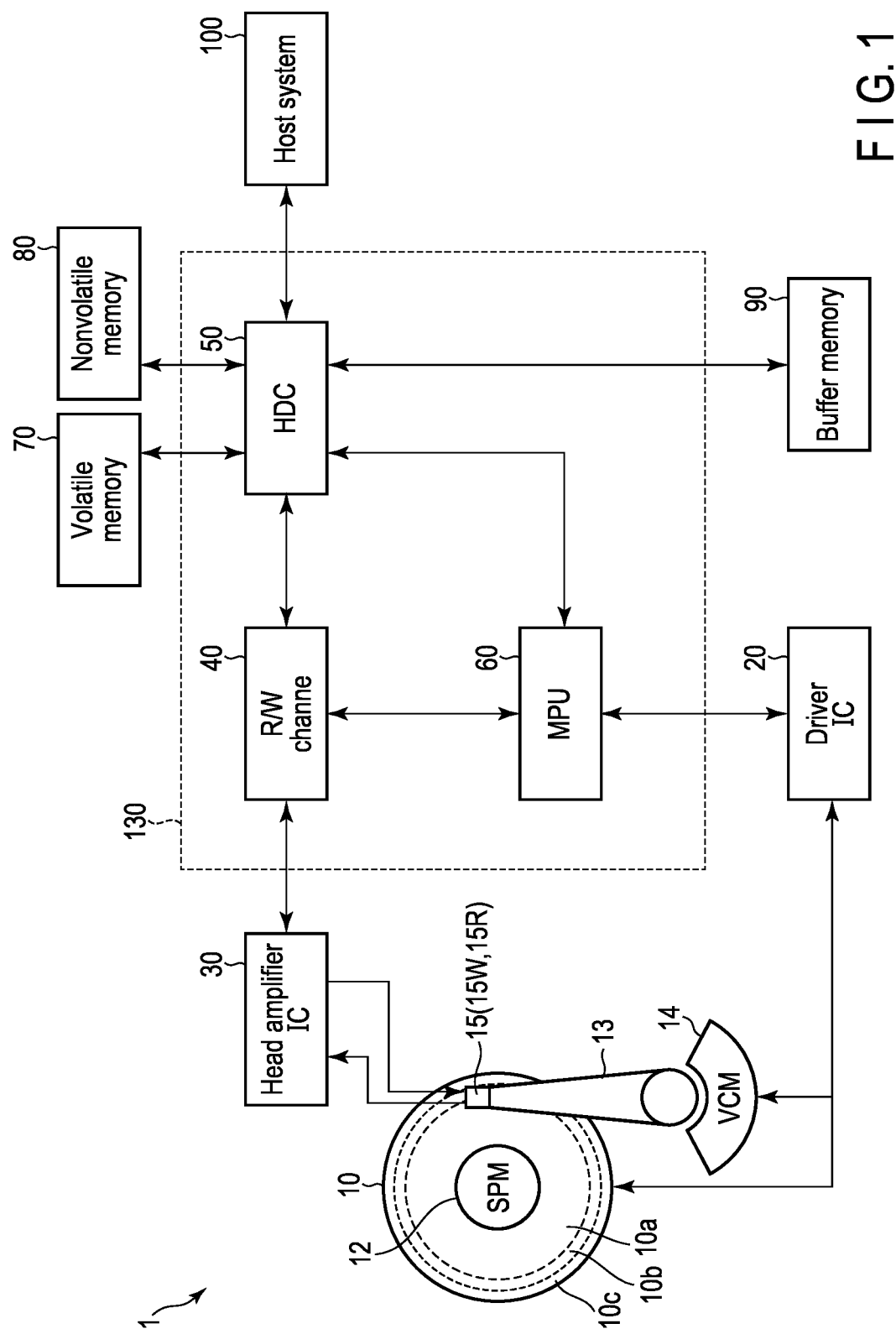
F I G. 1

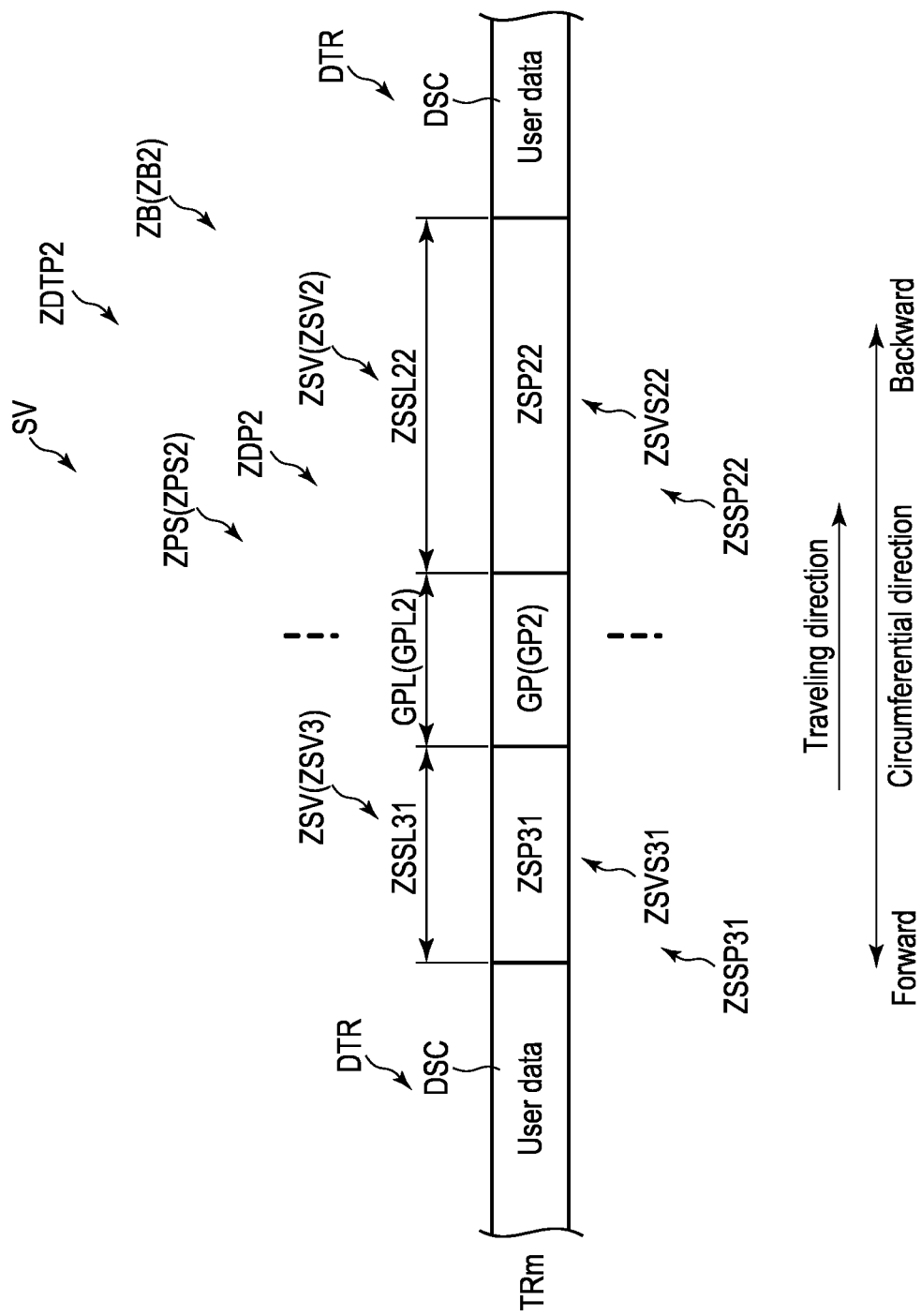
F I G. 4

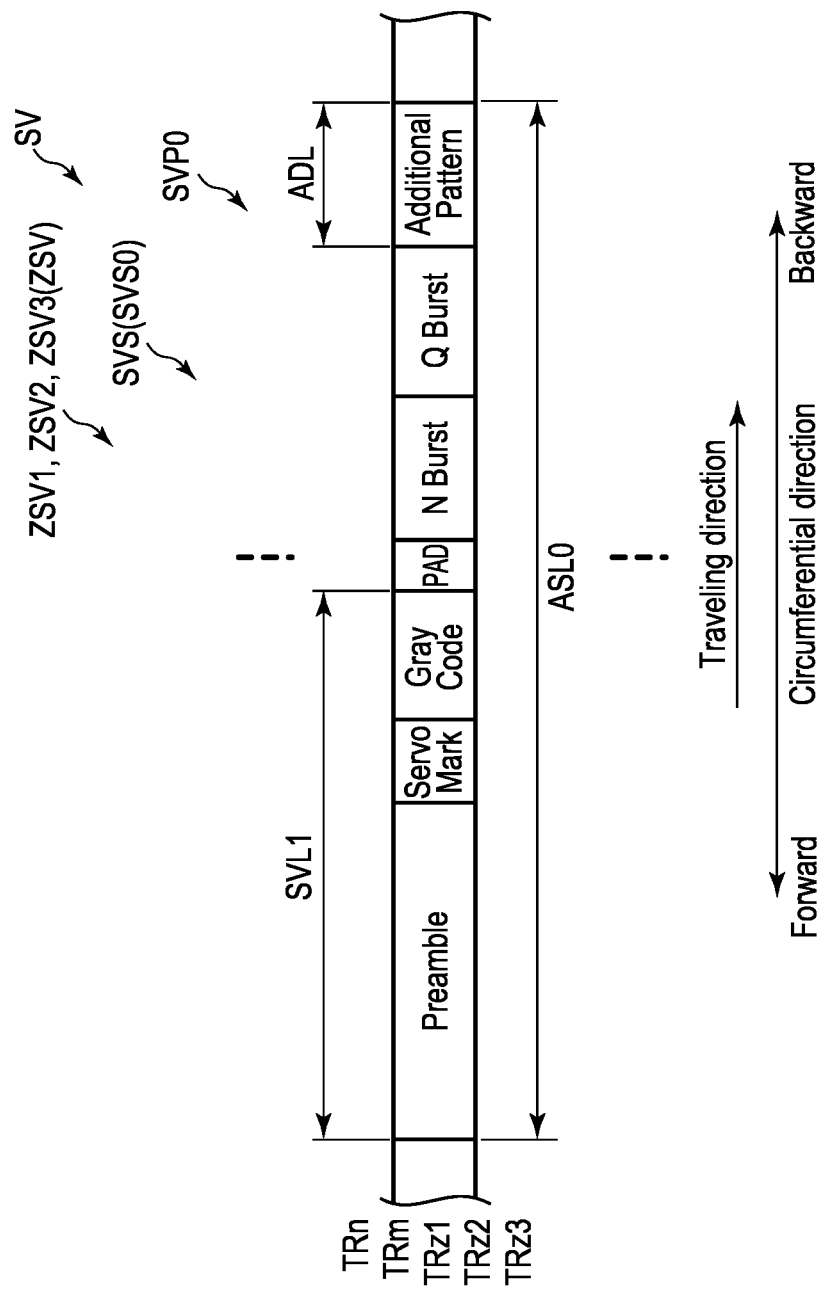
F I G. 5

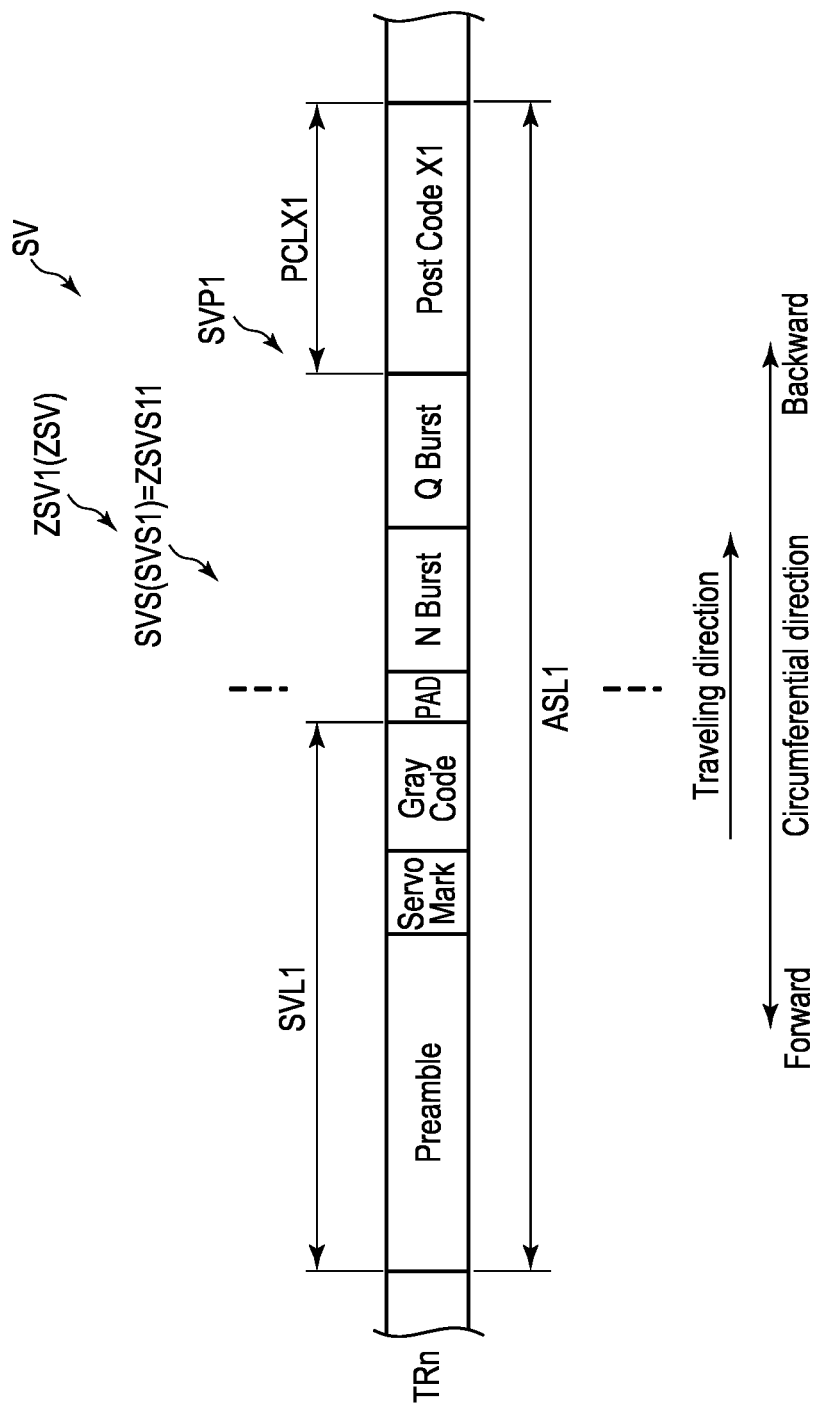
F I G. 6

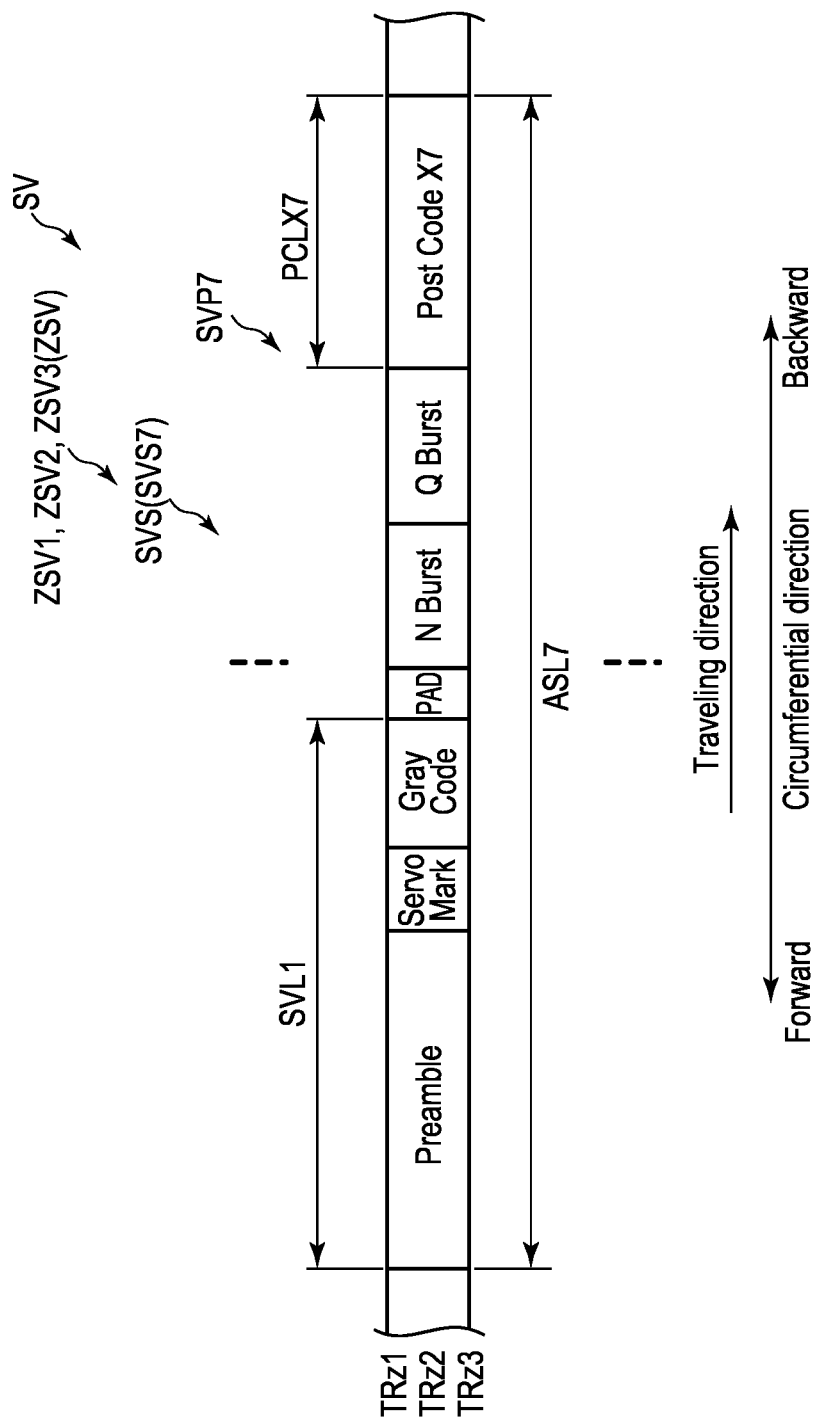
F I G. 12

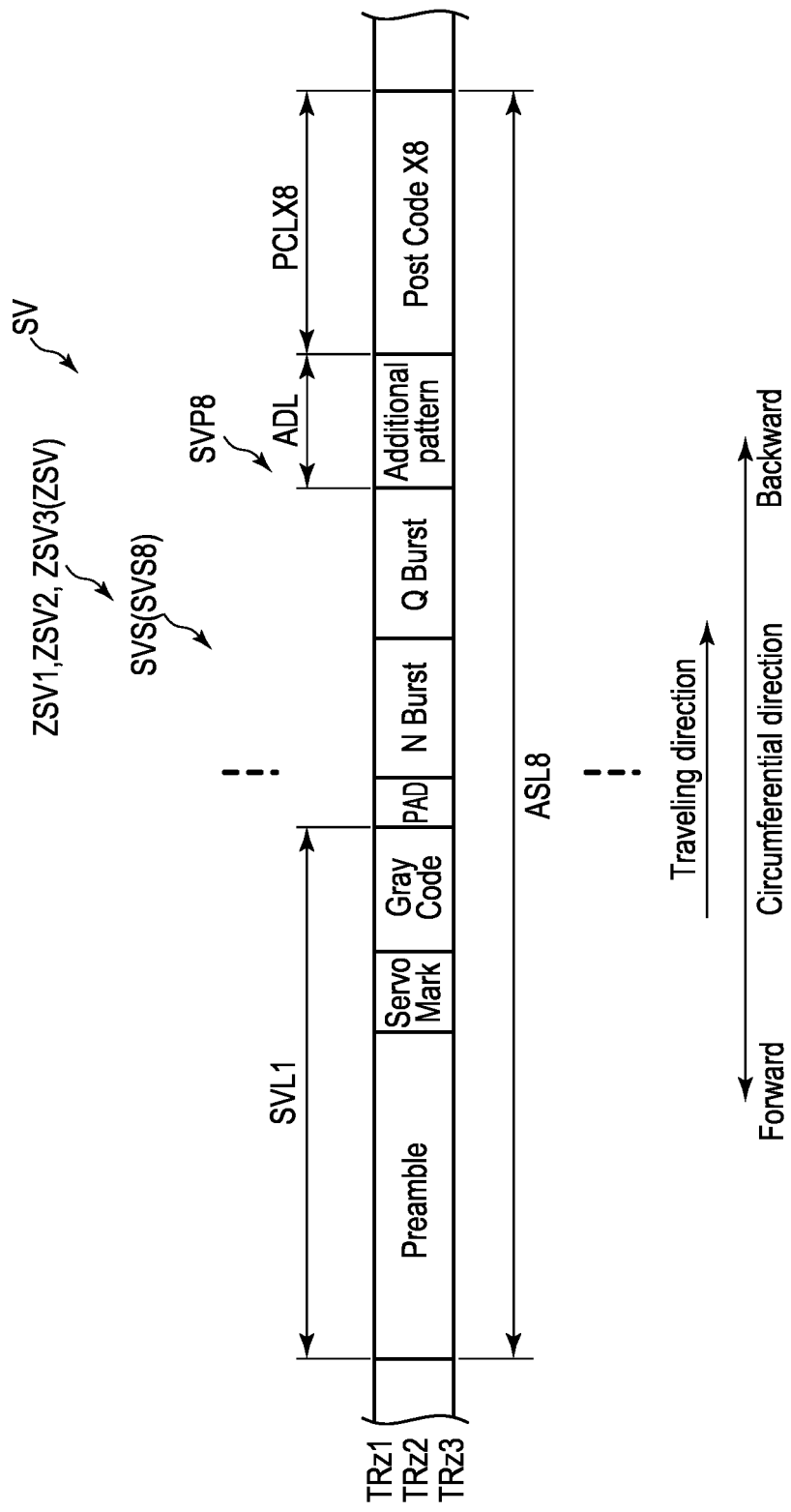
F I G. 13

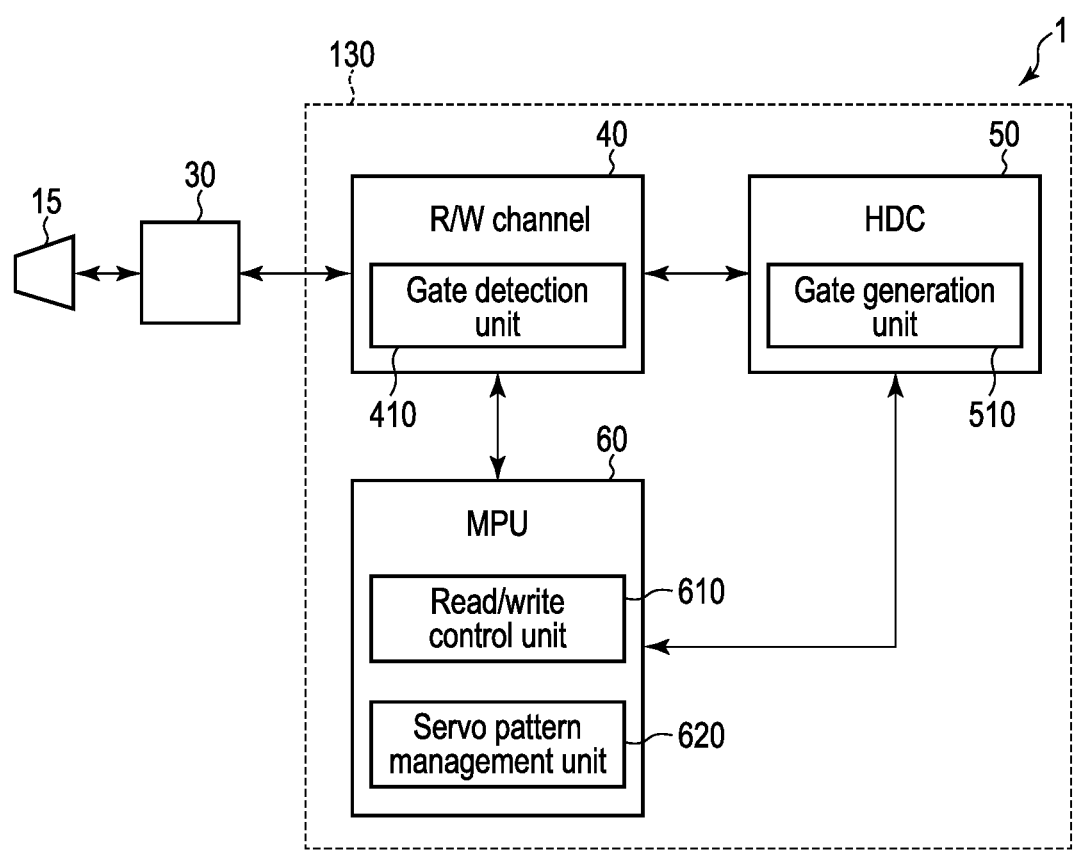
F I G. 14

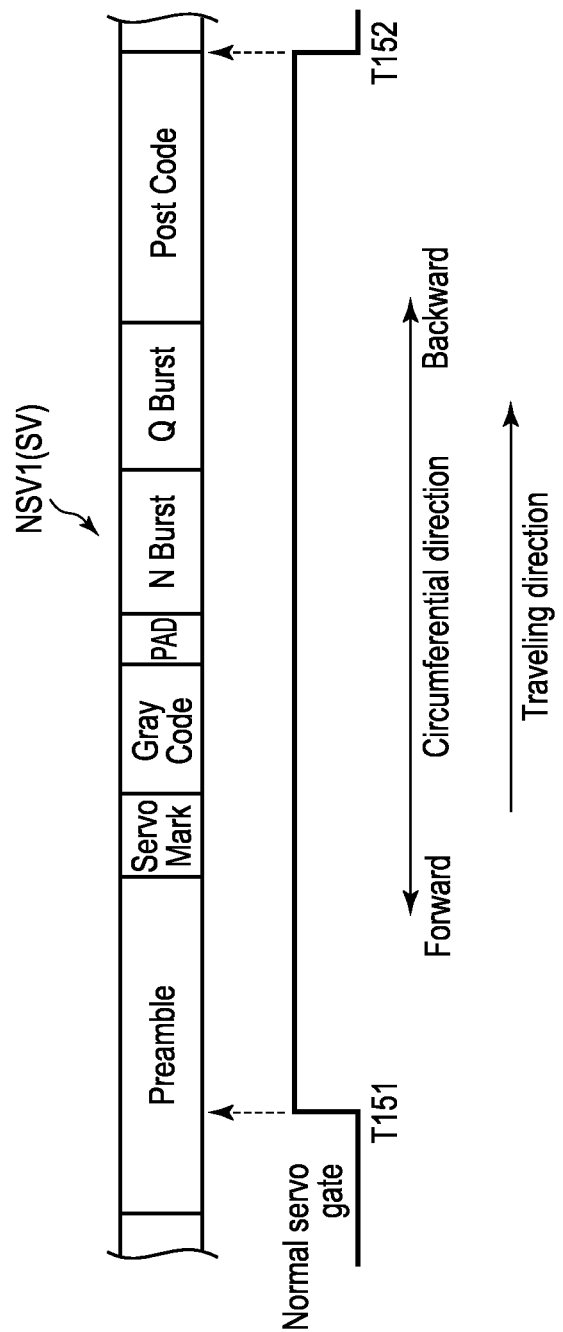
F I G. 15

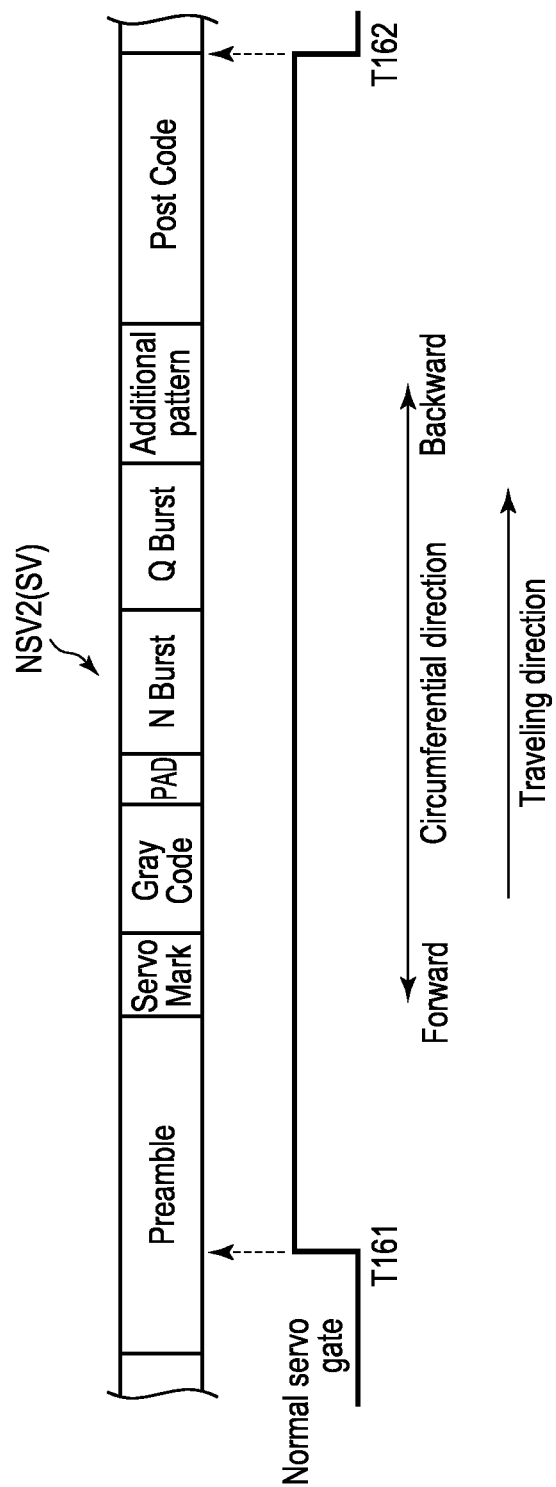
F I G. 16

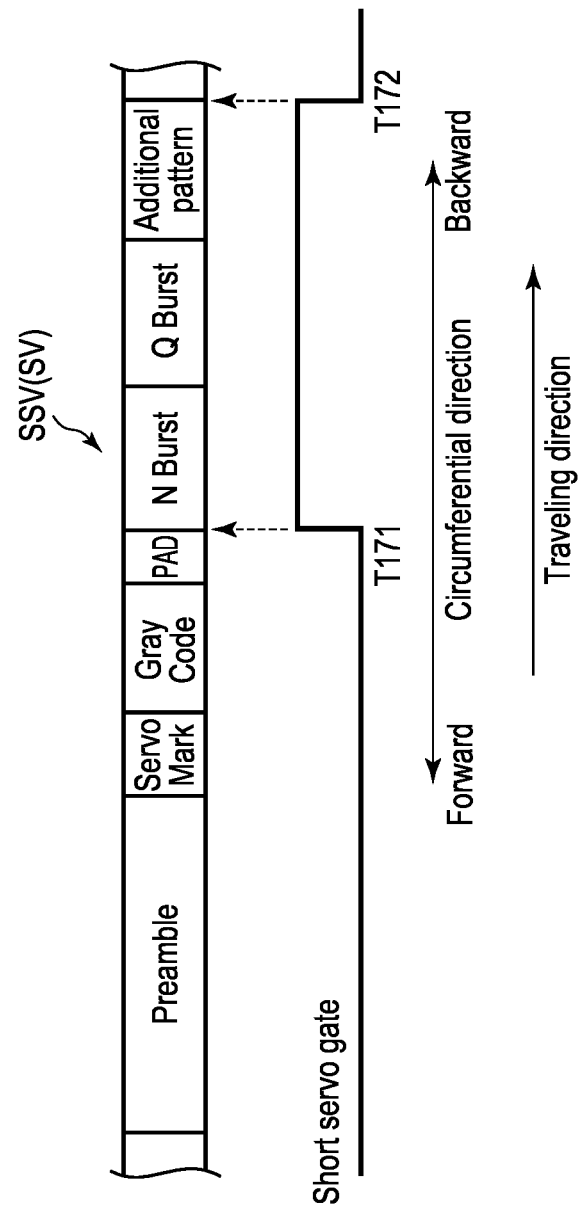
F I G. 17

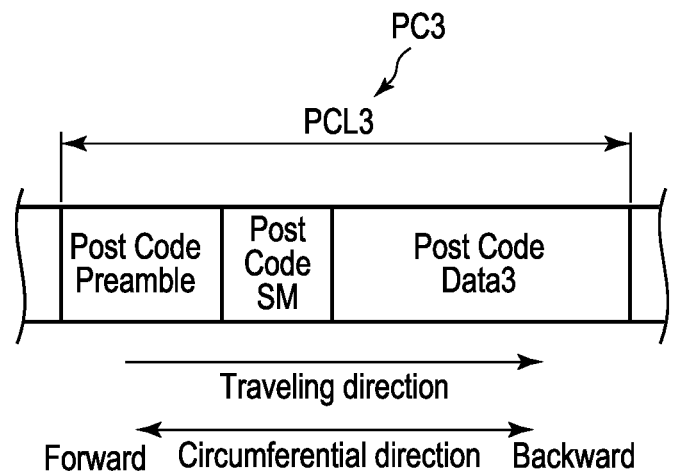
F I G. 22A
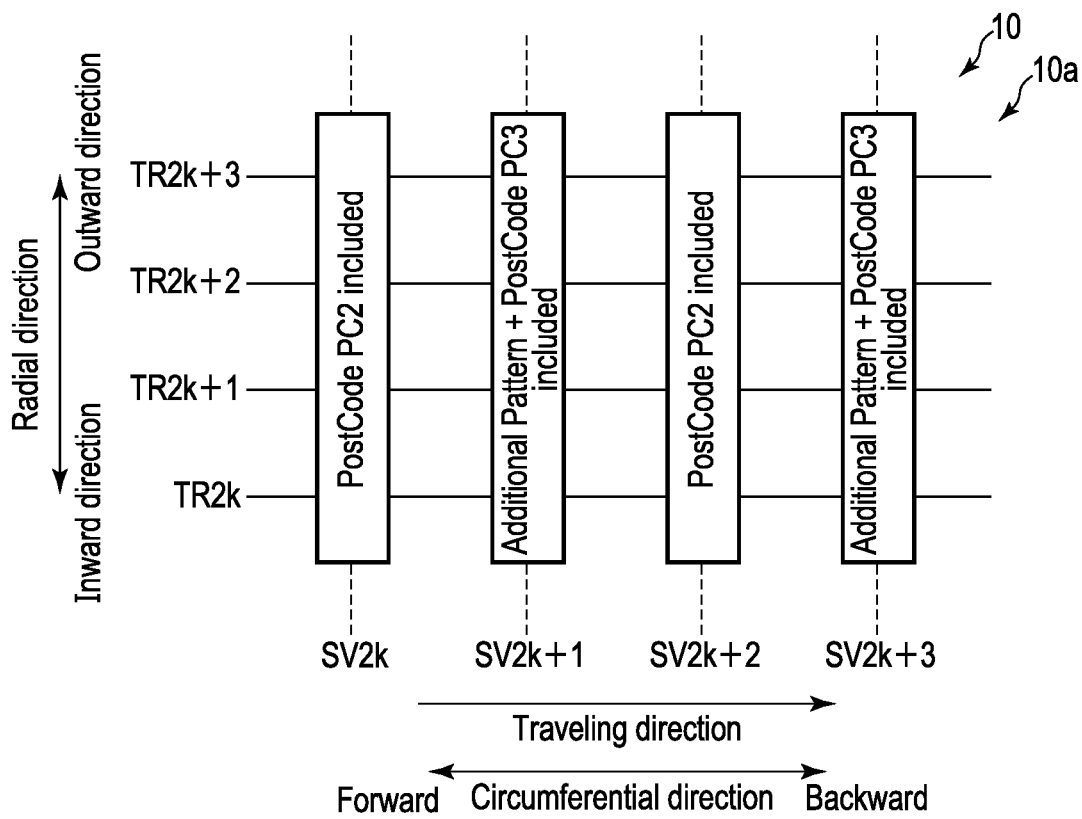
F I G. 22B

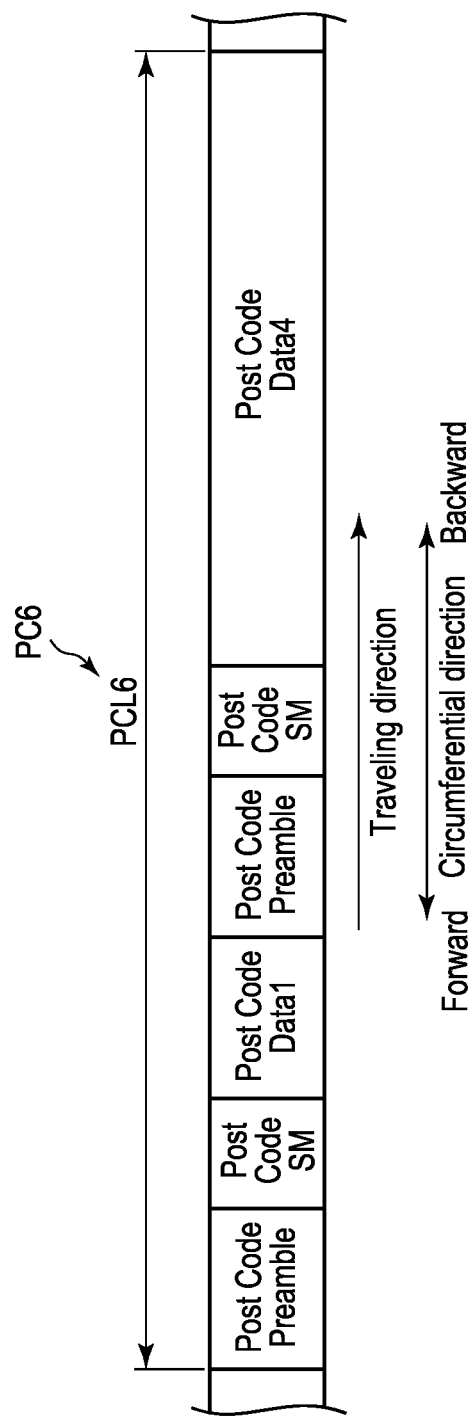
F I G. 25A

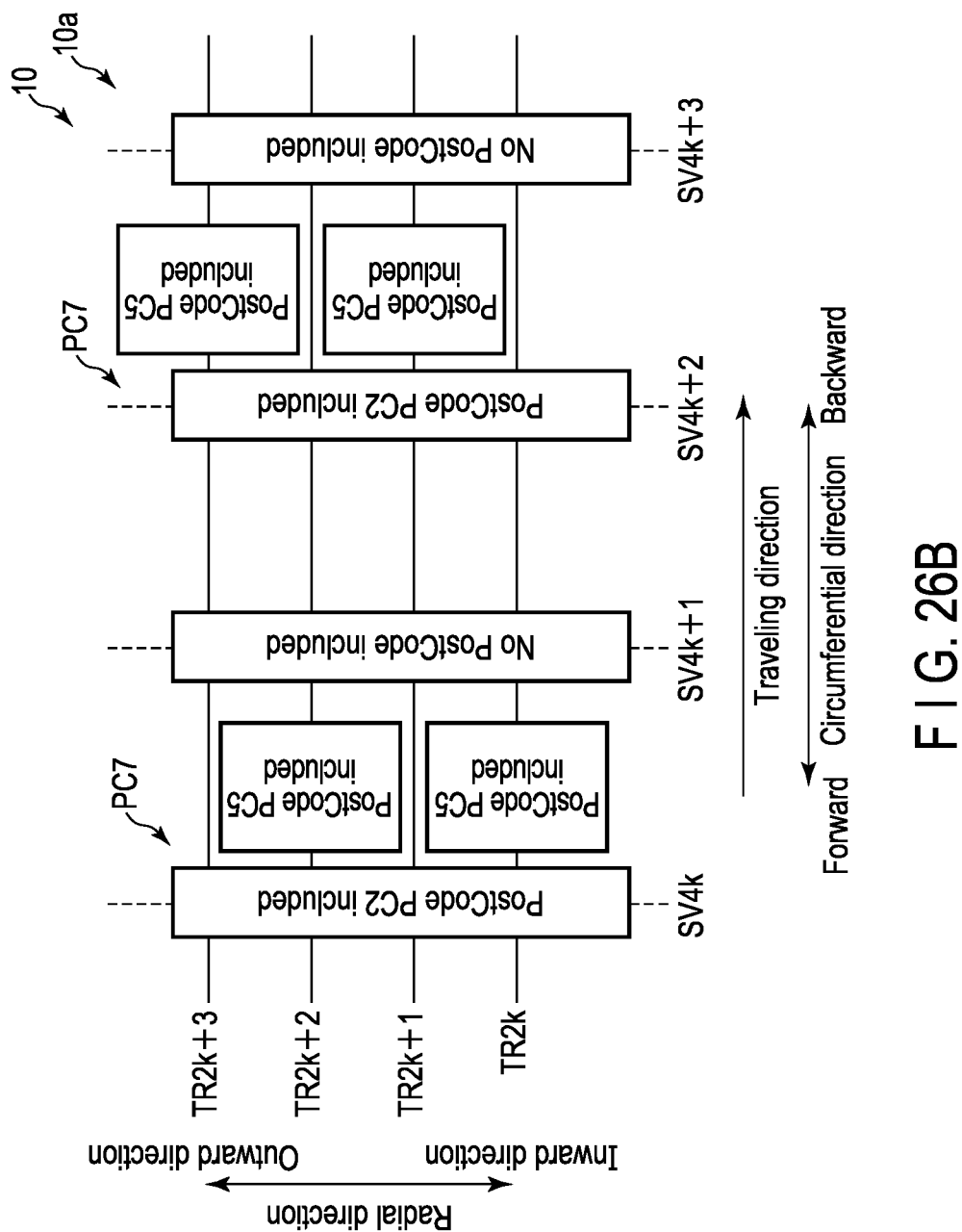
F I G. 26B

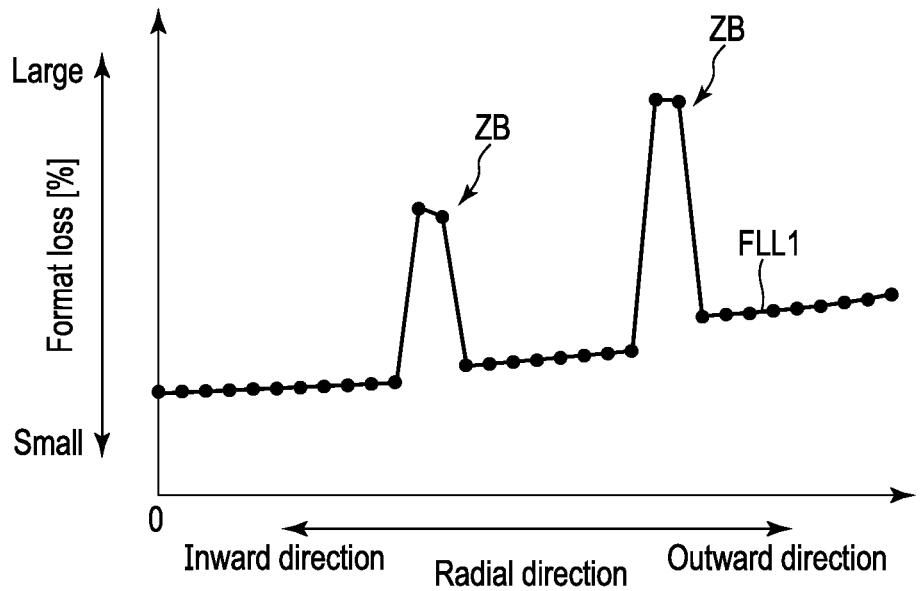
F I G. 27
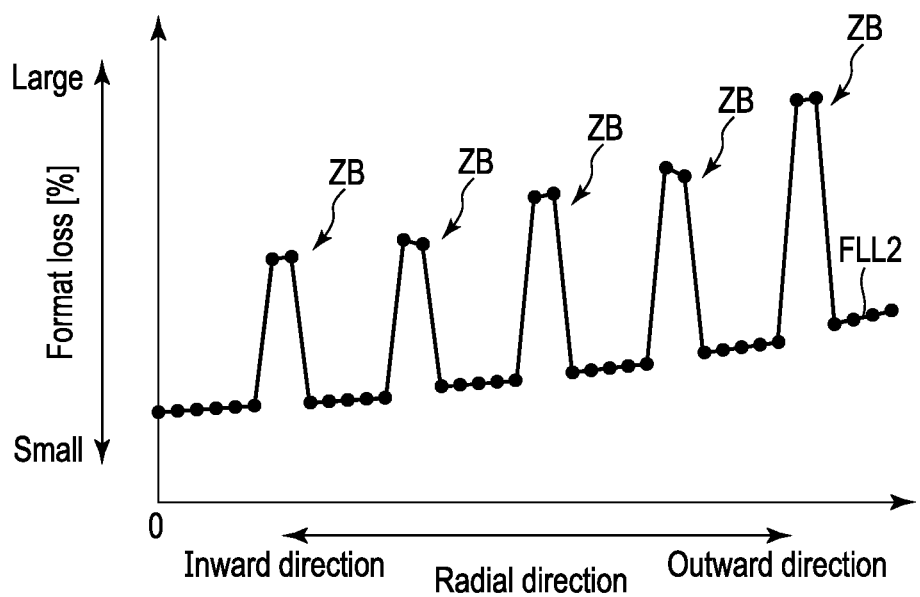
F I G. 28

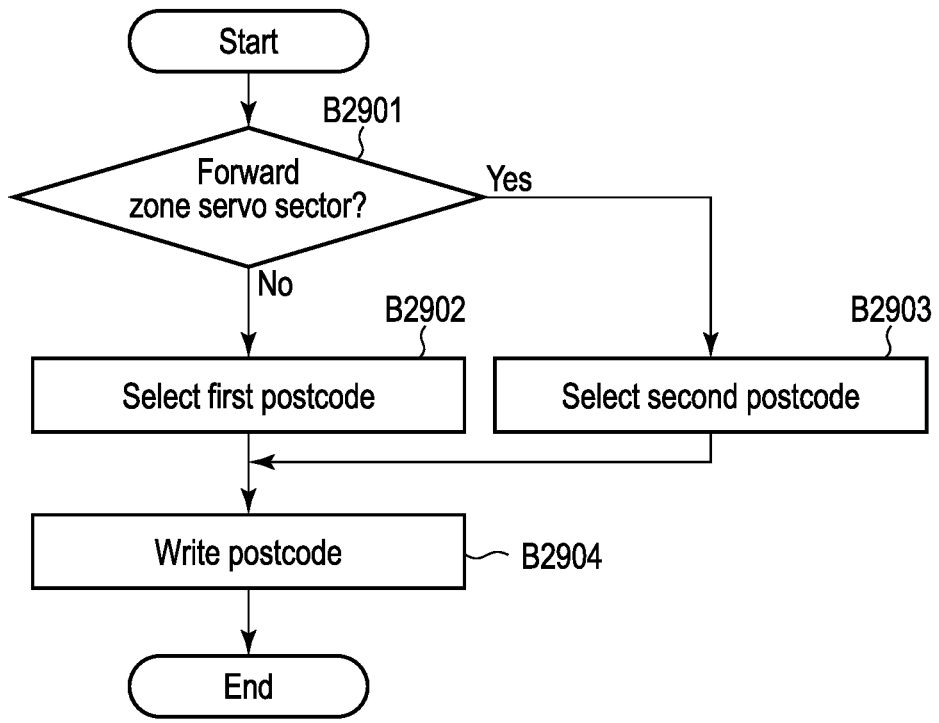
F I G. 29
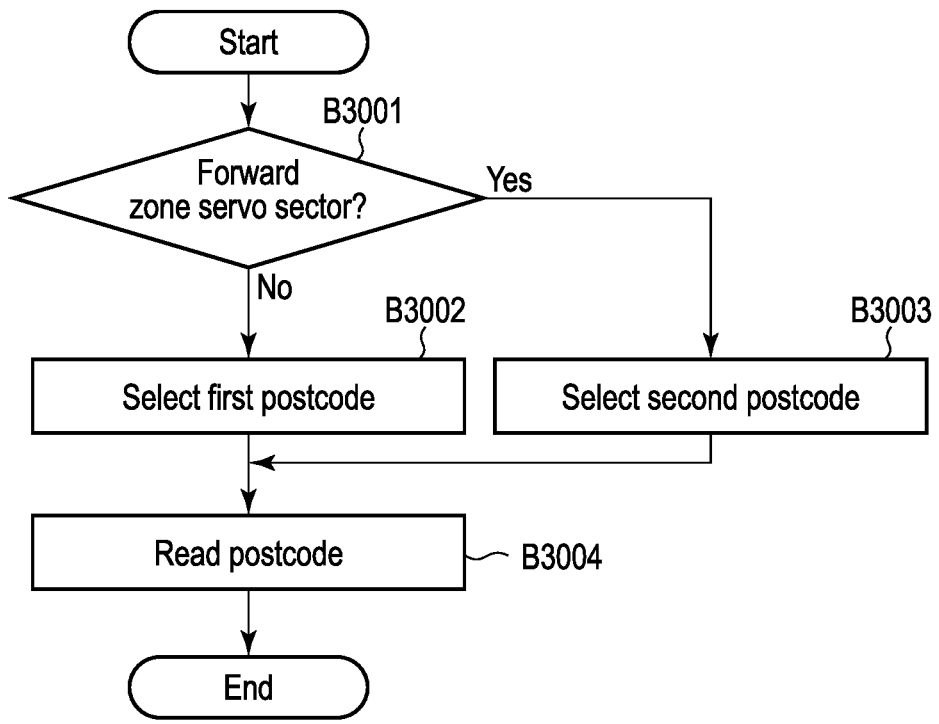
F I G. 30

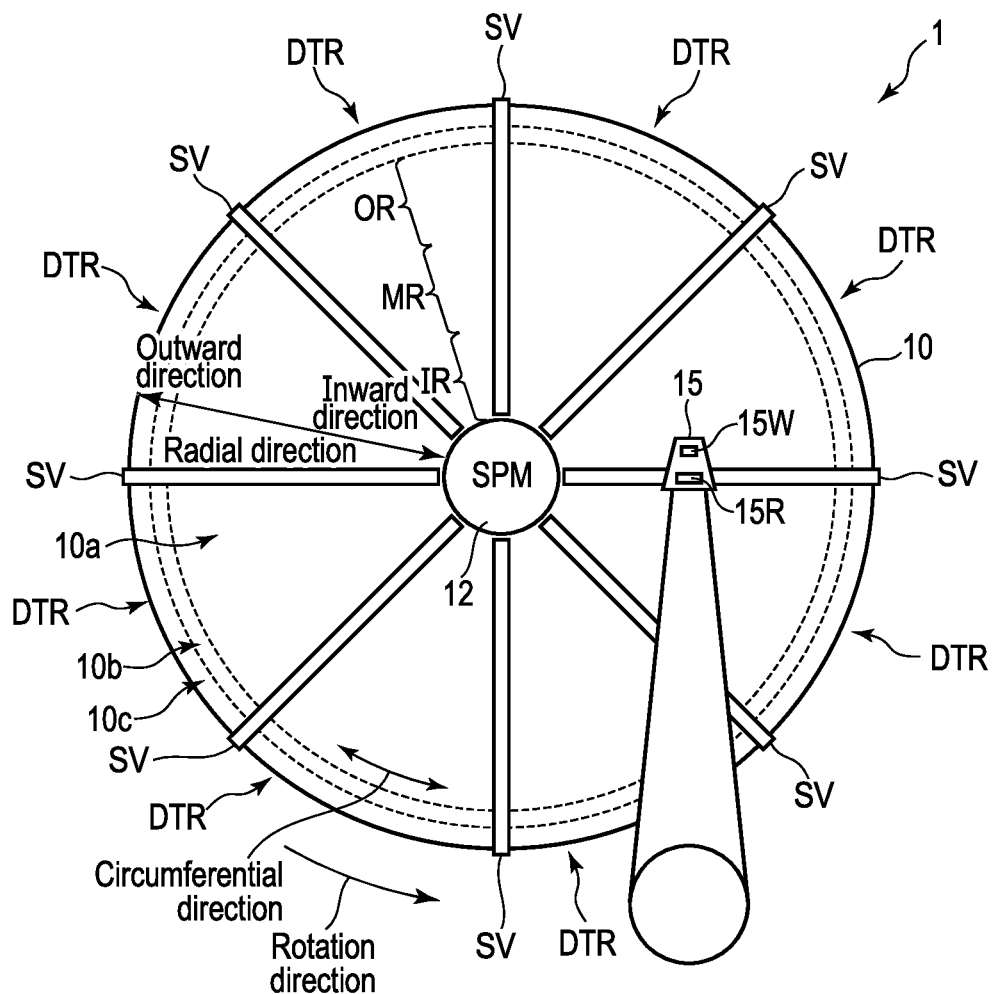
F I G. 31

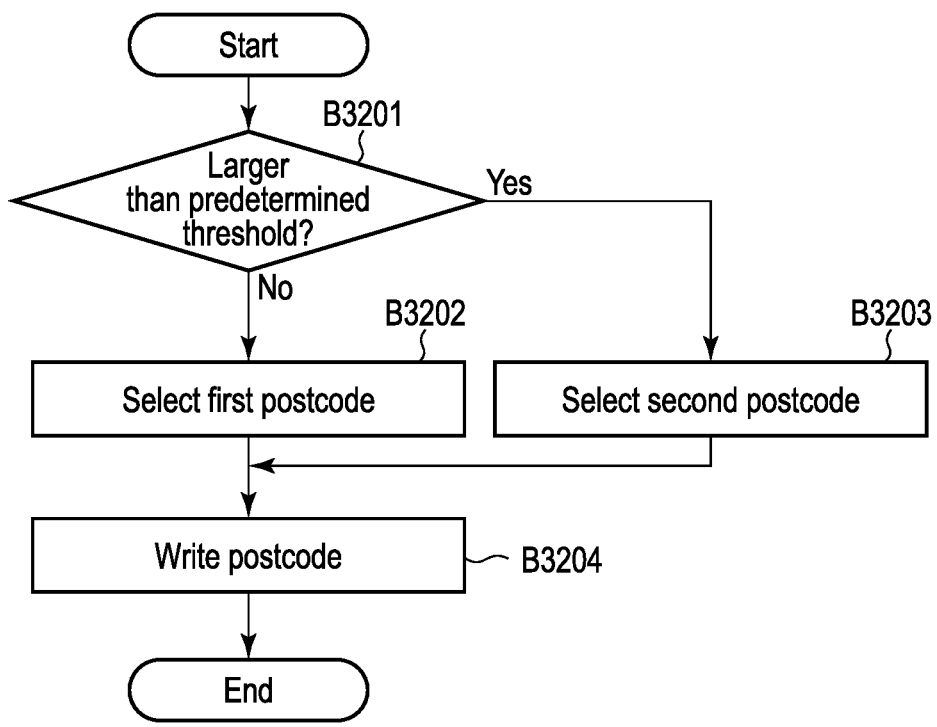
F I G. 32
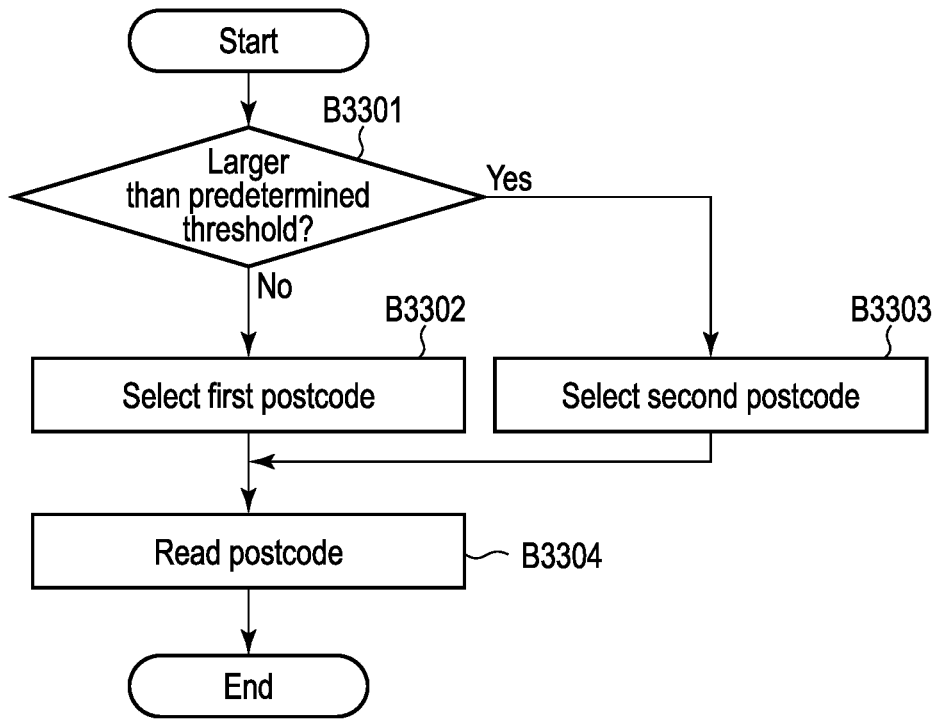
F I G. 33

MAGNETIC DISK DEVICE AND METHOD OF WRITE PROCESSING OF POSTCODE

CROSS-REFERENCE TO RELATED APPLICATIONS

This application is based upon and claims the benefit of priority from Japanese Patent Application No. 2021-045855, filed Mar. 19, 2021, the entire contents of which are incorporated herein by reference.

FIELD

Embodiments described herein relate generally to a magnetic disk device and a method of write processing of a postcode.

BACKGROUND

There are a magnetic disk device of a conventional magnetic recording (Conventional Magnetic Recording (CMR)) mode in which writing is performed on a plurality of tracks at an interval in a radial direction of the disk, a magnetic disk device of a shingled recording (Shingled write Magnetic Recording: SMR, or Shingled Write Recording: SWR) mode in which overwriting is performed on a plurality of tracks in the radial direction of the disk, and a hybrid recording mode magnetic disk in which the conventional recording mode and the shingled recording mode are selected and executed. The magnetic disk includes servo data such as a preamble, a servo mark, a gray code, and a postcode. Each of the magnetic disk devices of the conventional recording mode, the shingled recording mode, and the hybrid recording mode may have servo data including a corresponding postcode.

BRIEF DESCRIPTION OF THE DRAWINGS

FIG. 1 is a block diagram illustrating a configuration of a magnetic disk device according to a first embodiment.

FIG. 4 is a schematic diagram illustrating an example of a data pattern of a track of a disk.

FIG. 5 is a schematic diagram illustrating an example of a servo sector of a servo region.

FIG. 6 is a schematic diagram illustrating an example of a servo sector of a servo region.

FIG. 12 is a schematic diagram illustrating an example of a servo sector of a servo region.

FIG. 13 is a schematic diagram illustrating an example of a servo sector of a servo region.

FIG. 14 is a schematic diagram illustrating an example of a configuration of a system controller according to the first embodiment.

FIG. 15 is a diagram illustrating an example of normal servo read processing.

FIG. 16 is a diagram illustrating an example of normal servo read processing.

FIG. 17 is a diagram illustrating an example of short servo processing.

FIG. 22A is a schematic diagram illustrating an example of a conventional recording mode postcode according to the first embodiment.

FIG. 22B is a schematic diagram illustrating an example of arrangement of the conventional recording mode postcode illustrated in FIG. 22A.

FIG. 25A is a schematic diagram illustrating an example of a hybrid recording mode postcode according to the first embodiment.

FIG. 26B is a schematic diagram illustrating an example of the arrangement of the hybrid recording mode postcode illustrated in FIG. 26A.

FIG. 27 is a schematic diagram illustrating an example of a change in format loss in a radial direction of the disk.

FIG. 28 is a schematic diagram illustrating an example of a change in format loss in the radial direction of the disk.

FIG. 29 is a flowchart illustrating an example of a method of write processing of a postcode according to the first embodiment.

FIG. 30 is a flowchart illustrating an example of a method for read processing of a postcode according to the first embodiment.

FIG. 31 is a schematic diagram illustrating an example of arrangement of servo regions of a disk according to a second embodiment.

FIG. 32 is a flowchart illustrating an example of a method of write processing of a postcode according to the second embodiment.

FIG. 33 is a flowchart illustrating an example of a method for read processing of a postcode according to the second embodiment.

DETAILED DESCRIPTION

Figure 2:
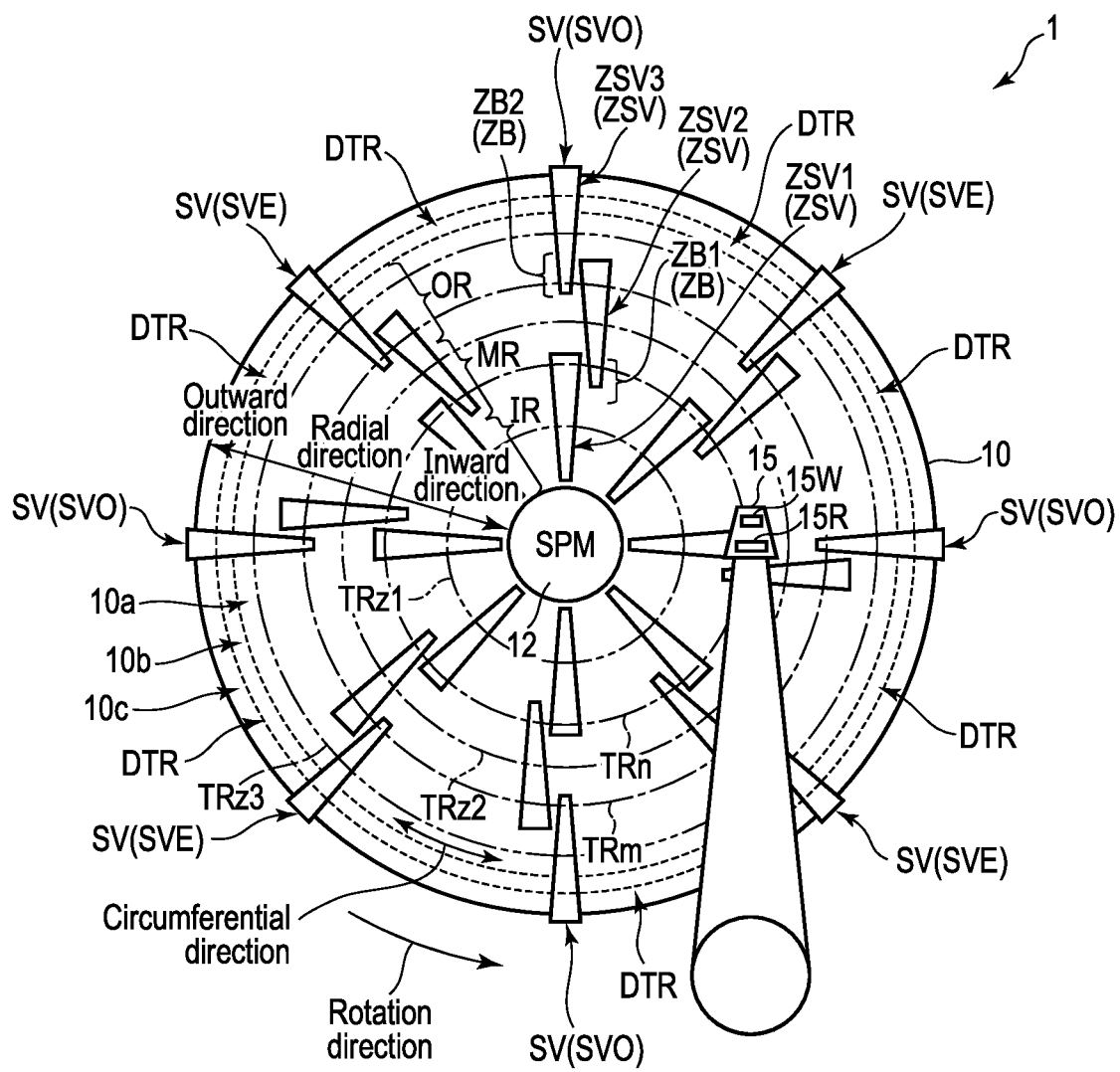
FIG. 2 is a schematic diagram illustrating an example of arrangement of servo regions of the disk according to the first embodiment.

In general, according to one embodiment, a magnetic disk device comprises: a disk including a first region with a first format efficiency and a second region with a second format efficiency lower than the first format efficiency; a head that writes data to the disk and reads data from the disk; and a controller that selects a first postcode to be written to the first region from a plurality of postcodes with different lengths and writes the first postcode to the first region, and selects a second postcode to be written to the second region from a plurality of postcodes with different lengths and writes the second postcode to the second region.

Hereinafter, embodiments will be described with reference to the drawings. The drawings are merely examples, and do not limit the scope of the invention.

First Embodiment

FIG. 1 is a block diagram illustrating a configuration of a magnetic disk device 1 according to a first embodiment.

The magnetic disk device 1 includes a head disk assembly (HDA), a driver IC 20, a head amplifier integrated circuit (hereinafter, referred to as a head amplifier IC or a preamplifier) 30, a volatile memory 70, a nonvolatile memory 80, a buffer memory (buffer) 90, and a system controller 130 which is a one-chip integrated circuit, described later. In addition, the magnetic disk device 1 is connected to a host system (hereinafter, simply referred to as host) 100.

The HDA includes a magnetic disk (hereinafter, referred to as a disk) 10, a spindle motor (hereinafter, referred to as SPM) 12, an arm 13 on which a head 15 is mounted, and a voice coil motor (hereinafter, referred to as VCM) 14. The disk 10 is attached to the SPM 12 and is rotated when the SPM 12 is driven. The arm 13 and the VCM 14 form an actuator. The actuator controls movement of the head 15, mounted on the arm 13, to a particular position of the disk 10, when the VCM 14 is driven. The number of the disks 10 and the heads 15 provided may be two or more.

The disk 10 has a data writable region allocated with a user data region 10a available for a user, a media cache (or may be referred to as a media cache region) 10b temporarily holding data (or a command) transferred from the host or the like before the data is written to a particular region of the user data region 10a, and a system area 10c to which information required for system management is written. Note that the disk 10 may not be provided with the media cache 10b. Hereinafter, a direction from the inner circumference toward the outer circumference of the disk 10 or a direction from the outer circumference to the inner circumference of the disk 10 is referred to as a radial direction. In the radial direction, a direction from the inner circumference to the outer circumference is referred to as an outward direction (outer side), and a direction from the outer circumference to the inner circumference is referred to as an inward direction (inner side). A direction orthogonal in the radial direction of the disk 10 is referred to as a circumferential direction. The circumferential direction corresponds to a direction along the circumference of the disk 10. In addition, a particular position in the radial direction of the disk 10 may be referred to as a radial position, and a particular position in the circumferential direction of the disk 10 may be referred to as a circumferential position. The radial position and the circumferential position may be collectively referred to simply as a position. The radial position corresponds to, for example, a distance from the rotation center of the disk 10 to a particular radial position, a distance from the innermost circumference of the disk 10 to a particular radial position, a distance from a particular radial position of the disk 10 to another radial position, or the like. The disk 10 is divided into a plurality of regions (hereinafter, may be referred to as zone) for respective particular ranges in the radial direction. The zone includes a plurality of tracks. Regions obtained by dividing the disk 10 in the radial direction may be referred to as radial regions. The radial region includes a zone, a track, and the like. Note that the "track" is used for various meanings including: one of a plurality of regions as a result of dividing the disk 10 in the radial direction; a path of the head 15 at a particular radial position; data extending in the circumferential direction of the disk 10; data of a single cycle written to a track at a particular radial position; data written to a particular track of the disk 10; a part of data written to a particular track of the disk 10; and the like. A "sector" is used for various meanings including: one of a plurality of regions as a result of dividing a particular track of the disk 10 in the circumferential direction; data written to a particular circumferential position at a particular radial position of the disk 10; data written to a particular track or a particular sector of the disk 10; and the like. A "width of a track in the radial direction" may also be referred to as "track width". A "path passing through the center position of the track width in a particular track" may be referred to as a "track center". A "width of a sector in the radial direction" may also be referred to as "sector width". A "path passing through the center position of the sector width in a particular sector" may be referred to as a "sector center". The sector center matches the track center. Terms such as "the same", "identical", "matching", and "equivalent" include not only the meaning of being exactly the same but also the meaning of being different to such an extent that they can be regarded as being substantially the same. Hereinafter, the "track center of a particular track" may be simply referred to as a "track". Furthermore, the "sector center of a particular sector" may be simply referred to as a "sector".

The head 15 has a slider serving as a main body and includes a write head 15W and a read head 15R mounted on the slider. The write head 15W writes data on the disk 10. Hereinafter, "writing data" may be referred to as "data write", "write processing", or the like. The read head 15R reads data recorded on the disk 10. Hereinafter, "reading data" may be referred to as "data read" or "read processing". Note that the write head 15W may be simply referred to as the head 15, the read head 15R may be simply referred to as the head 15, or the write head 15W and the read head 15R may be collectively referred to as the head 15. The center portion of the head 15 may be simply referred to as the head 15, the center portion of the write head 15W may be simply referred to as the write head 15W, and the center portion of the read head 15R may be simply referred to as the read head 15R. The "center portion of the write head 15W" may be simply referred to as the "head 15", or the "center portion of the read head 15R" may be simply referred to as the "head 15". Furthermore, "positioning the center portion of the head 15 at the track center of a particular track" may be expressed as "positioning the head 15 at a particular track", "arranging the head 15 at a particular track", "providing the head 15 at a particular track", or the like.

FIG. 2 is a schematic diagram illustrating an example of arrangement of servo regions SV of the disk 10 according to the present embodiment. As illustrated in FIG. 2, in the radial direction, a direction toward the outer circumference of the disk 10 is referred to as an outward direction (outer side), and a direction opposite to the outward direction is referred to as an inward direction (inner side). As illustrated in FIG. 2, in the circumferential direction, a direction in which the disk 10 rotates is referred to as a rotation direction. In the example illustrated in FIG. 2, the rotation direction is illustrated to be the counterclockwise direction, but may be in the opposite direction (clockwise direction). In FIG. 2, the user data region 10a is divided into an inner circumferential region IR positioned in the inward direction, an outer circumferential region OR positioned in the outward direction, and a middle circumferential region MR located between the inner circumferential region IR and the outer circumferential region OR.

The disk 10 includes a plurality of the servo regions SV and a plurality of data regions DTR. For example, the plurality of servo regions SV may extend radially in the radial direction of the disk 10 and may be discretely arranged at a particular interval in the circumferential direction. For example, the plurality of servo regions SV may extend linearly from the inner circumference to the outer circumference and may be discretely arranged at a particular interval in the circumferential direction. For example, the plurality of servo regions SV may extend spirally from the inner circumference to the outer circumference and may be discretely arranged at a particular interval in the circumferential direction. Furthermore, for example, the plurality of servo regions SV may be arranged in a form of islands in the radial direction and may be discretely arranged with the particular interval varying in the circumferential direction. Hereinafter, one servo region SV in a particular track may be referred to as a "servo sector". Note that the "servo region SV" may be referred to as a "servo sector SV". The servo sector includes servo data. Hereinafter, the "arrangement of some servo data forming a servo sector of the like" may be referred to as a "servo pattern". Note that "servo data written to a servo sector" may be referred to as "servo sector".

Each of the plurality of data regions DTR is disposed between the plurality of servo regions SV. For example, the data region DTR corresponds to a region between two continuous servo regions SV in the circumferential direction. Hereinafter, one data region DTR in a particular track may be referred to as a "data sector". Note that the "data region DTR" may be referred to as a "data sector DTR". The data sector includes user data. Note that the "user data written to the data sector" may be referred to as a "data sector". The "data sector" may also be referred to as "user data". In addition, a "pattern including some pieces of data" may be referred to as a "data pattern". In the example illustrated in FIG. 2, the data pattern of the particular track includes servo data (servo sector) and user data (data sector).

The servo region SV includes a plurality of zone servo regions ZSV and the like. In addition to the zone servo region ZSV, the servo region SV may include a region including a gap, a region including servo data, the data region DTR, and the like. The plurality of zone servo regions ZSV are discretely arranged along the radial direction. Each of the plurality of zone servo regions ZSV extends in the radial direction. One zone servo region (servo region) ZSV in a particular track may be referred to as a "zone servo sector" or a "servo sector". Note that the "zone servo region (servo region) ZSV" may be referred to as a "zone servo sector ZSV" or a "servo sector ZSV". The "servo data written to the zone servo sector" may be referred to as "zone servo sector" or "servo sector". Hereinafter, the "arrangement of some pieces of zone servo data forming a zone servo sector or the like" may be referred to as a "zone servo pattern" or "servo pattern". Hereinafter, one servo region SV in a particular track may be referred to as a "zone pattern sector". Note that the "servo region SV" may be referred to as a "zone pattern sector". "At least one data or the like written to the zone pattern sector" may be referred to as "zone pattern sector". The zone pattern sector includes at least one zone servo sector. Hereinafter, the "data pattern of the zone pattern sector" may be referred to as a "zone data pattern".

The servo frequency of the zone servo region arranged in the outward direction among the plurality of zone servo regions ZSV arranged from the inward direction to the outward direction in the particular servo region SV is higher than the servo frequency of the zone servo region arranged in the inward direction among the plurality of zone servo regions ZSV. In addition, the servo frequency of the zone servo sector arranged in the outward direction in the particular zone servo region ZSV is higher than the servo frequency of the zone servo sector arranged in the inward direction in the zone servo region ZSV. The linear velocity of the head 15 with respect to the disk 10 is higher at the radial position in the outward direction than at the radial position in the inward direction. Thus, the format efficiency can be improved, with the servo frequency of the servo region in the outward direction set to be higher than the servo frequency of the servo region in the inward direction in the disk 10 as described above.

In the example illustrated in FIG. 2, the servo region SV includes zone servo regions ZSV1, ZSV2, and ZSV3. The zone servo regions ZSV1, ZSV2, and ZSV3 are arranged in a zigzag form along the radial direction. The zone servo regions ZSV1, ZSV2, and ZSV3 may be arranged in a step form along the radial direction. The zone servo region ZSV1 is positioned more inward than the zone servo region ZSV2. The zone servo region ZSV3 is positioned more outward than the zone servo region ZSV2. For example, the zone servo region ZSV1 is disposed from the inner circumferential region IR to the middle circumferential region MR, the zone servo region ZSV2 is disposed from the inner circumferential region IR to the outer circumferential region OR, and the zone servo region ZSV3 is disposed from the middle circumferential region MR to the outer circumferential region OR. Hereinafter, in the particular servo region SV, a particular region in the radial direction in which the plurality of zone servo regions ZSV are arranged in the circumferential direction may be referred to as a zone servo boundary ZB. The zone servo region ZSV1 is disposed on a track TRz1. The outer circumferential end of the zone servo region ZSV1 and the inner circumferential end of the zone servo region ZSV2 are disposed on a track TRn. In other words, the outer circumferential end of the zone servo region ZSV1 and the inner circumferential end of the zone servo region ZSV2 are disposed on a zone servo boundary ZB1. The zone servo region ZSV2 is arranged on a track TRz2. The outer circumferential end of the zone servo region ZSV2 and the inner circumferential end of the zone servo region ZSV3 are disposed on a track TRm. In other words, the outer circumferential end of the zone servo region ZSV2 and the inner circumferential end of the zone servo region ZSV3 are disposed on a zone servo boundary ZB2. The zone servo region ZSV3 is arranged on a track TRz3. For example, the servo frequency of the zone servo region ZSV2 is higher than the servo frequency of the zone servo region ZSV1, and the servo frequency of the zone servo region ZSV3 is higher than the servo frequency of the zone servo region ZSV2.

The servo region SV includes, for example, a servo region (hereinafter, may be referred to as a main servo region) SVO and a servo region (hereinafter, may be referred to as a sub-servo region) SVE. Hereinafter, one main servo region SVO on a particular track may be referred to as a "main zone pattern sector SVO", and one sub-servo region SVE in a particular track may be referred to as a "sub-zone pattern sector SVE". The main servo region SVO may be referred to as a "main zone pattern sector SVO", and the sub-servo region SVE may be referred to as a "sub-zone pattern sector SVE". The data pattern (hereinafter, may be referred to as a main zone data pattern) of the main zone pattern sector may be the same as or different from the data pattern (hereinafter, may be referred to as a sub-zone data pattern) of the sub-zone pattern sector.

In the example illustrated in FIG. 2, the main servo region SVO and the sub-servo region SVE are alternately arranged at an interval in the circumferential direction. For example, one sub-servo region SVE is arranged between two consecutive main servo regions SVO arranged at an interval in the circumferential direction. In other words, one sub-servo region SVE is arranged between two consecutive main servo regions SVO arranged at an interval in the circumferential direction. For example, when serial numbers are sequentially assigned to all the servo regions SV of the disk 10, the main servo regions SVO correspond to odd-numbered servo regions SV, and the sub-servo regions SVE correspond to even-numbered servo regions SV. Note that two or more sub-servo regions SVE may be arranged between two consecutive main servo regions SVO arranged at an interval in the circumferential direction.

For example, the main servo region SVO and the sub-servo region SVE as a whole may include only a servo region (hereinafter, may be referred to as a normal servo region) for reading and demodulating servo data. Hereinafter, "reading and demodulating servo data" may be referred to as "servo reading". The main servo region SVO and the sub-servo region SVE may include, for example, a normal servo region and a servo region (hereinafter, may be referred to as a short servo region) for servo reading a range of the servo data in the circumferential direction smaller than the range of the servo data in the circumferential direction for the servo reading in the normal servo region. For example, the main servo region SVO may include a normal servo region, and the sub-servo region SVE may include a short servo region. Further, for example, the main servo region SVO may include a short servo region, and the sub-servo region SVE may include a normal servo region. Hereinafter, one normal servo region on a particular track may be referred to as a "normal servo sector", and one short servo region on a particular track may be referred to as a "short servo sector". Note that the normal servo region may be referred to as a "normal servo sector", and the short servo region may be referred to as a "short servo sector". The "servo data on the normal servo sector" may be referred to as "normal servo data", and the "servo data on the short servo sector" may be referred to as "short servo data". Note that the "normal servo data" may be referred to as a "normal servo sector", and the "short servo data" may be referred to as a "short servo sector". The servo pattern of the normal servo data (hereinafter, may be referred to as a normal servo pattern) may be the same as or different from the servo pattern of the short servo sector (hereinafter, may be referred to as a short servo pattern). For example, the length of the short servo sector in the circumferential direction is shorter than the length of the normal servo sector in the circumferential direction. Hereinafter, the "length in the circumferential direction" may be simply referred to as "length". Note that the length of the short servo sector SSV may be, for example, the same as the length of the normal servo sector, or may be longer than the length of the normal servo sector.

Hereinafter, an example of a data pattern of a particular track of the zone servo boundary ZB of the disk 10 will be described with reference to FIGS. 3 and 4.

Figure 3:
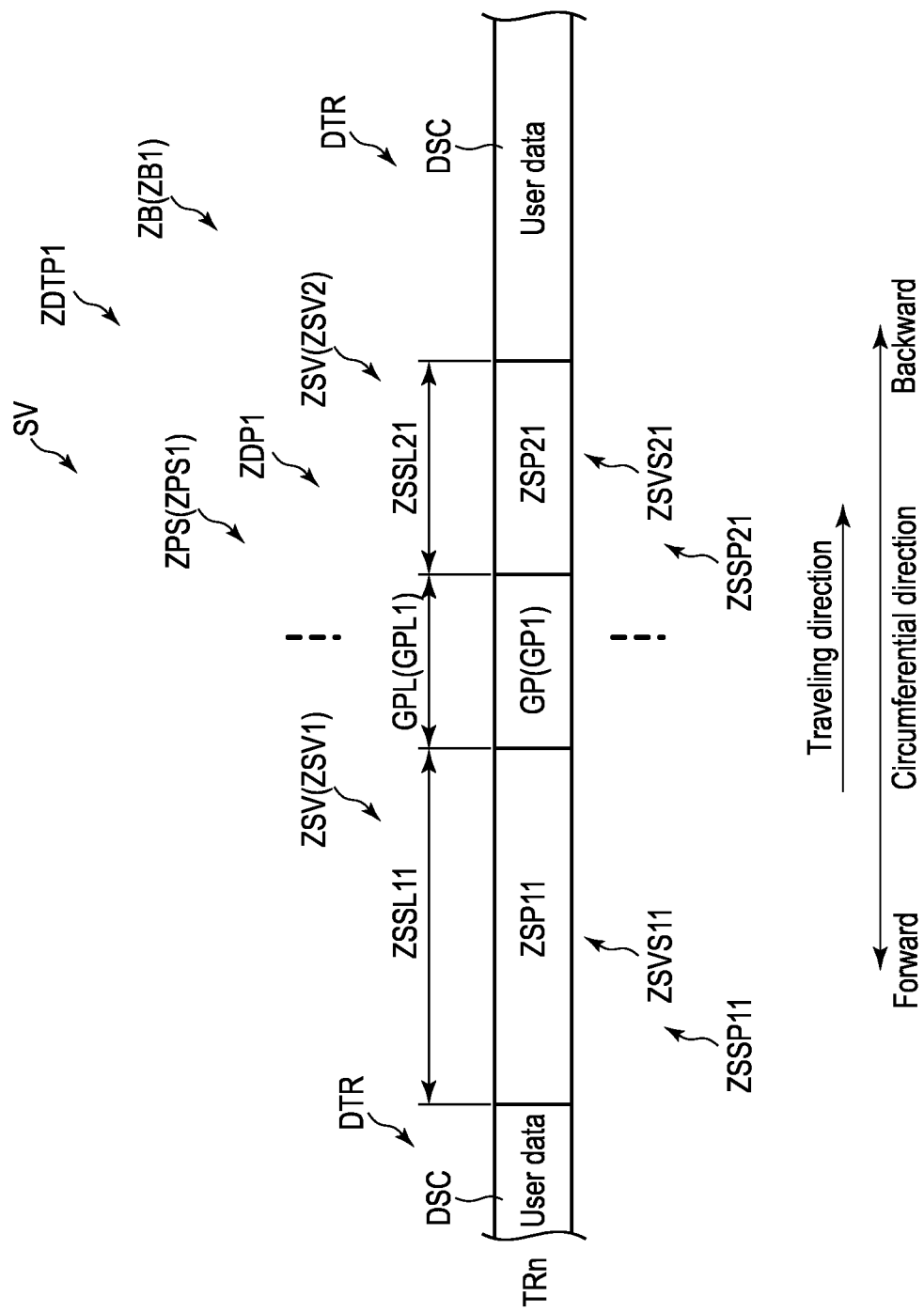
FIG. 3 is a schematic diagram illustrating an example of a data pattern of a track of a disk.

FIG. 3 is a schematic diagram illustrating an example of a data pattern ZDTP1 of the track TRn of the disk 10. As illustrated in FIG. 3, in the circumferential direction, a direction toward the tip of the frontward arrow is referred to as forward (front or forward direction), and a direction toward the tip of the backward arrow is referred to as backward (or backward direction). FIG. 3 illustrates a traveling direction. A direction in which the head 15 sequentially writes and reads data to and from the disk 10 in the circumferential direction, that is, a direction in which the head 15 travels with respect to the disk 10 in the circumferential direction may be referred to as the traveling direction. For example, the traveling direction is the same direction as the backward direction and is opposite to the rotation direction of the disk 10. The traveling direction may be the same direction as the rotation direction of the disk 10.

In the example illustrated in FIG. 3, the track TRn include the data pattern ZDTP1. The data pattern ZDTP1 includes a zone pattern sector ZPS (ZPS1) and a data sector DSC of the data region DTR. In the example illustrated in FIG. 3, in the data pattern ZDTP1, the zone pattern sector ZPS1 is arranged between two data sectors DSC arranged at an interval in the circumferential direction. The zone pattern sector ZPS1 includes a zone data pattern ZDP1. The zone data pattern ZDP1 includes at least one data, which is, for example, a zone servo sector ZSVS11 of the zone servo region ZSV (ZSV1), a gap (hereinafter, may be referred to as a zone servo gap) GP (GP1), and a zone servo sector ZSVS21 of the zone servo region ZSV (ZSV2). In the zone data pattern ZDP1, the zone servo sector ZSVS11, the gap GP (GP1), and the zone servo sector ZSVS21 are arranged side by side in this described direction in the traveling direction. Hereinafter, in a particular zone data pattern, a particular zone servo sector arranged in the forward direction in the circumferential direction with respect to the particular zone servo sector may be referred to as a "forward zone servo sector", and a particular zone servo sector arranged in the backward direction in the circumferential direction with respect to the particular zone servo sector may be referred to as a "back zone servo sector". The forward zone servo sector ZSVS11 includes a zone servo pattern ZSP11. The back zone servo sector ZSVS21 includes a zone servo pattern ZSP21. For example, a length ZSSL11 of the forward zone servo sector ZSVS11 is longer than a length ZSSL21 of the back zone servo sector ZSVS21. A length GPL1 (GPL) of the gap GP1 (GP) corresponds to a distance between the forward zone servo sector ZSVS11 and the back zone servo sector ZSVS21 in the circumferential direction. For example, the length GPL1 of the gap GP1 changes according to the length ZSSL11 of the forward zone servo sector ZSVS11. The length GPL1 of the gap GP1 may be set to be a length with which writing of the forward zone servo sector ZSVS11 would not result in the forward zone servo sector ZSVS11 being overwritten over the back zone servo sector ZSVS21.

FIG. 4 is a schematic diagram illustrating an example of a data pattern ZDTP2 of the track TRm of the disk 10.

In the example illustrated in FIG. 4, the track TRm includes the data pattern ZDTP2. The data pattern ZDTP2 includes a zone pattern sector ZPS (ZPS2) and a data sector DSC of the data region DTR. In the example illustrated in FIG. 4, in the data pattern ZDTP2, the zone pattern sector ZPS2 is arranged between two data sectors DSC arranged at an interval in the circumferential direction. The zone pattern sector ZPS2 includes a zone data pattern ZDP2. The zone data pattern ZDP2 includes at least one data, which is, for example, a zone servo sector ZSVS31 of the zone servo region ZSV (ZSV3), a gap GP (GP2), and a zone servo sector ZSVS22 of the zone servo region ZSV (ZSV2). In the zone data pattern ZDP2, the zone servo sector ZSVS31, the gap GP (GP2), and the zone servo sector ZSVS22 are arranged side by side in this described direction in the traveling direction. The forward zone servo sector ZSVS31 includes a zone servo pattern ZSP31. The back zone servo sector ZSVS22 includes a zone servo pattern ZSP22. For example, a length ZSSL31 of the forward zone servo sector ZSVS31 is shorter than a length ZSSL22 of the back zone servo sector ZSVS22. A length GPL2 (GPL) of the gap GP2 (GP) corresponds to a distance between the forward zone servo sector ZSVS31 and the back zone servo sector ZSVS22 in the circumferential direction. The length GPL2 of the gap GP2 may be the same as or different from the length GPL1 of the gap GP1. For example, the length GPL2 of the gap GP2 changes according to the length ZSSL31 of the forward zone servo sector ZSVS31. The length GPL2 of the gap GP2 may be set to be a length with which writing of the forward zone servo sector ZSVS31 would not result in the forward zone servo sector ZSVS31 being overwritten over the back zone servo sector ZSVS22.

FIG. 5 is a schematic diagram illustrating an example of a servo sector SVS0 of the servo region SV.

In the example illustrated in FIG. 5, the servo sector SVS0 of the servo region SV includes a particular zone servo sector (for example, the forward zone servo sector ZSVS11 or the like) of the zone servo region ZSV1, a particular zone servo sector (for example, the back zone servo sector ZSVS21, ZSVS22, or the like) of the zone servo region ZSV2, and a particular zone servo sector (for example, the forward zone servo sector ZSVS31 or the like) of the zone servo region ZSV3. For example, the servo sector SVS0 includes the zone servo sector ZSVS11 of the zone servo region ZSV1 of the track TRn, the zone servo sector ZSVS21 of the zone servo region ZSV2 of the track TRn, the zone servo sector ZSVS22 of the zone servo region ZSV2 of the track TRm, the zone servo sector ZSVS31 of the zone servo region ZSV3 of the track TRm, the zone servo sector of the zone servo region ZSV1 of the track TRz1, the zone servo sector of the zone servo region ZSV2 of the track TRz2, and the zone servo sector of the zone servo region ZSV3 of the track TRz3. The servo sector SVS0 includes a servo pattern SVP0. The servo pattern SVP0 includes at least one piece of servo data, for example, a preamble, a servo mark or a servo address mark, a gray code, a PAD, burst data, and an additional pattern. In the servo pattern SVP0, the preamble, the servo mark, the gray code, the PAD, the burst data, and the additional pattern are arranged side by side in this described order in the traveling direction. For example, in the servo pattern SVP0, the preamble, the servo mark, the gray code, the PAD, the burst data, and the additional pattern are continuously arranged in the traveling direction in the described order. That is, in the servo pattern SVP0, the servo mark is adjacent to the preamble in the traveling direction. This "adjacent" of course includes a case where data pieces, objects, regions, spaces, and the like are arranged side by side while being in contact with each other, but also includes a case where these are arranged with particular gaps in between. The gray code is adjacent to the servo mark in the traveling direction. The PAD is adjacent to the gray code in the traveling direction. The burst data is adjacent to the PAD in the traveling direction. The additional pattern is adjacent to the burst data in the traveling direction. The servo sector SVS0 may not include the additional pattern. The additional pattern corresponds to, for example, a pattern for determining a shift in timing when data written to the disk 10 is read and demodulated. The phase data obtained by reading the additional pattern can be used, for example, to determine whether the timing of reading the burst data is shifted. Hereinafter, the term "timing" may be used to indicate "a timing after a particular time period from a reference timing at which the read head 15R has read particular data", "a timing when the read head 15R is arranged at a particular circumferential position", and the like. The additional pattern is, for example, data different from a postcode to be described later. The frequency of the additional pattern is different from the frequency of the preamble, for example. In other words, the frequency of the additional pattern is different from the frequency of the postcode. For example, the frequency of the additional pattern is equivalent to the frequency of the burst data, which is, for example, the frequency of the N burst and the frequency of the Q burst. For example, the frequency of the additional pattern is a periodic pattern of a 4-bit length. The phase of the additional pattern changes periodically in the circumferential direction. The additional pattern is written in the data pattern that has an equal phase in one servo track cycle in the radial direction of the disk 10. In other words, the phase of a particular additional pattern is equal to the phase of the additional pattern adjacent to the particular additional pattern in the radial direction. FIG. 5 illustrates a length ASL0 of the servo sector SVS0 and a length ADL of the additional pattern. The length ADL of the additional pattern is shorter than the length of a postcode to be described later, for example. Hereinafter, the length of the PAD and the length of the burst may be constant or may vary.

FIG. 6 is a schematic diagram illustrating an example of a servo sector SVS1 of the servo region SV.

In the example illustrated in FIG. 6, the servo sector SVS1 of the servo region SV includes the forward zone servo sector ZSVS11. For example, the servo sector SVS1 includes the zone servo sector ZSVS11 of the zone servo region ZSV1 of the track TRn. The servo sector SVS1 includes a servo pattern SVP1. The servo pattern SVP1 includes at least one servo data, which is, for example, a preamble, a servo mark or a servo address mark, a gray code, a PAD, burst data, and a postcode X1. In the servo pattern SVP1, the preamble, the servo mark, the gray code, the PAD, the burst data, and the postcode X1 are arranged side by side in this described order in the traveling direction. For example, in the servo pattern SVP1, the preamble, the servo mark, the gray code, the PAD, the burst data, and the postcode X1 are continuously arranged side by side in this described order in the traveling direction. The postcode is adjacent to the burst data in the traveling direction. Note that the servo sector SVS1 may not include the postcode X1. FIG. 6 illustrates a length ASL1 of the servo sector SVS1, a combined length SVL1 of the preamble, the servo mark, and the gray code, and a length PCLX1 of the postcode. The preamble includes preamble information for synchronization with a read signal of a servo pattern including a servo mark, a gray code, and the like. The servo mark (or the servo address mark) includes servo mark information indicating the start of the servo pattern. The gray code includes an address (cylinder address) of a particular track and an address of a servo sector of the particular track. The burst data is data (relative position data) used to detect positional deviation (positional error) in the radial direction and/or the circumferential direction of the head 15 with respect to a track center of a particular track, and includes a repeating pattern having a particular cycle. The PAD includes PAD information of a synchronization signal such as a gap and a servo AGC. The burst data is written in a data pattern in which the phase of the burst data is inverted by 180° in one servo track cycle in the radial direction of the disk 10. The servo track (servo cylinder) corresponds to a track to be subjected to write processing or read processing according to a command from a host 100 or the like. The burst data is used, for example, to acquire the position (hereinafter also referred to as a head position) of the head 15 on the disk 10 in the radial direction and/or the circumferential direction. The burst data includes, for example, N burst and Q burst. The N burst and the Q burst are written in data patterns in which the phases deviate by 90° with each other in the radial direction of the disk 10. The postcode includes data (hereinafter referred to as RRO correction data) or the like for correcting an error caused by track distortion with respect to the track center, for example, in a path (hereinafter, may be referred to as a target path) serving as a target for the head 15 arranged concentric with the disk 10 caused by a shake (repeatable run out (RRO)) synchronized with the rotation of the disk 10 when servo data is written to the disk. Hereinafter, for convenience of explanation, the error caused by track distortion with respect to the target path by the RRO may be simply referred to as RRO. For example, the postcode is included in the normal servo sector. Note that the postcode may be included in the short servo sector. The additional pattern is included in the short servo sector. Note that the additional pattern may be included in the normal servo sector. For example, the length PCLX1 of the postcode is longer than the length ADL of the additional pattern. The length ASL1 of the servo sector SVS1 is longer than the length ASL0 of the servo sector SVS0. Note that the length PCLX1 of the postcode may be equal to or shorter than the length ADL of the additional pattern. The length ASL1 of the servo sector SVS1 may be equal to or shorter than the length ASL0 of the servo sector SVS0.

Figure 7:
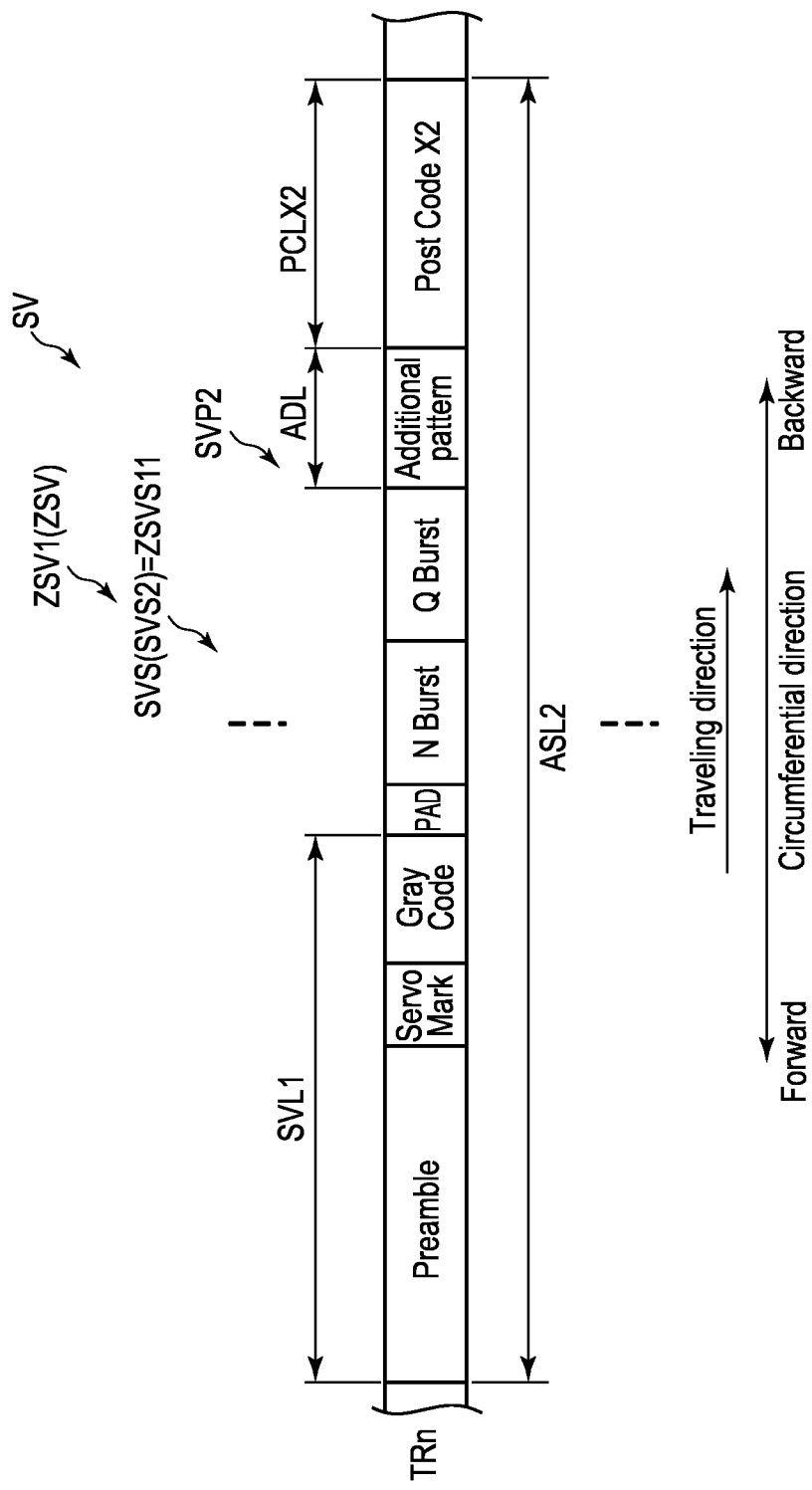
FIG. 7 is a schematic diagram illustrating an example of a servo sector of a servo region.

FIG. 7 is a schematic diagram illustrating an example of a servo sector SVS2 of the servo region SV.

In the example illustrated in FIG. 7, the servo sector SVS2 of the servo region SV includes the forward zone servo sector ZSVS11. For example, the servo sector SVS1 includes the zone servo sector ZSVS11 of the zone servo region ZSV1 of the track TRn. The servo sector SVS2 includes a servo pattern SVP2. The servo pattern SVP2 includes at least one servo data, which is, for example, a preamble, a servo mark, a gray code, a PAD, burst data, an additional pattern, and a postcode X2. The postcode X2 may be the same as or different from the postcode X1. In the servo pattern SVP2, the preamble, the servo mark, the gray code, the PAD, the burst data, the additional pattern, and the postcode X2 are arranged side by side in this described order in the traveling direction. For example, in the servo pattern SVP2, the preamble, the servo mark, the gray code, the PAD, the burst data, the additional pattern, and the postcode X2 are continuously arranged side by side in this described order in the traveling direction. Note that the servo sector SVS2 may not include the additional pattern and the postcode X2. FIG. 7 illustrates a length ASL2 of the servo sector SVS2 and a length PCLX2 of the postcode X2. The length ASL2 of the servo sector SVS2 is longer than, for example, the length ASL0 of the servo sector SVS0 and the length ASL1 of the servo sector SVS1. The length PCLX2 of the postcode X2 may be, for example, the same as the length PCLX1 of the postcode X1, may be shorter than the length PCLX1 of the postcode X1, or may be longer than the length PCLX1.

Figure 8:
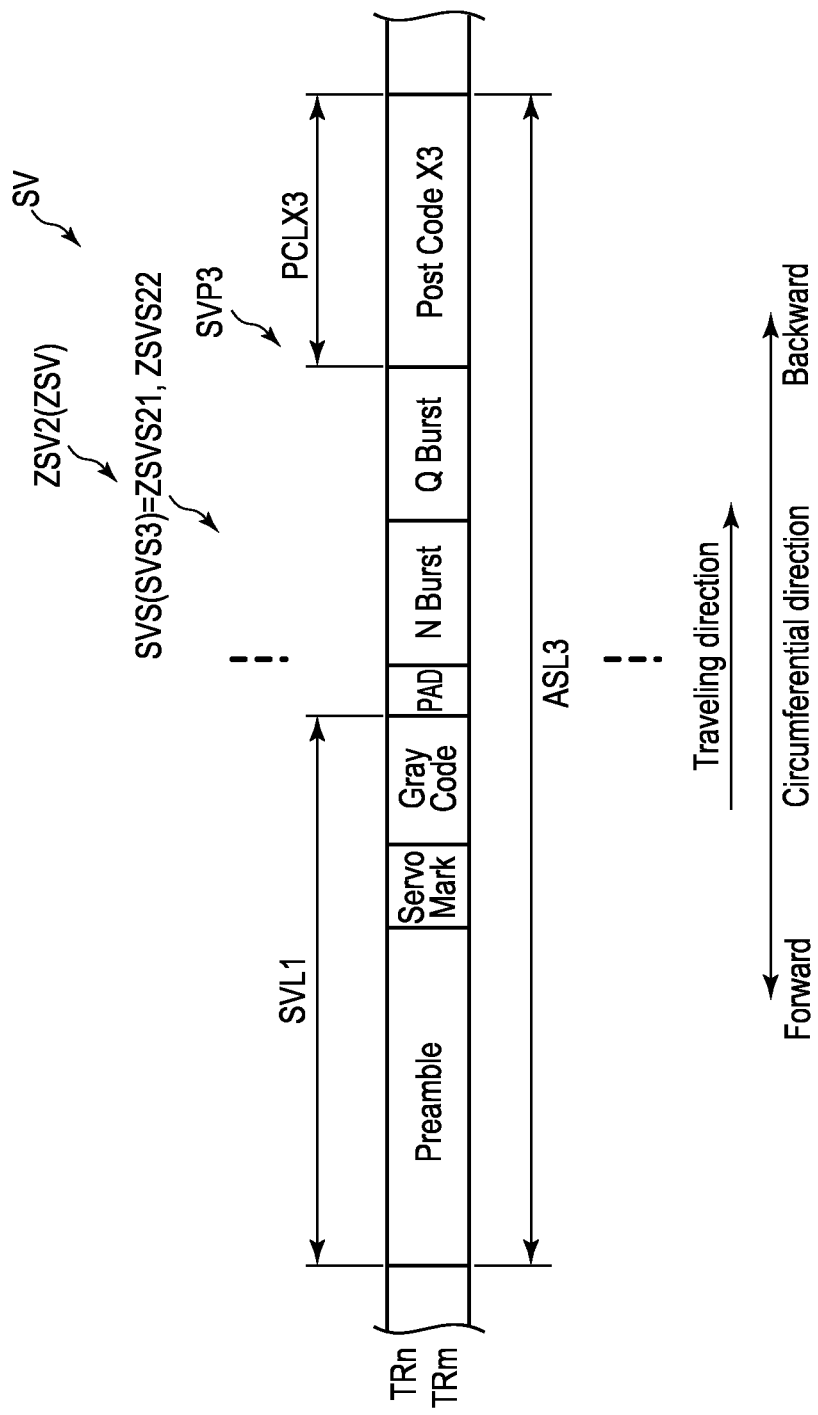
FIG. 8 is a schematic diagram illustrating an example of a servo sector of a servo region.

FIG. 8 is a schematic diagram illustrating an example of a servo sector SVS3 of the servo region SV.

In the example illustrated in FIG. 8, the servo sector SVS3 of the servo region SV includes the back zone servo sectors ZSVS21 and ZSVS22. For example, the servo sector SVS3 includes the zone servo sector ZSVS21 of the zone servo region ZSV2 of the track TRn and the zone servo sector ZSVS22 of the zone servo region ZSV2 of the track TRm. The servo sector SVS3 includes a servo pattern SVP3. The servo pattern SVP3 includes at least one servo data, which is, for example, a preamble, a servo mark, a gray code, a PAD, burst data, and a postcode X3. The postcode X3 may be the same as or different from the postcode X1 or the postcode X2. In the servo pattern SVP3, the preamble, the servo mark, the gray code, the PAD, the burst data, and the postcode X3 are arranged side by side in this described order in the traveling direction. For example, in the servo pattern SVP3, the preamble, the servo mark, the gray code, the PAD, the burst data, and the postcode X3 are continuously arranged side by side in this described order in the traveling direction. Note that the servo sector SVS3 may not include the postcode X3. FIG. 8 illustrates a length ASL3 of the servo sector SVS3 and a length PCLX3 of the postcode X3. The length ASL3 of the servo sector SVS3 may be, for example, the same as the length ASL0 of the servo sector SVS0, may be longer than the length ASL0, or may be shorter than the length ASL0. The length ASL3 of the servo sector SVS3 may be, for example, the same as the length ASL1 of the servo sector SVS1, may be longer than the length ASL1, or may be shorter than the length ASL1. The length ASL3 of the servo sector SVS3 may be, for example, the same as the length ASL2 of the servo sector SVS2, may be longer than the length ASL2, or may be shorter than the length ASL2. The length PCLX3 of the postcode X3 may be, for example, the same as the length PCLX1 of the postcode X1 or the length PCLX2 of the postcode X2, may be shorter than the length PCLX1 or the length PCLX2, or may be longer than the length PCLX1 or the length PCLX2.

Figure 9:
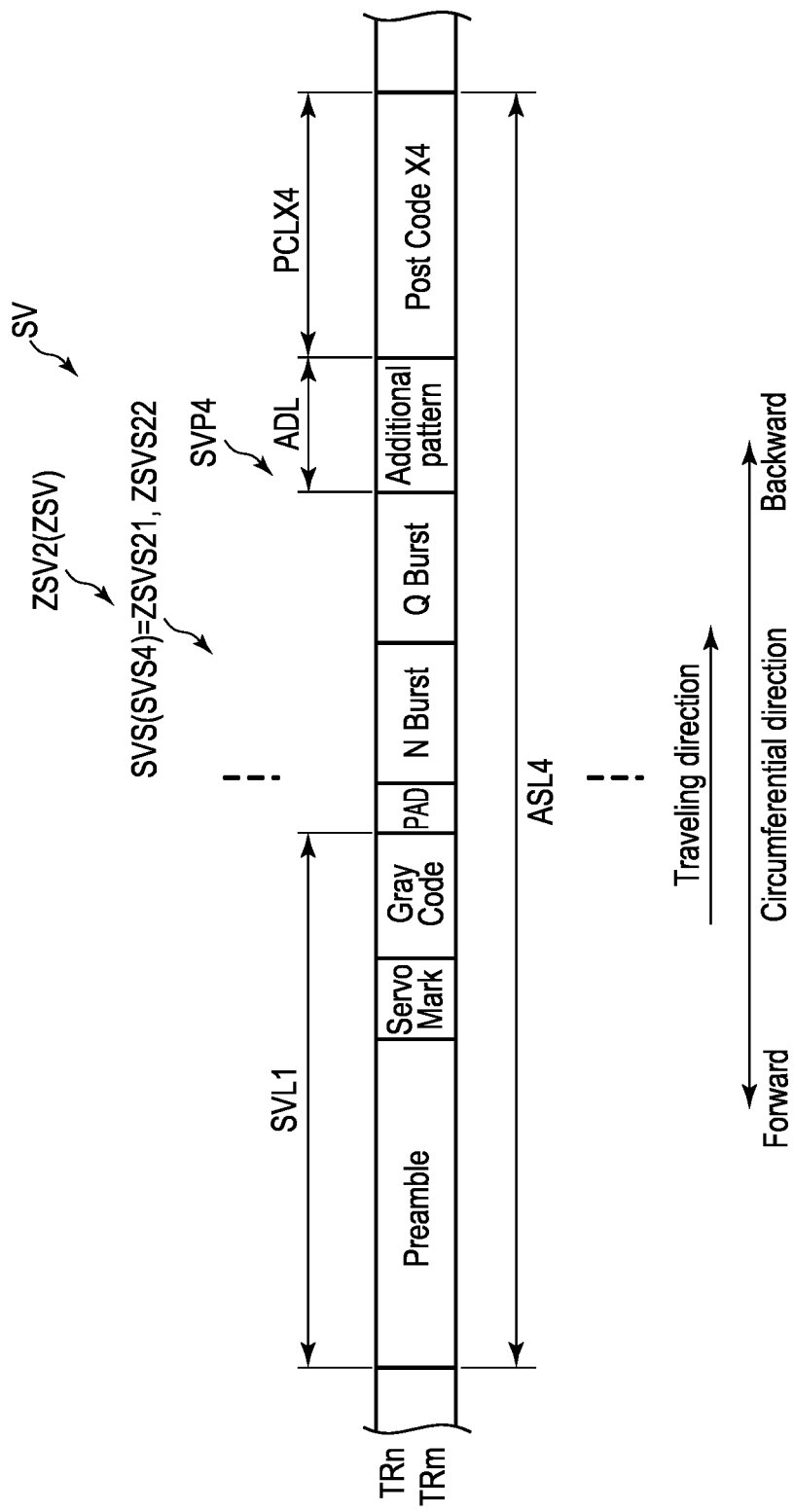
FIG. 9 is a schematic diagram illustrating an example of a servo sector of a servo region.

FIG. 9 is a schematic diagram illustrating an example of a servo sector SVS4 of the servo region SV.

In the example illustrated in FIG. 9, the servo sector SVS4 of the servo region SV includes the back zone servo sectors ZSVS21 and ZSVS22. For example, the servo sector SVS4 includes the zone servo sector ZSVS21 of the zone servo region ZSV2 of the track TRn and the zone servo sector ZSVS22 of the zone servo region ZSV2 of the track TRm. The servo sector SVS4 includes a servo pattern SVP4. The servo pattern SVP4 includes at least one servo data, which is, for example, a preamble, a servo mark, a gray code, a PAD, burst data, an additional pattern, and a postcode X4. The postcode X4 may be the same as or different from the postcode X1, the postcode X2, or the postcode X3. In the servo pattern SVP4, the preamble, the servo mark, the gray code, the PAD, the burst data, the additional pattern, and the postcode X4 are arranged side by side in this described order in the traveling direction. For example, in the servo pattern SVP4, the preamble, the servo mark, the gray code, the PAD, the burst data, the additional pattern, and the postcode X4 are continuously arranged side by side in this described order in the traveling direction. Note that the servo sector SVS4 may not include the additional pattern and the postcode X4. FIG. 9 illustrates a length ASL4 of the servo sector SVS4 and a length PCLX4 of the postcode X4. The length ASL4 of the servo sector SVS4 is longer than the length ASL3 of the servo sector SVS3, for example. The length ASL4 of the servo sector SVS4 may be the same as the length ASL2 of the servo sector SVS2, may be longer than the length ASL2, or may be shorter than the length ASL2. The length PCLX4 of the postcode X4 may be, for example, the same as the length PCLX1 of the postcode X1, the length PCLX2 of the postcode X2, or the length PCLX3 of the postcode X3, may be shorter than the length PCLX1, the length PCLX2, or the length PCLX3, or may be longer than the length PCLX1, the length PCLX2, or the length PCLX3.

Figure 10:
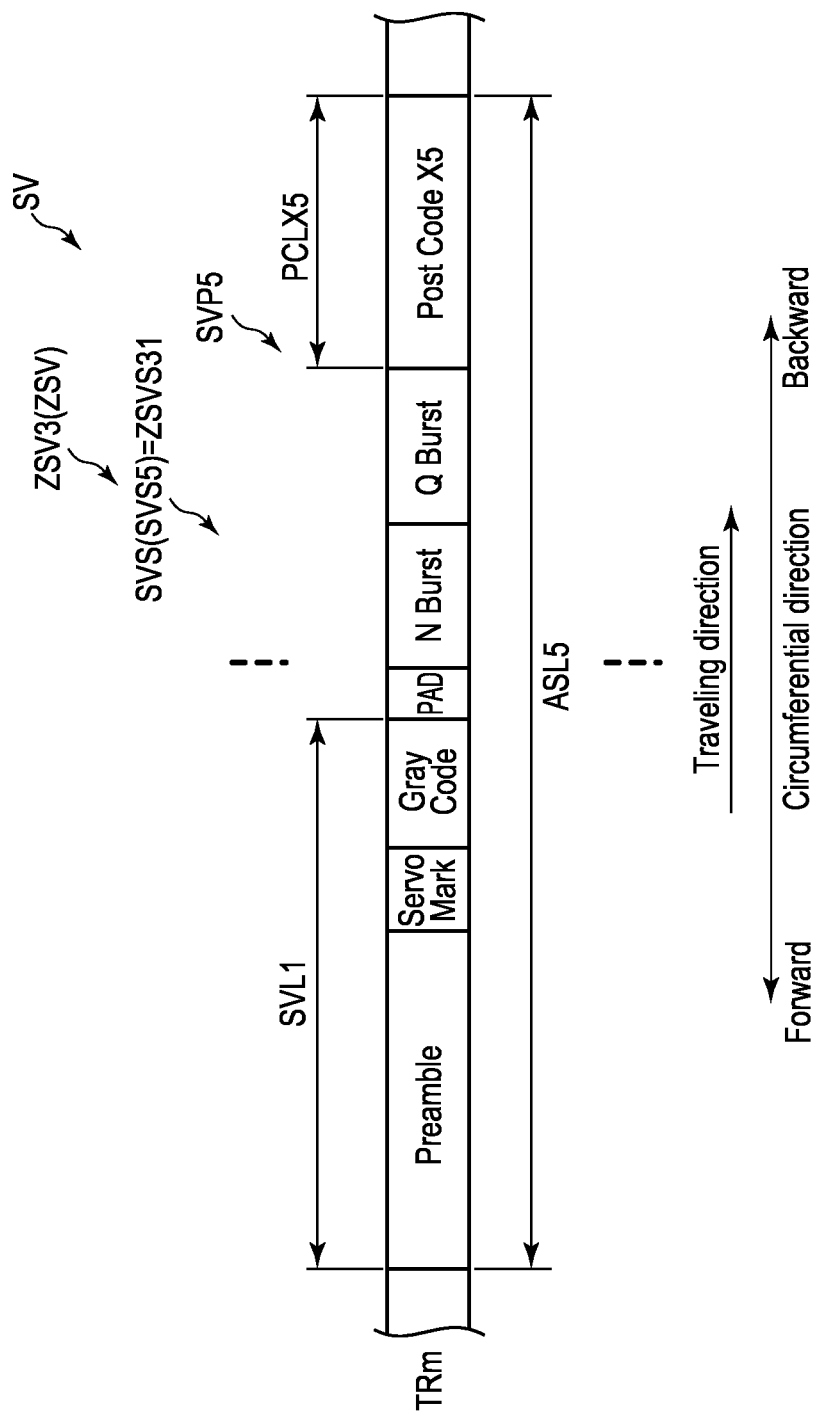
FIG. 10 is a schematic diagram illustrating an example of a servo sector of a servo region.

FIG. 10 is a schematic diagram illustrating an example of a servo sector SVS5 of the servo region SV.

In the example illustrated in FIG. 10, the servo sector SVS5 of the servo region SV includes the forward zone servo sector ZSVS31. For example, the servo sector SVS5 includes the zone servo sector ZSVS31 of the zone servo region ZSV3 of the track TRm. The servo sector SVS5 includes a servo pattern SVP5. The servo pattern SVP5 includes at least one servo data, which is, for example, a preamble, a servo mark, a gray code, a PAD, burst data, and a postcode X5. The postcode X5 may be the same as or different from the postcode X1, the postcode X2, the postcode X3, or the postcode X4. In the servo pattern SVP5, the preamble, the servo mark, the gray code, the PAD, the burst data, and the postcode X5 are arranged side by side in this described order in the traveling direction. For example, in the servo pattern SVP5, the preamble, the servo mark, the gray code, the PAD, the burst data, and the postcode X5 are continuously arranged side by side in this described order in the traveling direction. Note that the servo sector SVS5 may not include the postcode X5. FIG. 10 illustrates a length ASL5 of the servo sector SVS5 and a length PCLX5 of the postcode X5. The length ASL5 of the servo sector SVS5 may be, for example, the same as the length ASL1 of the servo sector SVS1 or the length ASL3 of the servo sector SVS3, may be longer than the length ASL1 or the length ASL3, or may be shorter than the length ASL1 or the length ASL3. The length PCLX5 of the postcode X5 may be, for example, the same as the length PCLX1 of the postcode X1, the length PCLX2 of the postcode X2, the length PCLX3 of the postcode X3, or the length PCLX4 of the postcode X4 may be shorter than the length PCLX1, the length PCLX2, the length PCLX3, or the length PCLX4, or may be longer than the length PCLX1, the length PCLX2, the length PCLX3, or the length PCLX4.

Figure 11:
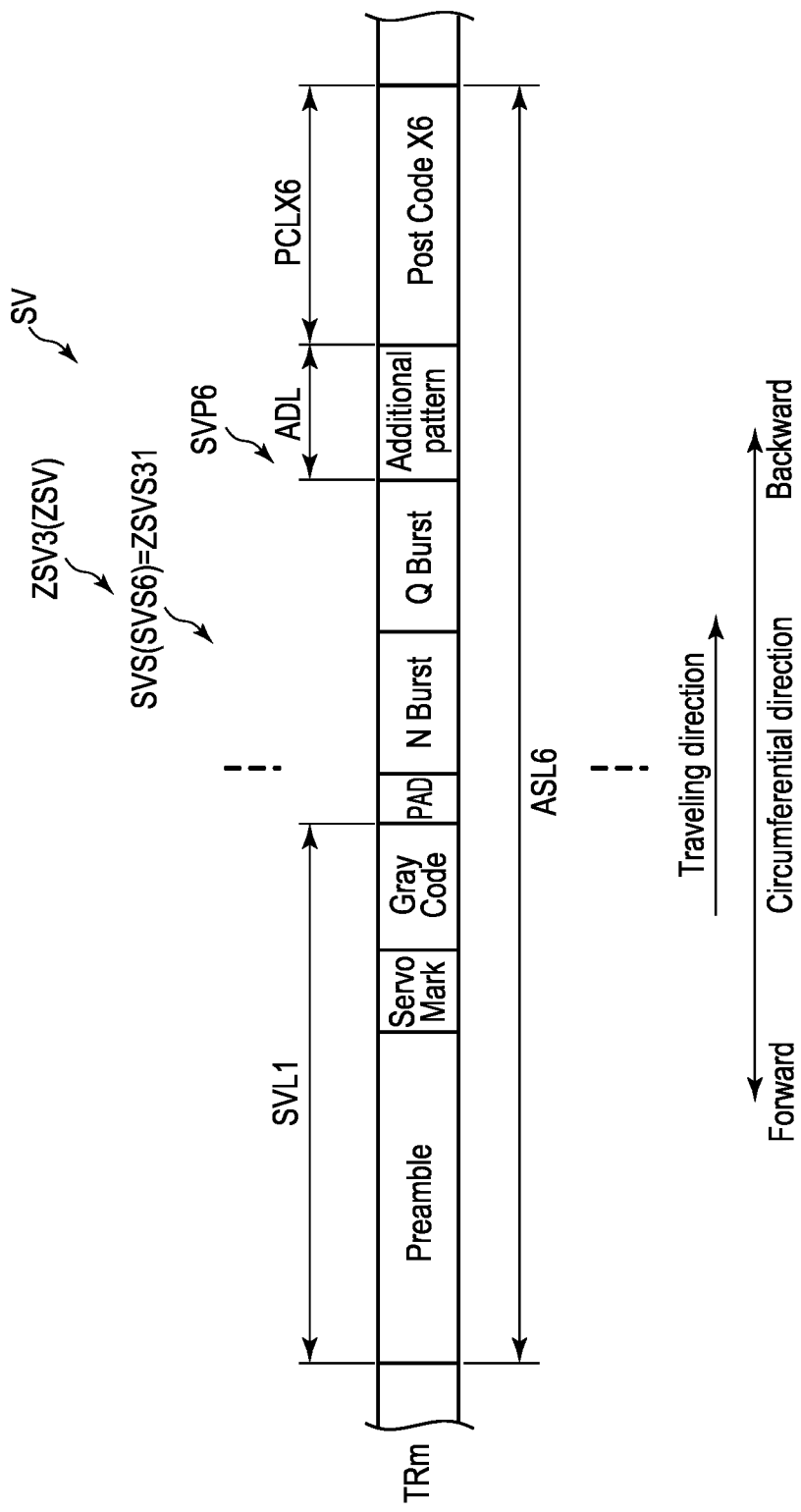
FIG. 11 is a schematic diagram illustrating an example of a servo sector of a servo region.

FIG. 11 is a schematic diagram illustrating an example of a servo sector SVS6 of the servo region SV.

In the example illustrated in FIG. 11, the servo sector SVS6 of the servo region SV includes the forward zone servo sector ZSVS31. For example, the servo sector SVS6 includes the zone servo sector ZSVS31 of the zone servo region ZSV3 of the track TRm. The servo sector SVS6 includes a servo pattern SVP6. The servo pattern SVP6 includes at least one servo data, which is, for example, a preamble, a servo mark, a gray code, a PAD, burst data, an additional pattern, and a postcode X6. The postcode X6 may be the same as or different from the postcode X1, the postcode X2, the postcode X3, the postcode X4, or the postcode X5. In the servo pattern SVP6, the preamble, the servo mark, the gray code, the PAD, the burst data, the additional pattern, and the postcode X6 are arranged side by side in this described order in the traveling direction. For example, in the servo pattern SVP6, the preamble, the servo mark, the gray code, the PAD, the burst data, the additional pattern, and the postcode X6 are continuously arranged side by side in this described order in the traveling direction. Note that the servo sector SVS6 may not include the additional pattern and the postcode X6. FIG. 11 illustrates a length ASL6 of the servo sector SVS6. The length ASL6 of the servo sector SVS6 is longer than the length ASL5 of the servo sector SVS5, for example. The length ASL6 of the servo sector SVS6 may be the same as the length ASL2 of the servo sector SVS2 or the length ASL4 of the servo sector SVS4, may be longer than the length ASL2 or the length ASL4, or may be shorter than the length ASL2 or the length ASL4. The length PCLX6 of the postcode X6 may be, for example, the same as the length PCLX1 of the postcode X1, the length PCLX2 of the postcode X2, the length PCLX3 of the postcode X3, the length PCLX4 of the postcode X4, or the length PCLX5 of the postcode X5, may be shorter than the length PCLX1, the length PCLX2, the length PCLX3, the length PCLX4, or the length PCLX5 or may be longer than the length PCLX1, the length PCLX2, the length PCLX3, the length PCLX4, or the length PCLX5.

FIG. 12 is a schematic diagram illustrating an example of a servo sector SVS7 of the servo region SV.

In the example illustrated in FIG. 12, the servo sector SVS7 of the servo region SV includes a zone servo sector other than the zone servo boundary ZB of the zone servo regions ZSV1, ZSV2, and ZSV3. For example, the servo sector SVS7 includes a zone servo sector of the zone servo region ZSV1 of the track TRz1, a zone servo sector of the zone servo region ZSV2 of the track TRz2, and a zone servo sector of the zone servo region ZSV3 of the track TRz3. The servo sector SVS7 includes a servo pattern SVP7. The servo pattern SVP7 includes at least one servo data, which is, for example, a preamble, a servo mark, a gray code, a PAD, burst data, and a postcode X7. The postcode X7 may be the same as or different from the postcode X1, the postcode X2, the postcode X3, the postcode X4, the postcode X5, or the postcode X6. In the servo pattern SVP7, the preamble, the servo mark, the gray code, the PAD, the burst data, and the postcode X7 are arranged side by side in this described order in the traveling direction. For example, in the servo pattern SVP7, the preamble, the servo mark, the gray code, the PAD, the burst data, and the postcode X7 are continuously arranged side by side in this described order in the traveling direction. Note that the servo sector SVS7 may not include the postcode X7. FIG. 12 illustrates a length ASL7 of the servo sector SVS7 and a length PCLX7 of the postcode X7. The length ASL7 of the servo sector SVS7 may be, for example, the same as the length ASL1 of the servo sector SVS1, the length ASL3 of the servo sector SVS3, or the length ASL5 of the servo sector SVS5, may be longer than the length ASL1, the length ASL3, or the length ASL5, or may be shorter than the length ASL1, the length ASL3, or the length ASL5. The length PCLX7 of the postcode X7 may be, for example, the same as the length PCLX1 of the postcode X1, the length PCLX2 of the postcode X2, the length PCLX3 of the postcode X3, the length PCLX4 of the postcode X4, the length PCLX5 of the postcode X5, or the length PCLX6 of the postcode X6, may be shorter than the length PCLX1, the length PCLX2, the length PCLX3, the length PCLX4, the length PCLX5, or the length PCLX6, or may be longer than the length PCLX1, the length PCLX2, the length PCLX3, the length PCLX4, the length PCLX5, or the length PCLX6.

FIG. 13 is a schematic diagram illustrating an example of a servo sector SVS8 of the servo region SV.

In the example illustrated in FIG. 13, the servo sector SVS8 of the servo region SV includes a zone servo sector other than the zone servo boundary ZB of the zone servo regions ZSV1, ZSV2, and ZSV3. For example, the servo sector SVS8 includes a zone servo sector of the zone servo region ZSV1 of the track TRz1, a zone servo sector of the zone servo region ZSV2 of the track TRz2, and a zone servo sector of the zone servo region ZSV3 of the track TRz3. The servo sector SVS8 includes a servo pattern SVP8. The servo pattern SVP8 includes at least one servo data, which is, for example, a preamble, a servo mark, a gray code, a PAD, burst data, an additional pattern, and a postcode X8. The postcode X8 may be the same as or different from the postcode X1, the postcode X2, the postcode X3, the postcode X4, the postcode X5, the postcode X6, or the postcode X7. In the servo pattern SVP8, the preamble, the servo mark, the gray code, the PAD, the burst data, the additional pattern, and the postcode X8 are arranged side by side in this described order in the traveling direction. For example, in the servo pattern SVP8, the preamble, the servo mark, the gray code, the PAD, the burst data, the additional pattern, and the postcode X8 are continuously arranged side by side in this described order in the traveling direction. Note that the servo sector SVS8 may not include the additional pattern and the postcode X8. FIG. 13 illustrates a length ASL8 of the servo sector SVS8. The length ASL8 of the servo sector SVS8 is longer than the length ASL7 of the servo sector SVS7, for example. The length ASL8 of the servo sector SVS8 may be the same as the length ASL2 of the servo sector SVS2, the length ASL4 of the servo sector SVS4, or the length ASL6 of the servo sector SVSG, may be longer than the length ASL2, the length ASL4, or the length ASL6, or may be shorter than the length ASL2, the length ASL4, or the length ASL6. The length PCLX8 of the postcode X8 may be, for example, the same as the length PCLX1 of the postcode X1, the length PCLX2 of the postcode X2, the length PCLX3 of the postcode X3, the length PCLX4 of the postcode X4, the length PCLX5 of the postcode X5, the length PCLX6 of the postcode X6, or the length PCLX7 of the postcode X7, may be shorter than the length PCLX1, the length PCLX2, the length PCLX3, the length PCLX4, the length PCLX5, the length PCLX6, or the length PCLX7, or may be longer than the length PCLX1, the length PCLX2, the length PCLX3, the length PCLX4, the length PCLX5, the length PCLX6, or the length PCLX7.

The driver IC 20 controls the driving of the SPM 12 and the VCM 14 according to the control of the system controller 130 (specifically, an MPU 60 described later).

The head amplifier IC (preamplifier) 30 includes a read amplifier and a write driver. The read amplifier amplifies a read signal read from the disk 10 and outputs the amplified read signal to the system controller 130 (specifically, a read/write (R/W) channel 40 described later). The write driver outputs, to the head 15, a write current corresponding to a signal output from the R/W channel 40.

The volatile memory 70 is a semiconductor memory in which stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory that records stored data even when power supply is cut off. The nonvolatile memory 80 is, for example, a NOR type or NAND type flash read only memory (FROM).

The buffer memory 90 is a semiconductor memory that temporarily records data and the like transmitted and received between the magnetic disk device 1 and the host 100. Note that the buffer memory 90 may be integrated with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is realized by, for example, using a large scale integrated circuit (LSI) called a system-on-a-chip (SoC) in which a plurality of elements are integrated on a single chip. The system controller 130 includes the read/write (R/W) channel 40, a hard disk controller (HDC) 50, and the microprocessor (MPU) 60. The system controller 130 is electrically connected to, for example, the driver IC 20, the head amplifier IC 30, the volatile memory 70, the nonvolatile memory 80, the buffer memory 90, the host 100, and the like.

The R/W channel 40 performs signal processing of read data transferred from the disk 10 to the host 100 and write data transferred from the host 100 in response to an instruction from the MPU 60 described later. Examples of the signal processing include modulation processing, demodulation processing, encoding processing, decoding processing, and the like. The R/W channel 40 has a circuit or function that measures the signal quality of the read data. The R/W channel 40 detects various gates examples of which including a write gate corresponding to a signal for data writing, a read gate corresponding to a signal for data reading, a servo gate corresponding to a signal for servo reading, and the like. The R/W channel 40 executes signal processing on the write data in response to the write gate, executes signal processing on read data in response to the read gate, and executes signal processing on servo data in response to the servo gate. The R/W channel 40 executes servo read processing of demodulating servo data from a read signal input from the head amplifier IC 30, and executes write processing for data to the disk 10 (processing of outputting write data to the head amplifier IC 30). The R/W channel 40 executes servo read processing and executes read processing on data from the disk 10. The R/W channel 40 is electrically connected to, for example, the head amplifier IC 30, the HDC 50, the MPU 60, and the like.

For example, the R/W channel 40 performs servo reading on a servo sector in response to a servo gate for performing servo reading entirely on servo data of the servo sector in a particular region of the disk 10, and executes write processing on the region based on the servo data on which the servo reading has been performed in response to the servo gate. Hereinafter, a "servo gate for performing servo reading entirely on servo data of a servo sector" may be referred to as a "normal servo gate". Furthermore, "performing the servo read processing in response to the normal servo gate" may be referred to as "normal servo read" or "normal servo read processing".

For example, the R/W channel 40 performs servo reading on a servo sector in response to a servo gate for servo reading a part of servo data in a servo sector in a particular region of the disk 10, that is, servo data within a range, in the circumferential direction, which is smaller than a range of servo data, in the circumferential direction, subjected to the servo reading for the normal servo gate for example, and performs write processing on the region based on the servo data as a result of the servo reading in response to the servo data. Hereinafter, the "servo gate for servo reading a part of servo data in a servo sector in a particular region of the disk 10, that is, servo data within a range, in the circumferential direction, which is smaller than a range of servo data, in the circumferential direction, subjected to the servo reading for the normal servo gate for example" may be referred to as a "short servo gate". Furthermore, "performing the servo read processing in response to the short servo gate" may be referred to as "short servo read" or "short servo read processing". The normal servo gate and the short servo gate have different lengths (hereinafter, may be referred to as a servo gate length) of time from an asserted (active, valid, or ON) state to a negated (inactive, invalid, or OFF) state. For example, the servo gate length of the normal servo gate is longer than the servo gate length of the short servo gate.

For example, the R/W channel 40 performs normal servo reading on a servo sector in a particular region of the disk 10, and performs read processing on this region based on servo data as a result of the normal servo reading.

For example, the R/W channel 40 may perform short servo reading on a servo sector in a particular region of the disk 10, and perform read processing on this region based on servo data as a result of the short servo reading.

The R/W channel 40 executes normal servo read processing on a particular region of the disk 10. Note that the R/W channel 40 may be switchable between performing and not performing the short servo read processing on a particular region of the disk 10. A "mode of executing the short servo read processing" may be referred to as a "short servo mode". Furthermore, "performing the short servo read processing" may be referred to as "turning ON the short servo mode", and "not performing the short servo read processing" may be referred to as "turning OFF the short servo mode". Thus, the R/W channel 40 can switch ON and OFF the short servo mode. For example, the R/W channel 40 may switch ON and OFF the short servo mode depending on whether the current mode it that for performing the write processing (hereinafter, may be referred to as a write mode) or that for performing the read processing (hereinafter, may be referred to as a read mode). Hereinafter, the "write mode" and the "read mode" may be collectively referred to as an "access mode". The term "access" includes meanings such as "recording or writing data in a particular region of the disk 10", "reading or reading out data from a particular area of the disk 10", and "moving the head 15 or the like to a particular area of the disk 10". Thus, the R/W channel 40 may switch ON and OFF the short servo mode, depending on the access mode.

The HDC 50 controls data transfer between the host 100 and the R/W channel 40 according to an instruction from the MPU 60 to be described later. The HDC 50 outputs various gates, for example, a write gate, a read gate, a servo gate, and the like to the R/W channel 40 according to an instruction from the MPU 60 to be described later. For example, the HDC 50 generates a normal servo gate and outputs the normal servo gate to the R/W channel 40. The normal servo gate corresponds to, for example, a gate for reading at least a preamble, a servo mark, a gray code, a PAD, and burst data. For example, the HDC 50 generates a short servo gate and outputs the normal servo gate to the R/W channel 40. The short servo gate corresponds to a gate for reading at least burst data without reading at least the preamble, the servo mark, the gray code, the PAD. The HDC 50 is electrically connected to, for example, the R/W channel 40, the MPU 60, the volatile memory 70, the nonvolatile memory 80, the buffer memory 90, and the like.

The MPU 60 is a main controller that controls each unit of the magnetic disk device 1. The MPU 60 controls the VCM 14 through the driver IC 20 and performs servo control for positioning the head 15. In addition, the MPU 60 controls the SPM 12 through the driver IC 20 and rotates the disk 10. The MPU 60 controls the operation of writing data to the disk 10 and selects the storage destination of the write data. In addition, the MPU 60 controls the operation of reading data from the disk 10 and controls the processing of read data. The MPU 60 manages a region for recording data. The MPU 60 is connected to each unit of the magnetic disk device 1. The MPU 60 is electrically connected to, for example, the driver IC 20, the R/W channel 40, the HDC 50, and the like.

FIG. 14 is a schematic diagram illustrating an example of a configuration of the system controller 130 according to the present embodiment.

The R/W channel 40 includes a gate detection unit 410. The gate detection unit 410 detects whether various gates, for example, a write gate, a read gate, a servo gate, and the like are in an asserted state or a negated state. For example, the gate detection unit 410 performs the write processing upon detecting that the write gate is asserted, and stops the write processing upon detecting that the write gate is negated. The gate detection unit 410 performs the read processing upon detecting that the read gate is asserted, and stops the read processing upon detecting that the read gate is negated. The gate detection unit 410 performs the servo read processing upon detecting that the servo gate is asserted, and stops the servo read processing upon detecting that the servo gate is negated. The gate detection unit 410 may be in the HDC 50 or the MPU 60.

The HDC 50 includes a gate generation unit 510. The gate generation unit 510 generates various gates, for example, a write gate, a read gate, a servo gate, and the like to the R/W channel 40 according to a command from the host 100 or an instruction from the MPU 60, and outputs the gates to the gate detection unit 410 for example. Hereinafter, "raising a particular gate" may be referred to as "asserting a particular gate". Furthermore, "lowering the particular gate" may be referred to as "negating the particular gate". Furthermore, "asserting a particular gate" or "negating a particular gate" may also include the meaning of "generating a particular gate". The gate generation unit 510 may be included in the R/W channel 40 or the MPU 60.

For example, the gate generation unit 510 generates a normal servo gate and outputs the normal servo gate to the gate detection unit 410. For example, the gate generation unit 510 generates a plurality of normal servo gates and outputs the plurality of normal servo gates to the gate detection unit 410.

For example, when the short servo mode is ON, the gate generation unit 510 generates a normal servo gate and a short servo gate, and outputs the normal servo gate and the short servo gate to the gate detection unit 410.

For example, when the short servo mode is OFF, the gate generation unit 510 generates a normal servo gate and outputs the normal servo gate to the gate detection unit 410. For example, when the short servo mode is OFF, the gate generation unit 510 generates a plurality of normal servo gates and outputs the plurality of normal servo gates to the gate detection unit 410.

FIG. 15 is a diagram illustrating an example of normal servo read processing. FIG. 15 illustrates a normal servo sector NSV1. FIG. 15 illustrates a normal servo gate for demodulating all servo data written to the normal servo sector NSV1. In FIG. 15, the normal servo gate is asserted at a start timing T151 corresponding to the leading end of the preamble and negated at an end timing T152 corresponding to the trailing end of the postcode.

The gate detection unit 410 asserts the normal servo gate at the start timing T151 to start servo reading on the normal servo sector NSV1, reads and demodulates the servo mark, the gray code, the PAD, the N burst, the Q burst, and the postcode in this order, and terminates the servo reading on the normal servo sector NSV1 at the end timing T152 at which the postcode is read.

FIG. 16 is a diagram illustrating an example of normal servo read processing. FIG. 16 illustrates a normal servo sector NSV2. FIG. 16 illustrates a normal servo gate for demodulating all servo data in the normal servo sector NSV2. In FIG. 16, the normal servo gate is asserted at a start timing T161 corresponding to the leading end of the preamble and negated at an end timing T162 corresponding to the trailing end of the postcode.

The gate detection unit 410 asserts the normal servo gate at the start timing T161 to start servo reading on the normal servo sector NSV2, reads and demodulates the servo mark, the gray code, the PAD, the N burst, the Q burst, the additional pattern, and the postcode in this order, and terminates the servo reading on the normal servo sector NSV2 at the end timing T162 at which the postcode is read.

FIG. 17 is a diagram illustrating an example of short servo processing. FIG. 17 illustrates a short servo sector SSV. FIG. 17 illustrates a short servo gate for demodulating the burst data and the additional pattern of the short servo sector SSV. In FIG. 17, the short servo gate is asserted at a start timing T171 corresponding to the leading end of the N burst and negated at an end timing T172 corresponding to the trailing end of the additional pattern.

Based on the preamble, the servo mark, the gray code, and the like of the normal servo sector read immediately before, the gate detection unit 410 starts the servo reading on the short servo sector SSV by asserting the short servo gate at the start timing T171, reads and demodulates the N burst, the Q burst, and the additional pattern in this order, and terminates the servo reading of the short servo sector SSV at the end timing T172 when the additional pattern is read.

The MPU 60 includes a read/write control unit 610, a servo pattern management unit 620, and the like. The MPU 60 performs processing of the units that are, for example, the read/write control unit 610, the servo pattern management unit 620, and the like, on firmware. The MPU 60 may include the units that are, for example, the read/write control unit 610, the servo pattern management unit 620, and the like as a circuit. The read/write control unit 610, the servo pattern management unit 620, and the like may be included in the R/W channel 40, the HDC 50, or the like.

The read/write control unit 610 controls read processing of reading data from the disk 10 and write processing of writing data to the disk 10 according to a command or the like from the host 100. The read/write control unit 610 controls the VCM 14 via the driver IC 20, positions the head 15 at a particular position on the disk 10, and performs read processing or write processing.

For example, the read/write control unit 610 performs the write processing under a conventional magnetic recording (CMR) mode in which data is written to (or read from) a particular track, another track (hereinafter, may be referred to as an adjacent track), or another sector (hereinafter, may be referred to as an adjacent sector) that are separated from the particular sector by a particular gap in the radial direction. The "adjacent track" includes a "track adjacent to the particular track in the outward direction", a "track adjacent to the particular track in the inward direction", and a "plurality of tracks adjacent to the particular track in the outward direction and in the inward direction". The "adjacent sector" includes a "sector adjacent to the particular sector in the outward direction", a "sector adjacent to the particular sector in the inward direction", and a "plurality of sectors adjacent to the particular sector in the outward direction and the inward direction". Hereinafter, "writing data under the conventional recording mode" may be referred to as "conventional recording", "performing conventional recording processing", or simply "writing".

Furthermore, the read/write control unit 610 performs write processing under a shingled recording (Shingled write magnetic recording (SMR) or Shingled Write Recording (SWR)) mode of sequentially writing a plurality of tracks with the subsequently written track overwritten on a part of the previously written track in the radial direction. Hereinafter, "writing data under the shingled recording mode" may be referred to as "shingled recording", "performing shingled recording processing", or simply "writing".

The read/write control unit 610 performs the conventional recording processing or the shingled recording processing in accordance with a command from the host 100 or the like. The read/write control unit 610 performs the write processing under a recording mode (hereinafter, may be referred to as a hybrid recording mode) in which the conventional recording processing and the shingled recording processing is selected according to a command from the host 100 or the like. Hereinafter, "writing data under the hybrid recording mode" may be referred to as "hybrid recording", "performing hybrid recording processing", or simply "writing". Note that the read/write control unit 610 may be configured to perform the conventional recording processing only or may be configured to execute the shingled recording processing only.

For example, the read/write control unit 610 performs only the conventional recording processing on a region with low format efficiency. For example, the read/write control unit 610 performs only the conventional recording processing on the zone servo boundary ZB. In other words, the read/write control unit 610 does not execute the hybrid recording processing on the zone servo boundary ZB.

For example, the read/write control unit 610 performs only the shingled recording processing on a region with low format efficiency. For example, the read/write control unit 610 performs only the shingled recording processing on the zone servo boundary ZB. In other words, the read/write control unit 610 does not execute the hybrid recording processing on the zone servo boundary ZB.

Figure 18:
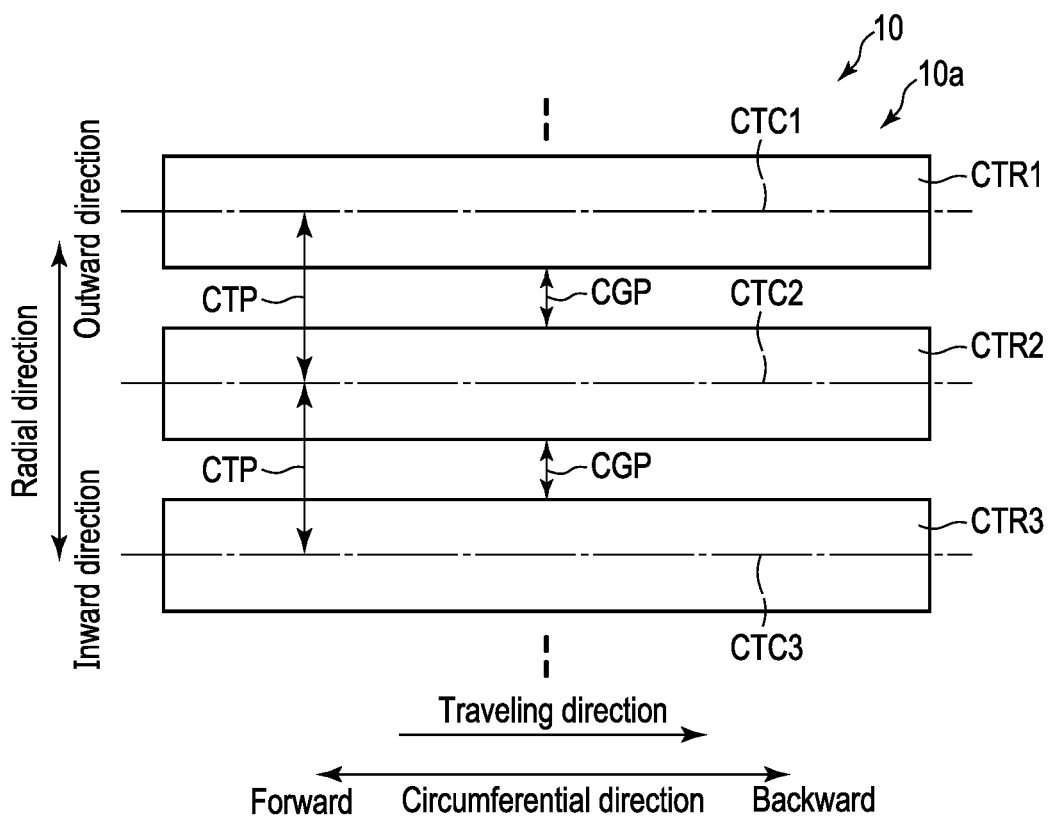
FIG. 18 is a schematic diagram illustrating an example of conventional recording processing.

FIG. 18 is a schematic diagram illustrating an example of the conventional recording processing. FIG. 18 illustrates tracks CTR1, CTR2, and CTR3. In FIG. 18, for example, the track widths of the tracks CTR1, CTR2, and CTR3 are the same. Note that the track width may be different among the tracks CTR1 to CTR3. FIG. 18 illustrates a track center CTC1 of the track CTR1, a track center CTC2 of the track CTR2, and a track center CTC3 of the track CTR3. In the example illustrated in FIG. 18, the tracks CTR1 and CTR2 are written at a track pitch CTP. The tracks CTR2 and CTR3 are written at the track pitch CTP. The track center CTC1 of the track CTR1 and the track center CTC2 of the track CTR2 are separated from each other by the track pitch CTP. The track center CTC2 of the track CTR2 and the track center CTC3 of the track CTR3 are separated from each other by the track pitch CTP. The track pitch between the tracks CTR1 and CTR2 and the track pitch between the tracks CTR2 and CTR3 may be the same or different from each other. The track CTR1 and the track CTR2 are separated from each other by a gap CGP. The track CTR2 and the track CTR3 are separated from each other by the gap CGP. The gap between the tracks CTR1 and CTR2 and the gap between the tracks CTR2 and CTR3 may be the same or different from each other. In FIG. 18, each track is illustrated in a rectangular shape extending in the circumferential direction with a particular track width, but this is for convenience of description, and the track is actually curved along the circumferential direction. In addition, each track may have a wave shape extending in the circumferential direction while varying in the radial direction.

In the example illustrated in FIG. 18, the read/write control unit 610 positions the head 15 in the track center CTC1 at a particular region of the disk 10 that is, for example, the user data region 10a, and performs the conventional recording of the track CTR1 or a particular sector of the track CTR1. In the user data region 10a, the read/write control unit 610 positions the head 15 at the track center CTC2 separated from the track center CTC1 of the track CTR1 in the inward direction by the track pitch CTP, and performs the conventional recording of the track CTR2 or a particular sector of the track CTR2.

In the user data region 10a, the read/write control unit 610 positions the head 15 at the track center CTC3 separated from the track center CTC2 of the track CTR2 in the inward direction by the track pitch CTP, and performs the conventional recording of the track CTR3 or a particular sector of the track CTR3.

The read/write control unit 610 may perform the conventional recording of the tracks CTR1, CTR2, and CTR3 sequentially in a particular region of the disk 10 that is, for example, the user data region 10a, or may perform the conventional recording of the tracks CTR1, CTR2, and CTR3 randomly in a particular sector of the track CTR1, a particular sector of the track CTR2, and a particular sector of the track CTR3.

Figure 19:
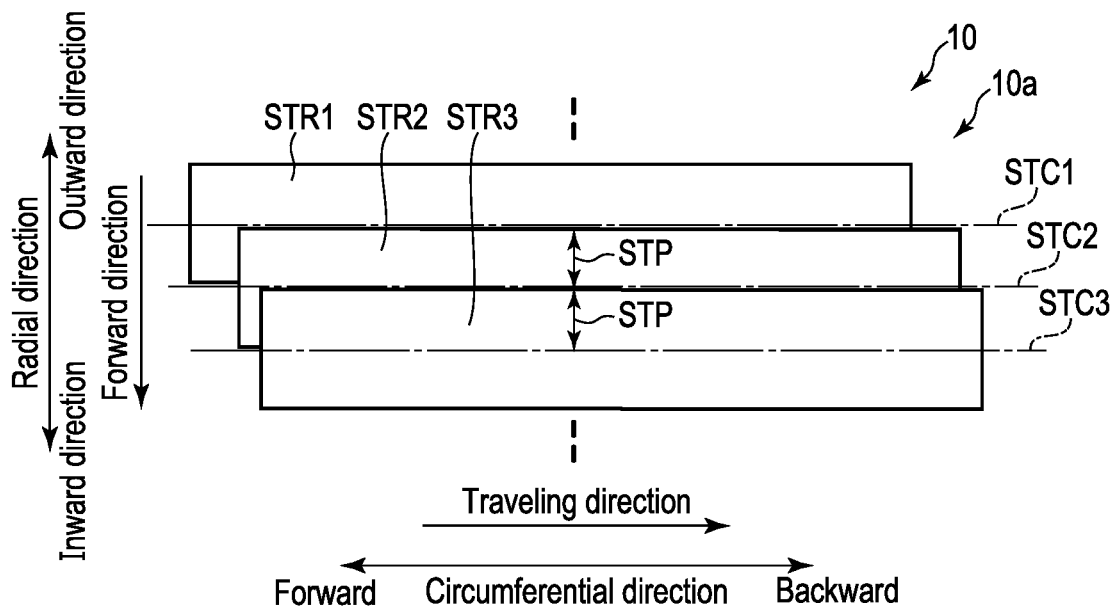
FIG. 19 is a schematic diagram illustrating an example of shingled recording processing.

FIG. 19 is a schematic diagram illustrating an example of the shingled recording processing. FIG. 19 illustrates a forward direction. A direction in which the shingled recording is performed for a plurality of tracks continuously in the radial direction, that is, a direction in which a track to be written next is overlapped with the previously written track written in the radial direction may be referred to as a forward direction. In FIG. 19, the inward direction in the radial direction is the forward direction, but the forward direction may be the outward direction in the radial direction. FIG. 19 illustrates a plurality of tracks STR1, STR2, and STR3 continuously overwritten to one direction in the radial direction. Hereinafter, in the shingled recording, a region in which data is written by the write head 15W may be referred to as a write track, and a remaining region, other than a region in which another write track is overwritten to a particular track may be referred to as a read track. FIG. 19 illustrates a track center STC1 of the track STR1 with no other track overwritten, a track center STC2 of the track STR2 with no other track overwritten, and a track center STC3 of the track STR3 with no other track overwritten. In the example illustrated in FIG. 19, the tracks STR1 and STR2 are written at a track pitch STP. The tracks STR2 and STR3 are written at the track pitch STP. The track center STC1 of the track (or write track) STR1 and the track center STC2 of the track (or write track) STR2 are separated from each other by the track pitch STP. The track center STC2 of the track STR2 and the track center STC3 of the track STR3 are separated from each other by the track pitch STP. The track pitch between the tracks STR1 and STR2 and the track pitch between the tracks STR2 and STR3 may be the same or different from each other. In FIG. 19, the width, in the radial direction, of a region (read track) in which the track STR2 is not overwritten to the track STR1 and the width, in the radial direction, of a region (read track) in which the track STR3 is not overwritten to the track STR2 are the same. Note that the width, in the radial direction, of a region (read track) in which the track STR2 is not overwritten to the track STR1 and the width, in the radial direction, of a region (read track) in which the track STR3 is not overwritten to the track STR2 may be different from each other. In FIG. 19, each track is illustrated in a rectangular shape extending in the circumferential direction with a particular track width, but this is for convenience of description, and the track is actually curved along the circumferential direction. In addition, each track may have a wave shape extending in the circumferential direction while varying in the radial direction. In FIG. 19, three tracks are overwritten, but less than three tracks or more than three tracks may be overwritten.

In the example illustrated in FIG. 19, the read/write control unit 610 performs sequential shingled recording of the tracks STR1 to STR3 in the inward direction. The read/write control unit 610 may perform sequential shingled recording of the tracks STR1 to STR3 in the outward direction. The read/write control unit 610 writes the track STR2 at the track pitch STP in the inward direction of the track STR1 and overwrites the track STR2 in a part of the track STR1 in the inward direction. The read/write control unit 610 writes the track STR3 at the track pitch STP in the inward direction of the track STR2 and overwrites the track STR3 in a part of the track STR2 in the inward direction. The read/write control unit 610 may write the track STR2 at the track pitch STP in the outward direction of the track STR1 and overwrites the track STR2 in a part of the track STR1 in the inward direction. The read/write control unit 610 may write the track STR3 at the track pitch STP in the outward direction of the track STR2 and overwrites the track STR3 in a part of the track STR2 in the inward direction.

The servo pattern management unit 620 manages servo patterns (or servo data). The servo pattern management unit 620 writes a servo pattern (or servo data) on the disk 10. Hereinafter, "writing a servo pattern" or "arranging a servo pattern" may be referred to as "servo writing". For example, the servo pattern management unit 620 writes a servo pattern (or servo data) on the disk 10 by means of Self Servo Write (SSW) based on the original servo pattern (or servo data).

The servo pattern management unit 620 writes a different servo pattern (or servo data) for each particular region. The servo pattern management unit 620 writes a servo pattern including a different postcode for each particular region. The servo pattern management unit 620 writes a servo pattern including a particular postcode for each particular region. The servo pattern management unit 620 writes a different postcode for each particular region. The servo pattern management unit 620 writes a particular postcode for each particular region. The servo pattern management unit 620 writes a postcode having a length shorter than a length of a postcode in a particular area, for example, which can improve format efficiency in a region with format efficiency lower than format efficiency of the particular region.

For example, the servo pattern management unit 620 writes, in this region, a servo pattern (or servo data) including a postcode corresponding to a write mode (such as, for example, the conventional recording mode, the shingled recording mode, or a hybrid recording mode) improving (or increasing) format efficiency of a particular region. For example, the servo pattern management unit 620 writes, in this region, a postcode corresponding to a write mode improving (or increasing) format efficiency of a particular region.

For example, the servo pattern management unit 620 writes, in this region, a servo pattern (servo data) including a postcode corresponding to a write mode most improving (or increasing) format efficiency of a particular region. For example, the servo pattern management unit 620 writes, in this region, a postcode corresponding to a write mode improving (or increasing) format efficiency of a particular region.

The servo pattern management unit 620 sets a different write mode for each particular region and writes a servo pattern including a postcode corresponding to the set write mode to each particular region. The servo pattern management unit 620 sets a particular write mode for each particular region and writes a servo pattern including a postcode corresponding to the set write mode to each particular region. The servo pattern management unit 620 sets a different write mode for each particular region and writes a postcode corresponding to the set write mode to each particular region. The servo pattern management unit 620 sets a particular write mode for each particular region and writes a postcode corresponding to the set write mode to each particular region.

For example, the servo pattern management unit 620 sets, for this region, a write mode improving (or increasing) format efficiency of a particular region, and writes a servo pattern (hereinafter, may be referred to as a high format efficiency pattern) including a postcode (hereinafter, may be referred to as a high format efficiency code) improving (or increasing) format efficiency of this region, among a plurality of postcodes corresponding to the write mode set for this region. For example, the servo pattern management unit 620 sets a write mode improving (or increasing) format efficiency of a particular region, and writes, to this region, a high format efficiency code improving (or increasing) format efficiency of this region, among a plurality of postcodes corresponding to the write mode thus set. For example, the high format efficiency code corresponds to a postcode having a length shorter than the length of the postcode in the other region.

For example, the servo pattern management unit 620 sets a write mode improving (or increasing) format efficiency of a particular region, and writes a servo pattern (hereinafter, may be referred to as a best format efficiency pattern) including a postcode (hereinafter, may be referred to as a best format efficiency code) most improving (or increasing) format efficiency of this region, among a plurality of postcodes corresponding to the write mode set. For example, the servo pattern management unit 620 sets a write mode improving (or increasing) format efficiency of a particular region, and writes, to this region, the best format efficiency code improving (or increasing) format efficiency of this region, among a plurality of postcodes corresponding to the write mode thus set. For example, the best format efficiency code corresponds to one of a plurality of postcodes that has the shortest length.

The servo pattern management unit 620 sets a region for which writing is performed under a different write mode for each particular region and writes a servo pattern including a postcode corresponding to the write mode to each particular region. The servo pattern management unit 620 sets a region for which writing is performed under a particular write mode for each particular region and writes a servo pattern including a postcode corresponding to the write mode to each particular region. The servo pattern management unit 620 sets a region for which writing is performed under a different write mode for each particular region and writes a postcode corresponding to the write mode to each particular region. The servo pattern management unit 620 sets a region for which writing is performed under a particular write mode for each particular region and writes a postcode corresponding to the write mode to each particular region.

For example, the servo pattern management unit 620 sets, as a particular region, a region for which writing is performed under a write mode improving (or increasing) format efficiency of a particular region, and writes a servo pattern (hereinafter, may be referred to as a high format efficiency pattern) including a postcode (hereinafter, may be referred to as a high format efficiency code) improving (or increasing) format efficiency of this region, among a plurality of postcodes corresponding to the write mode set for this region. For example, the servo pattern management unit 620 sets as a particular region, a region for which writing is performed under a write mode improving (or increasing) format efficiency, and writes, to this region, a high format efficiency code improving (or increasing) format efficiency of this region, among a plurality of postcodes corresponding to the write mode for this region.

For example, the servo pattern management unit 620 sets as a particular region, a region for which writing is performed under a write mode improving (or increasing) format efficiency for the particular region, and writes, to this region, the best format efficiency pattern including the best format efficiency code most improving (or increasing) format efficiency of this region, among a plurality of postcodes corresponding to the write mode for this region. For example, the servo pattern management unit 620 sets as a particular region, a region for which writing is performed under a write mode improving (or increasing) format efficiency of the particular region, and writes, to this region, the best format efficiency code improving (or increasing) format efficiency of this region, among a plurality of postcodes corresponding to the write mode for this region.

For example, the servo pattern management unit 620 stores, in a particular recording region such as, for example, the disk 10 or the nonvolatile memory 80: a servo pattern (hereinafter, may be referred to as a conventional recording mode servo pattern) including a postcode (hereinafter, may be referred to as a conventional recording mode postcode) for writing data under a conventional recording mode; a servo pattern (hereinafter, may be referred to as a shingled recording mode servo pattern) including a postcode (hereinafter, may be referred to as a shingled recording mode postcode) for writing data under a shingled recording mode; and a servo pattern (hereinafter, may be referred to as a hybrid recording mode servo pattern) including a postcode (hereinafter, may be referred to as a hybrid recording mode postcode) for writing data with one of the conventional recording mode and the shingled recording mode selected. The servo pattern management unit 620 may store at least one of the conventional recording mode servo pattern, the shingled recording mode servo pattern, and the hybrid recording mode servo pattern.

For example, the servo pattern management unit 620 sets, as a particular region, a region for which writing is performed under a write mode, among the conventional recording mode, the shingled recording mode, and the hybrid recording mode, improving (or increasing) format efficiency, and writes to this region, the high format efficiency pattern including the high format efficiency code improving (or increasing) the format efficiency of this region, among a plurality of postcodes corresponding to the write mode for which region including the conventional recording mode postcode, the shingled recording mode postcode, and the hybrid recording mode postcode for example.

For example, the servo pattern management unit 620 sets, as a particular region, a region for which writing is performed under a write mode, among the conventional recording mode, the shingled recording mode, and the hybrid recording mode, improving (or increasing) format efficiency, and writes to this region, the best format efficiency pattern including the best format efficiency code improving (or increasing) the format efficiency of this region, among a plurality of postcodes corresponding to the write mode for this region including the conventional recording mode postcode, the shingled recording mode postcode, and the hybrid recording mode postcode for example.

For example, the servo pattern management unit 620 stores in a particular recording region, such as, for example, the disk 10 or the nonvolatile memory 80, the conventional recording mode postcode, the shingled recording mode postcode, and the hybrid recording mode postcode. Note that the servo pattern management unit 620 may store at least one of the conventional recording mode postcode, the shingled recording mode postcode, and the hybrid recording mode postcode.

For example, the servo pattern management unit 620 sets, as a particular region, a region for which writing is performed under a write mode, among the conventional recording mode, the shingled recording mode, and the hybrid recording mode, improving (or increasing) format efficiency, and writes to this region, the high format efficiency code improving (or increasing) the format efficiency of this region, among a plurality of postcodes corresponding to the write mode for this region including, for example, the conventional recording mode postcode, the shingled recording mode postcode, and the hybrid recording mode postcode.

For example, the servo pattern management unit 620 sets a region for which writing is performed to this region under a write mode, among the conventional recording mode, the shingled recording mode, and the hybrid recording mode, improving (or increasing) format efficiency of a particular region, and writes to this region, the best format efficiency code improving (or increasing) the format efficiency of this region, among a plurality of postcodes corresponding to the write mode for this region including, for example, the conventional recording mode postcode, the shingled recording mode postcode, and the hybrid recording mode postcode.

The servo pattern management unit 620 sets the length of the zone servo gap based on the longest postcode among a plurality of postcodes to be written to the forward zone servo sector, writes a postcode corresponding to a write mode improving (or increasing) format efficiency of a zone data pattern in the forward zone servo sector, and writes a postcode corresponding to the write mode improving (or increasing) format efficiency of a zone data pattern in the back zone servo sector.

For example, the servo pattern management unit 620 sets a zone servo gap no resulting in the forward zone servo sector being overwritten by the back zone servo sector even when the longest postcode among the plurality of postcodes is written to the forward zone servo sector, writes a postcode corresponding to a write mode improving (or increasing) format efficiency of a zone data pattern in the forward zone servo sector, and writes a postcode corresponding to the write mode improving (or increasing) format efficiency of a zone data pattern in the back zone servo sector.

For example, the servo pattern management unit 620 sets as a particular zone data pattern for a region for which the writing is performed under a write mode, among the conventional recording mode, the shingled recording mode, and the hybrid recording mode, improving (or increasing) format efficiency, sets a zone servo gap not resulting in the forward zone servo sector being overwritten by the back zone servo sector even when the longest postcode among the plurality of postcodes is written to the forward zone servo sector, writes a postcode corresponding to a write mode improving (or increasing) format efficiency of a zone data pattern in the forward zone servo sector, and writes a postcode corresponding to the write mode improving (or increasing) format efficiency of a zone data pattern in the back zone servo sector.

The servo pattern management unit 620 sets the length of the zone servo gap based on the longest postcode among a plurality of postcodes to be written to the forward zone servo sector, writes a postcode corresponding to a write mode improving (or increasing) format efficiency of this zone data pattern in the forward zone servo sector, and writes a particular postcode in the back zone servo sector.

For example, the servo pattern management unit 620 sets a zone servo gap no resulting in the forward zone servo sector being overwritten by the back zone servo sector even when the longest postcode among the plurality of postcodes is written to the forward zone servo sector, sets the length of the zone servo gap, writes a postcode corresponding to a write mode improving (or increasing) format efficiency of a zone data pattern in the forward zone servo sector, and writes s particular postcode in the back zone servo sector.

For example, the servo pattern management unit 620 sets as a particular zone data pattern for a region for which the writing is performed under a write mode, among the conventional recording mode, the shingled recording mode, and the hybrid recording mode, improving (or increasing) format efficiency, sets a zone servo gap not resulting in the forward zone servo sector being overwritten by the back zone servo sector even when the longest postcode among the plurality of postcodes is written to the forward zone servo sector, writes a postcode corresponding to a write mode improving (or increasing) format efficiency of this zone data pattern in the forward zone servo sector, and writes a postcode in the back zone servo sector.

For example, the servo pattern management unit 620 selects and writes a postcode having a shorter length than other regions from a plurality of postcodes, in the forward zone servo sector in the zone data pattern.

Hereinafter, examples of a postcode corresponding to respective write modes will be described with reference to FIGS. 20A, 20B, 21A, 21B, 22A, 22B, 23A, 23B, 24A, 24B, 25A, 25B, 26A, and 26B.

Figure 20A:
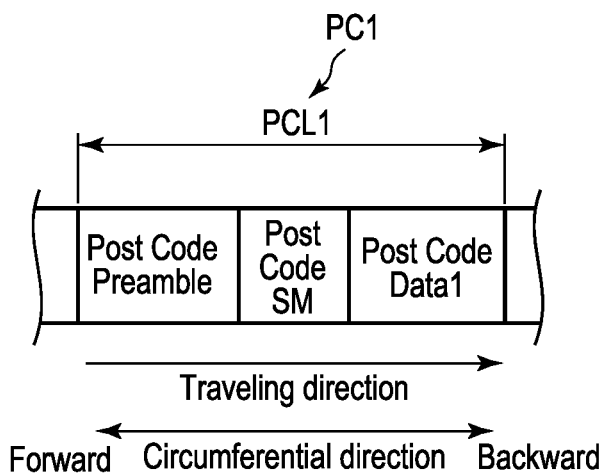
FIG. 20A is a schematic diagram illustrating an example of a conventional recording mode postcode according to the first embodiment.

FIG. 20A is a schematic diagram illustrating an example of a conventional recording mode postcode PC1 according to the present embodiment. FIG. 20A illustrates a length PCL1 of the conventional recording mode postcode (or postcode) PC1.

In the example illustrated in FIG. 20A, the conventional recording mode postcode PC1 includes a postcode preamble (PostCodePreamble), a postcode sync mark (PostCode SM), and postcode data 1 (Postcodedata 1). In the example illustrated in FIG. 20A, in the conventional recording mode postcode PC1, the postcode preamble (PostCodePreamble), the postcode sync mark (PostCode SM), and the postcode data 1 (Postcodedata 1) are continuously arranged in the traveling direction, in this described order. The conventional recording mode postcode PC1 is a postcode arranged in a servo sector used for write processing on a region for conventional recording (hereinafter, may be referred to as a conventional recording region), without being used for the short servo processing. The conventional recording mode postcode PC1 includes postcode data (hereinafter, may be referred to as next postcode data) used for an adjacent servo sector in the traveling direction. Hereinafter, the "servo sector adjacent to the particular servo sector in the traveling direction" may be referred to as a "next servo sector". The length (hereinafter, may be referred to as a data length or number of data bit) of the postcode data 1 is, for example, 15 bits.

For example, the servo pattern management unit 620 sets a particular region to be the conventional recording region, and writes the conventional recording mode postcode PC1 in a normal servo sector in this region. For example, the servo pattern management unit 620 sets the zone servo boundary ZB1 as the conventional recording region, and writes the conventional recording mode postcode PC1 in the normal servo sector SVS1 in the zone servo boundary ZB1, as the postcode X1. For example, the servo pattern management unit 620 sets the zone servo boundary ZB2 as the conventional recording region, and writes the conventional recording mode postcode PC1 in the normal servo sector SVS5 in the zone servo boundary ZB2, as the postcode X5. For example, the servo pattern management unit 620 sets the entire disk 10 as the conventional recording region, and writes the conventional recording mode postcode PC1 in each of the normal servo sectors SVS1, SVS3, SVS5, and SVS7 as the postcodes X1, X3, X5, and X7 in the entire disk 10.

Figure 20B:
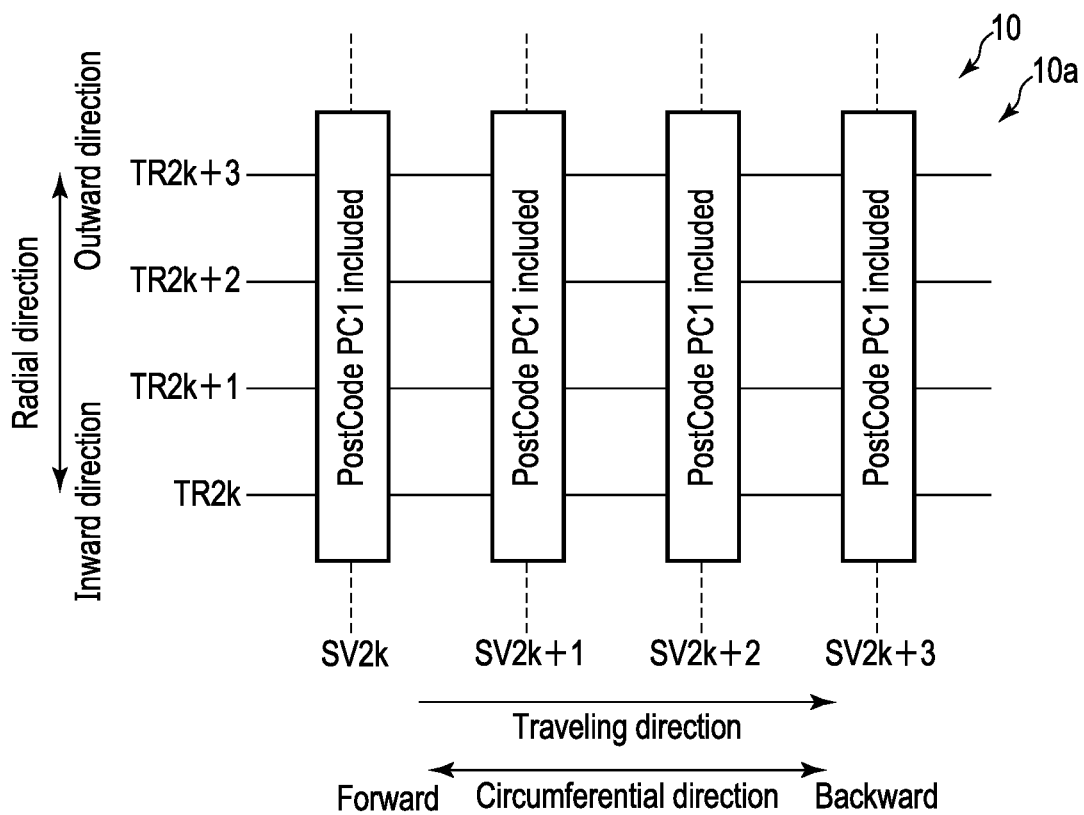
FIG. 20B is a schematic diagram illustrating an example of arrangement of the conventional recording mode postcode illustrated in FIG. 20A.

FIG. 20B is a schematic diagram illustrating an example of arrangement of the conventional recording mode postcode PC1 illustrated in FIG. 20A. FIG. 20B illustrates a track (even-numbered track) TR2$k$, a track (odd-numbered track) TR2$k$+1, a track (even-numbered track) TR2$k$+2, and a track (odd-numbered track) TR2$k$+3 which are continuously arranged in the radial direction. Here, k 1. In FIG. 20B, the tracks TR2$k$ to TR2$k$+3 are arranged in the described order in the outward direction. FIG. 20B illustrates a servo region (even-numbered servo region) SV2$k$, a servo region (odd-numbered servo region) SV2$k$+1, a servo region (even-numbered servo region) SV2$k$+2, and a servo region (odd-numbered servo region) SV2$k$+3. The servo regions SV2$k$ to SV2$k$+3 are arranged in the described order in the traveling direction. In FIG. 20B, the servo regions SV2$k$ to SV2$k$+3 correspond to normal servo regions. In FIG. 20B, the servo regions SV2$k$ to SV2$k$+3 include the postcodes PC1. The postcode PC1 of the servo region SV2$k$ has postcode data (next postcode data) of the servo region SV2$k$+1. The postcode PC1 of the servo region SV2$k$+1 has postcode data (next postcode data) of the servo region SV2$k$+2. The postcode PC1 of the servo region SV2$k$+2 has postcode data (next postcode data) of the servo region SV2$k$+3. Hereinafter, "the servo region adjacent to the particular servo region in the traveling direction" may be referred to as "next servo region", "the servo region adjacent to the next servo region in the traveling direction" may be referred to as "servo region after the next", and "the servo region adjacent to the servo region after the next in the traveling direction" may be referred to as "third subsequent servo region".

In the example illustrated in FIG. 20B, the servo pattern management unit 620 writes the postcode PC1 in each of the servo regions SV2$k$ to SV2$k$+3 of the tracks TR2$k$ to TR2$k$+3, in the conventional recording region of the disk 10.

Figure 21A:
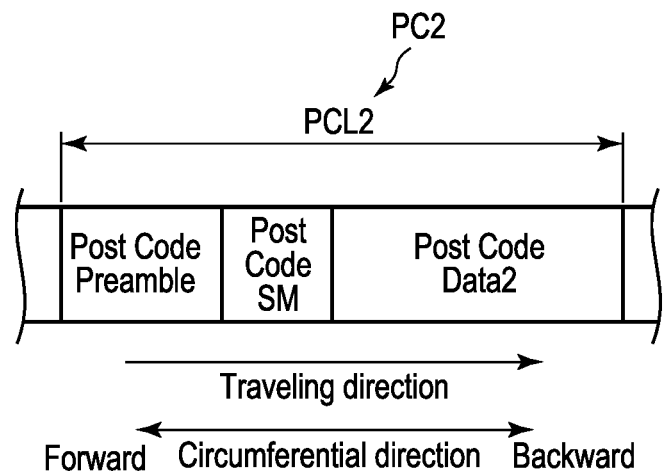
FIG. 21A is a schematic diagram illustrating an example of a conventional recording mode postcode according to the first embodiment.

FIG. 21A is a schematic diagram illustrating an example of a conventional recording mode postcode PC2 according to the present embodiment. FIG. 21A illustrates a length PCL2 of the conventional recording mode postcode (or postcode) PC2.

In the example illustrated in FIG. 21A, the conventional recording mode postcode PC2 includes a postcode preamble, a postcode sync mark, and postcode data 2. In the example illustrated in FIG. 21A, in the conventional recording mode postcode PC2, the postcode preamble, the postcode sync mark, and the postcode data 2 are continuously arranged in the traveling direction, in this described order. The conventional recording mode postcode PC2 is a postcode arranged in a servo sector used for write processing on a region for conventional recording and used for the short servo processing. The conventional recording mode postcode PC2 includes postcode data used in the next servo sector and postcode data (hereinafter, may be referred to as postcode data after the next) used for a servo sector adjacent to the next servo sector in the traveling direction. The data length of the postcode data 2 is, for example, 29 bits. A length PCL2 of the conventional recording mode postcode PC2 is longer than the length PCL1 of the conventional recording mode postcode PC1, for example. The length PCL2 of the conventional recording mode postcode PC2 is twice as long as the length PCL1 of the conventional recording mode postcode PC1, for example.

For example, the servo pattern management unit 620 sets a particular region to be the conventional recording region, and writes the conventional recording mode postcode PC2 in a normal servo sector in this region. For example, the servo pattern management unit 620 sets the zone servo boundary ZB1 as the conventional recording region, and writes the conventional recording mode postcode PC2 in the normal servo sector SVS1 in the zone servo boundary ZB1, as the postcode X1. For example, the servo pattern management unit 620 sets the zone servo boundary ZB2 as the conventional recording region, and writes the conventional recording mode postcode PC2 in the normal servo sector SVS5 in the zone servo boundary ZB2, as the postcode X5. For example, the servo pattern management unit 620 sets the entire disk 10 as the conventional recording region, and writes the conventional recording mode postcode PC2 in the normal servo sector SVS1, SVS3, SVS5, or SVS7 as the postcodes X1, X3, X5, and X7 in the entire disk 10.

Figure 21B:
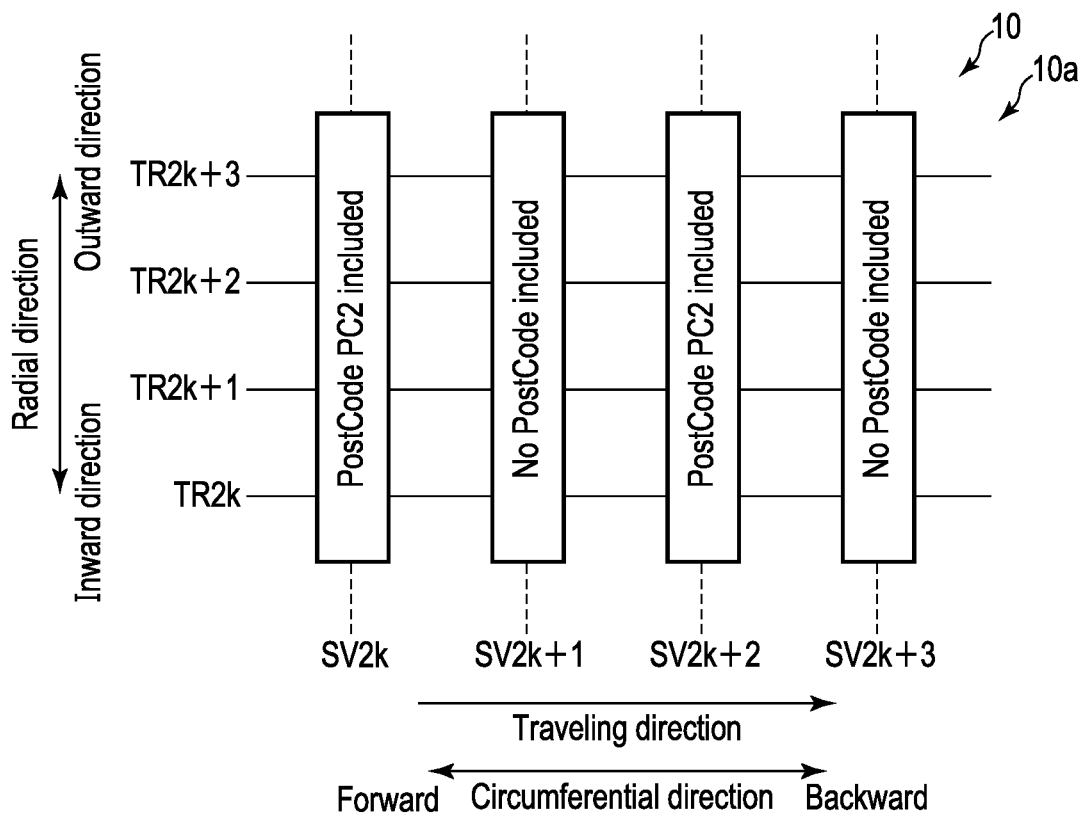
FIG. 21B is a schematic diagram illustrating an example of arrangement of the conventional recording mode postcode illustrated in FIG. 21A.

FIG. 21B is a schematic diagram illustrating an example of arrangement of the conventional recording mode postcode PC2 illustrated in FIG. 21A. In FIG. 21B, the servo regions SV2$k$ and SV2$k$+2 correspond to normal servo regions. In FIG. 21B, the servo regions SV2$k$+1 and SV2$k$+3 correspond to short servo regions. The servo regions SV2$k$ and SV2$k$+2 include the postcode PC2. The postcode PC2 of the servo region SV2$k$ includes postcode data (next postcode data) used in the servo region SV2$k$+1 and postcode data (postcode data after the next) of the servo region SV2$k$+2. The postcode PC2 of the servo region SV2$k$+2 includes postcode data (next postcode data) used in the servo region SV2$k$+3 and postcode data (postcode data after the next) used in the servo region subsequent to the servo region SV2$k$+3. The servo regions SV2$k$+1 and SV2$k$+3 do includes no postcode.

In the example illustrated in FIG. 21B, the servo pattern management unit 620 writes the postcode PC2 in each of the servo regions SV2$k$ and SV2$k$+2 of the tracks TR2$k$ to TR2$k$+3, in the conventional recording region of the disk 10. The servo pattern management unit 620 does not write the postcode in the servo regions SV2$k$+1 and SV2$k$+3 of the tracks TR2$k$ to TR2$k$+3 in the conventional recording region of the disk 10.

FIG. 22A is a schematic diagram illustrating an example of a conventional recording mode postcode PC3 according to the present embodiment. FIG. 22A illustrates a length PCL3 of the conventional recording mode postcode (or postcode) PC3.

In the example illustrated in FIG. 22A, the conventional recording mode postcode PC3 includes a postcode preamble, a postcode sync mark, and postcode data 3. In the example illustrated in FIG. 22A, in the conventional recording mode postcode PC3, the postcode preamble, the postcode sync mark, and the postcode data 3 are continuously arranged in the traveling direction, in this described order. The conventional recording mode postcode PC3 is a postcode arranged at a position adjacent, in the traveling direction, to the additional pattern in a servo sector used for read processing on a region for conventional recording and used for the short servo processing. The conventional recording mode postcode PC3 incudes postcode data (next postcode) to be used in the next servo sector and postcode data (postcode data after the next) to be used in the servo sector after the next. The data length of the postcode data 3 is, for example, 29 bits. The length PCL3 of the conventional recording mode postcode PC3 is the same as the length PCL2 of the conventional recording mode postcode PC2, for example. A length PCL3 of the conventional recording mode postcode PC3 is longer than the length PCL1 of the conventional recording mode postcode PC1, for example. The length PCL3 of the conventional recording mode postcode PC3 is twice as long as the length PCL1 of the conventional recording mode postcode PC1, for example.

For example, the servo pattern management unit 620 sets a particular region to be the conventional recording region, and writes the conventional recording mode postcode PC3 to the position adjacent, in the traveling direction, to the additional pattern of the short servo sector in this region, without overwriting on the additional pattern. For example, the servo pattern management unit 620 sets the entire disk 10 as the conventional recording region, and writes the conventional recording mode postcode PC3 in each of the short servo sectors SVS2, SVS4, SVS6, and SVS8 as the postcodes X2, X4, X6, and X8 in the entire disk 10.

FIG. 22B is a schematic diagram illustrating an example of arrangement of the conventional recording mode postcode PC3 illustrated in FIG. 22A. In FIG. 22B, the servo regions SV2$k$ and SV2$k$+2 correspond to normal servo regions. In FIG. 22B, the servo regions SV2$k$+1 and SV2$k$+3 correspond to short servo regions. The servo regions SV2$k$ and SV2$k$+2 include the postcode PC2. The postcode PC2 of the servo region SV2$k$ includes postcode data (next postcode data) used in the servo region SV2$k$+1 and postcode data (postcode data after the next) used in the servo region SV2$k$+2. The postcode PC2 of the servo region SV2$k$+2 includes postcode data (next postcode data) used in the servo region SV2$k$+3 and postcode data (postcode data after the next) used in the servo region subsequent to the servo region SV2$k$+3. The servo regions SV2$k$+1 and SV2$k$+3 include the additional pattern and the postcode PC3. The postcode PC3 of the servo region SV2$k$+1 includes postcode data used in the servo region SV2$k$+1 during the read processing and postcode data used in the servo region SV2$k$+2 during the read processing. The postcode PC3 of the servo region SV2$k$+3 includes postcode data (next postcode data) used in the servo region SV2$k$+3 during the read processing and postcode data used in the servo region after the next of the servo region SV2$k$+3 during the read processing.

In the example illustrated in FIG. 22B, the servo pattern management unit 620 writes the postcode PC2 in the servo regions SV2$k$ and SV2$k$+2 of the tracks TR2$k$ to TR2$k$+3, in the conventional recording region of the disk 10. In the example illustrated in FIG. 22B, the servo pattern management unit 620 writes the additional pattern and the postcode PC3 in the servo regions SV2$k$+1 and SV2$k$+3 of the tracks TR2$k$ to TR2$k$+3, in the conventional recording region of the disk 10.

Figure 23A:
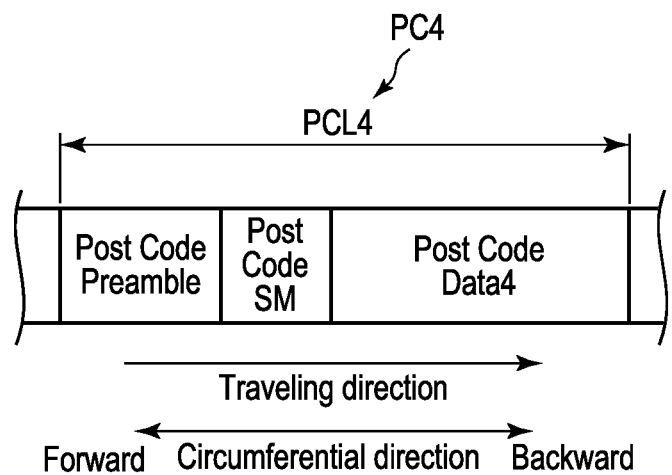
FIG. 23A is a schematic diagram illustrating an example of a shingled recording mode postcode according to the first embodiment.

FIG. 23A is a schematic diagram illustrating an example of a shingled recording mode postcode PC4 according to the present embodiment. FIG. 23A illustrates a length PCL4 of the shingled recording mode postcode (or postcode) PC4.

In the example illustrated in FIG. 23A, the shingled recording mode postcode PC4 includes a postcode preamble, a postcode sync mark, and postcode data 4. In the example illustrated in FIG. 23A, in the shingled recording mode postcode PC4, the postcode preamble, the postcode sync mark, and the postcode data 4 are continuously arranged in the traveling direction, in this described order. The shingled recording mode postcode PC4 is a postcode arranged in a servo sector used for write processing (and read processing) on a region for shingled recording (hereinafter, may be referred to as a shingled recording region), without being used for the short servo processing. The shingled recording mode postcode PC4 incudes postcode data to be used in the next servo sector and postcode data to be used in the servo sector after the next. The data length of the postcode data 4 is, for example, 30 bits. A length PCL4 of the shingled recording mode postcode PC4 is longer than the length PCL1 of the conventional recording mode postcode PC1, for example. The length PCL4 of the shingled recording mode postcode PC4 is twice as long as the length PCL1 of the conventional recording mode postcode PC1, for example.

For example, the servo pattern management unit 620 sets a particular region to be the shingled recording region, and writes the shingled recording mode postcode PC4 in a normal servo sector in this region. For example, the servo pattern management unit 620 sets the zone servo boundary ZB1 as the shingled recording region, and writes the shingled recording mode postcode PC4 in the normal servo sector SVS1 in the zone servo boundary ZB1, as the postcode X1. For example, the servo pattern management unit 620 sets the zone servo boundary ZB2 as the shingled recording region, and writes the shingled recording mode postcode PC4 in the normal servo sector SVS5 in the zone servo boundary ZB2, as the postcode X5. For example, the servo pattern management unit 620 sets the entire disk 10 as the conventional recording region, and writes the shingled recording mode postcode PC4 in each of the normal servo sectors SVS1, SVS3, SVS5, and SVS7 as the postcodes X1, X3, X5, and X7 in the entire disk 10.

Figure 23B:
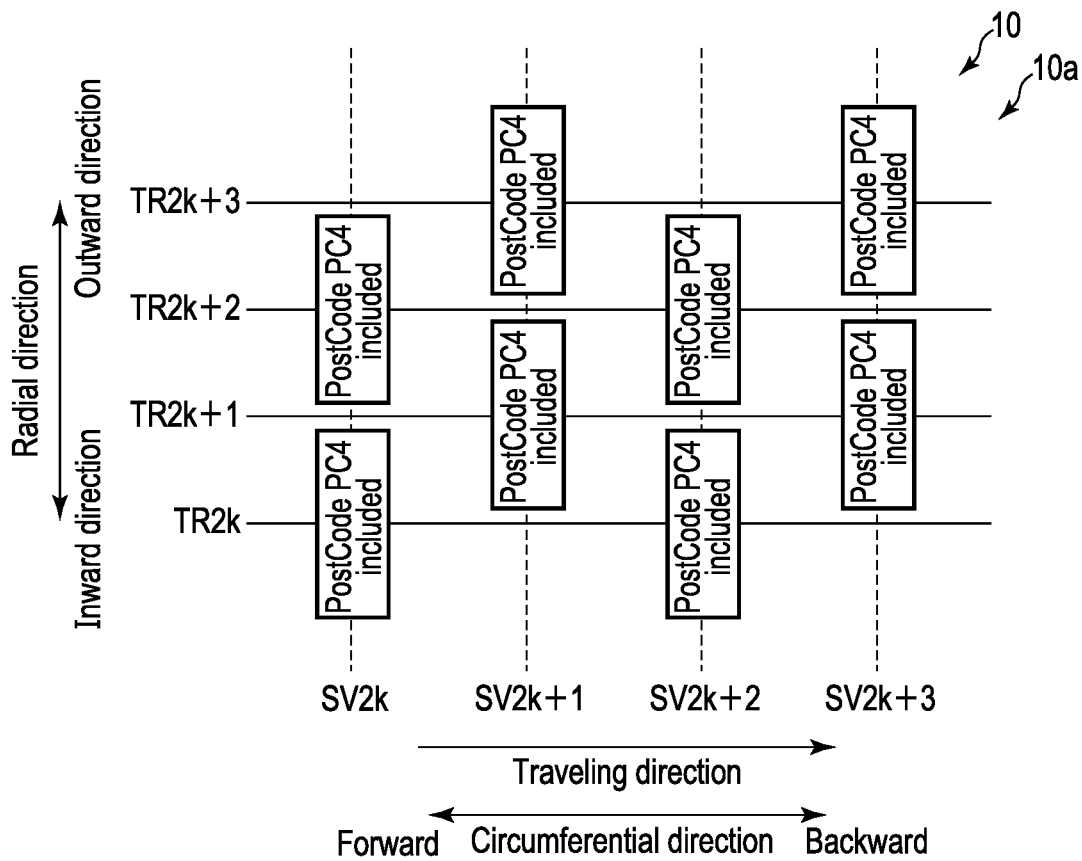
FIG. 23B is a schematic diagram illustrating an example of arrangement of the shingled recording mode postcode illustrated in FIG. 23A.

FIG. 23B is a schematic diagram illustrating an example of the arrangement of the shingled recording mode postcode PC4 illustrated in FIG. 23A. In FIG. 23B, the servo regions SV2$k$ to SV2$k$+3 correspond to normal servo regions. In FIG. 23B, the servo regions SV2$k$ to SV2$k$+3 each include a plurality of the postcodes PC4. In the servo regions SV2$k$ to SV2$k$+3, the plurality of postcodes PC4 are arranged in a zigzag form. The tracks TR2$k$ and TR2$k$+2 of the servo region SV2$k$ includes the postcodes PC4 used for write processing. The tracks TR2$k$+1 and TR2$k$+3 of the servo region SV2$k$+1 includes the postcodes PC4 used for write processing. The tracks TR2$k$ and TR2$k$+2 of the servo region SV2$k$+2 includes the postcodes PC4 used for write processing. The tracks TR2$k$+1 and TR2$k$+3 of the servo region SV2$k$+3 includes the postcodes PC4 used for write processing.

In the example illustrated in FIG. 23B, the servo pattern management unit 620 writes the postcode PC4, used for the write processing, in the servo regions SV2$k$ and SV2$k$+2 of the tracks TR2$k$ to TR2$k$+2, in the shingled recording region of the disk 10. The servo pattern management unit 620 writes the postcode PC4, used for the write processing, in the servo regions SV2$k$+1 and SV2$k$+3 of the tracks TR2$k$+1 to TR2$k$+3, in the shingled recording region of the disk 10.

As illustrated in FIG. 23B, since the data track pitch is narrow (or Track Per Inch (TPI) is large) in the shingled recording region where the shingled recording has been performed, the postcodes of the plurality of servo regions SV are arranged in a zigzag form in two adjacent tracks, so that the read offset margin (for example, a range in which a postcode can be read without an error) of the postcode can be secured. For example, one postcode is arranged in every two data track pitches in the radial direction in one servo region SV, and is arranged in every other servo region of the plurality of servo regions SV continuously arranged side by side in the circumferential direction.

Figure 24A:
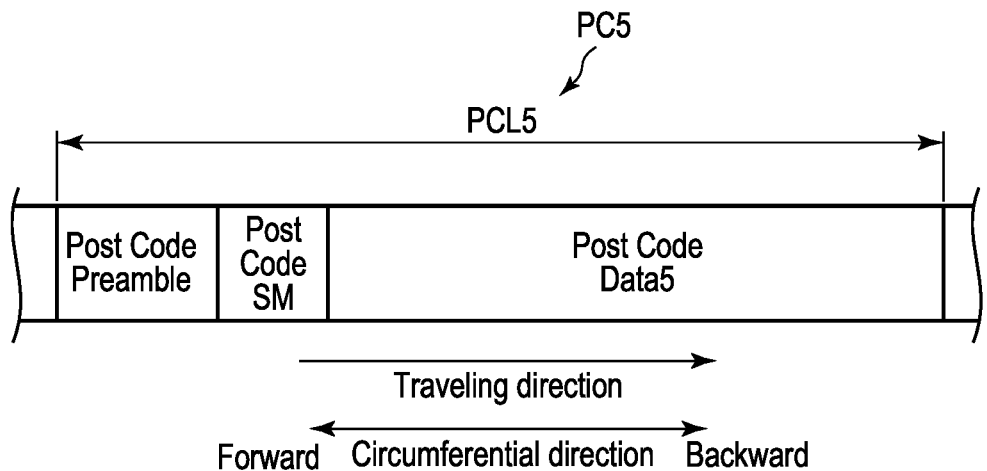
FIG. 24A is a schematic diagram illustrating an example of a shingled recording mode postcode according to the first embodiment.

FIG. 24A is a schematic diagram illustrating an example of a shingled recording mode postcode PC5 according to the present embodiment. FIG. 24A illustrates a length PCL5 of the shingled recording mode postcode (or postcode) PC5.

In the example illustrated in FIG. 24A, the shingled recording mode postcode PC5 includes a postcode preamble, a postcode sync mark, and postcode data 5. In the example illustrated in FIG. 24A, in the shingled recording mode postcode PC5, the postcode preamble, the postcode sync mark, and the postcode data 5 are continuously arranged in the traveling direction, in this described order. The shingled recording mode postcode PC5 is a postcode arranged in a servo sector used for write processing on a shingled recording region and used for the short servo processing. The shingled recording mode postcode PC5 includes postcode data (also referred to as next postcode data) used in the next servo sector, postcode data (postcode data after the next) used in the next servo sector, postcode data (hereinafter, may be referred to as third subsequent postcode) used in a servo sector (hereinafter, may be referred to as the third subsequent postcode data) adjacent to the servo sector after the next in the traveling direction, and postcode data (hereinafter, may be referred to the fourth subsequent postcode data) used in a servo sector (hereinafter, may be referred to as the fourth subsequent servo sector) adjacent to the third subsequent servo sector in the traveling direction. The data length of the postcode data 5 is, for example, 58 bits. A length PCL5 of the shingled recording mode postcode PC5 is longer than the length PCL1 of the conventional recording mode postcode PC1, for example. The length PCL5 of the shingled recording mode postcode PC5 is four times as long as the length PCL1 of the conventional recording mode postcode PC1, for example.

For example, the servo pattern management unit 620 sets a particular region to be the shingled recording region, and writes the shingled recording mode postcode PC5 in a normal servo sector in this region. For example, the servo pattern management unit 620 sets the zone servo boundary ZB1 as the shingled recording region, and writes the shingled recording mode postcode PC5 in the normal servo sector SVS1 in the zone servo boundary ZB1, as the postcode X1. For example, the servo pattern management unit 620 sets the zone servo boundary ZB2 as the shingled recording region, and writes the shingled recording mode postcode PC5 in the normal servo sector SVS5 in the servo boundary ZB2, as the postcode X5. For example, the servo pattern management unit 620 sets the entire disk 10 as the shingled recording region, and writes the shingled recording mode postcode PC5 in each of the normal servo sectors SVS1, SVS3, SVS5, and SVS7 as the postcodes X1, X3, X5, and X7 in the entire disk 10.

Figure 24B:
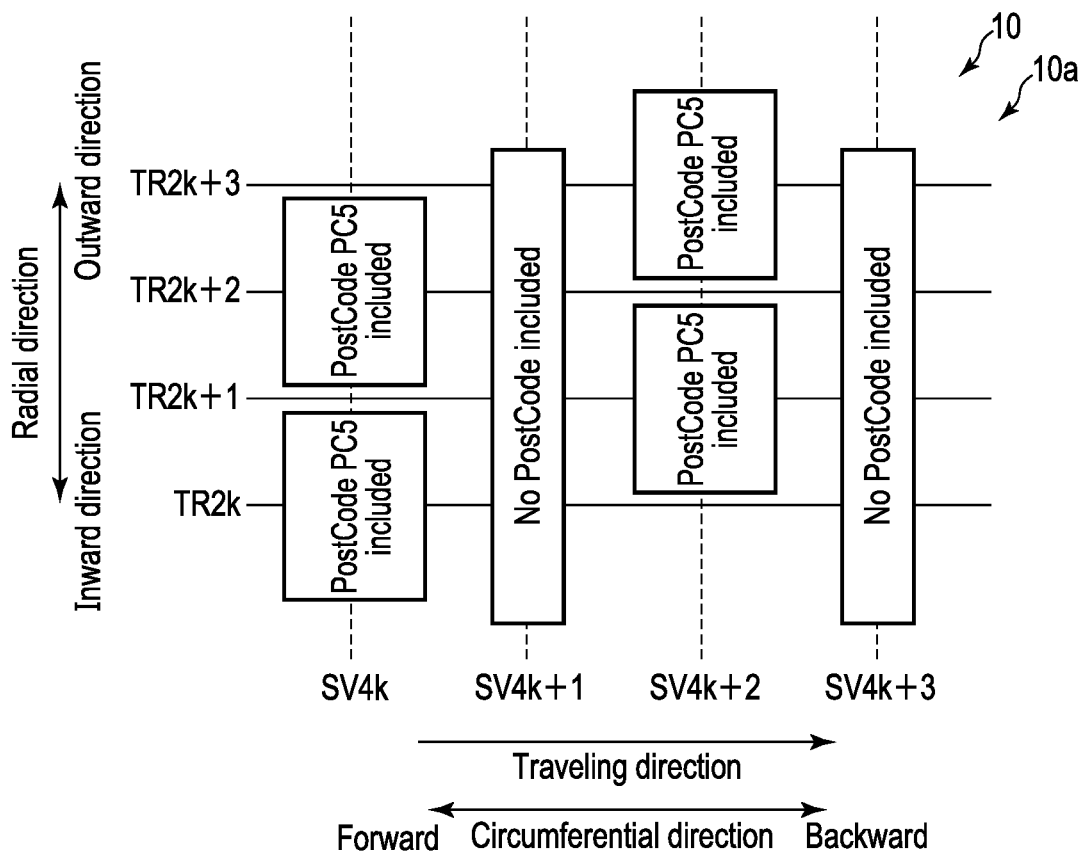
FIG. 24B is a schematic diagram illustrating an example of arrangement of the shingled recording mode postcode illustrated in FIG. 24A.

FIG. 24B is a schematic diagram illustrating an example of the arrangement of the shingled recording mode postcode PC5 illustrated in FIG. 24A. FIG. 24B illustrates a servo region (even-numbered servo region) SV4$k$, a servo region (odd-numbered servo region) SV4$k$+1, a servo region (even-numbered servo region) SV4$k$+2, and a servo region (odd-numbered servo region) SV4$k$+3. The servo regions SV4$k$ to SV4$k$+3 are arranged in the described order in the traveling direction. In FIG. 24B, the servo regions SV4$k$ and SV4$k$+2 correspond to normal servo regions. In FIG. 24B, the servo regions SV4$k$+1 and SV4$k$+3 correspond to short servo regions. The servo regions SV4$k$ and SV4$k$+2 include the postcode PC5. The postcode PC5 of the servo region SV4$k$ includes postcode data used in the servo region SV4$k$+1, postcode data used in the servo region SV4$k$+2, postcode data used in the servo region SV4$k$+3, and postcode data (fourth subsequent postcode data) used in the servo region subsequent to the servo region SV4$k$+3. The postcode PC5 of the servo region SV4$k$+2 includes postcode data used in the servo region SV4$k$+3, postcode data used in a servo region subsequent to the servo region SV4$k$+3, postcode data used in the servo after the next from the servo region SV4$k$+3, and postcode data used in the third subsequent servo region from the servo region SV4$k$+3. The servo regions SV4$k$+1 and SV4$k$+3 do not include a postcode.

In the example illustrated in FIG. 24B, the servo pattern management unit 620 writes the postcode PC5 in the servo regions SV4$k$ and SV4$k$+2 of the tracks TR2$k$ and TR2$k$+3, in the shingled recording region of the disk 10. The servo pattern management unit 620 does not write the postcode in the servo regions SV2$k$+1 and SV2$k$+3 of the tracks TR2$k$ to TR2$k$+3 in the shingled recording region of the disk 10.

FIG. 25A is a schematic diagram illustrating an example of a hybrid recording mode postcode PC6 according to the present embodiment. FIG. 25A illustrates a length PCL6 of the hybrid recording mode postcode (or postcode) PC6.

In the example illustrated in FIG. 25A, the hybrid recording mode postcode PC6 includes the conventional recording mode postcode PC1 and the shingled recording mode postcode PC4. In the hybrid recording mode postcode PC6, the shingled recording mode postcode PC4 is adjacent to the conventional recording mode postcode PC1 in the traveling direction. In the hybrid recording mode postcode PC6, the conventional recording mode postcode PC1 and the shingled recording mode postcode PC4 may be arranged with a gap provided in between in the circumferential direction. The hybrid recording mode postcode PC6 for the hybrid recording mode includes a postcode preamble, a postcode sync mark, postcode data 1, a postcode preamble, a postcode sync mark, and postcode data 4. In the example illustrated in FIG. 25A, in the shingled recording mode postcode PC4, the postcode preamble, the postcode sync mark, the postcode data 1, the postcode preamble, the postcode sync mark, and the postcode data 4 are continuously arranged in the traveling direction, in this described order. The hybrid recording mode postcode PC6 is a postcode arranged in a servo sector used for write processing on a region for hybrid recording (hereinafter, may be referred to as a hybrid recording region), without being used for the short servo processing. The data length of the hybrid recording mode postcode data PC6 is, for example, 45 bits. The data length of the hybrid recording mode postcode data PC6 corresponds to the sum of the data length of the conventional recording mode postcode PC1 and the data length of the shingled recording mode postcode PC4. The length PCL6 of the hybrid recording mode postcode data PC6 corresponds to, for example, the sum of the length PCL1 of the conventional recording mode postcode PC1 and the length PCL4 of the shingled recording mode postcode PC4. The length PCL6 of the hybrid recording mode postcode data PC6 is three times as long as the length PCL1 of the conventional recording mode postcode PC1, for example.

For example, the servo pattern management unit 620 sets a particular region to be the hybrid recording region, and writes the hybrid recording mode postcode PC6 in a normal servo sector in this region. For example, the servo pattern management unit 620 sets a particular region of the disk 10 to be the hybrid recording region, and writes the hybrid recording mode postcode PC6 in the normal servo sectors SVS3 and SVS7, as the postcodes X3 and X7, in the particular region of the disk 10.

Figure 25B:
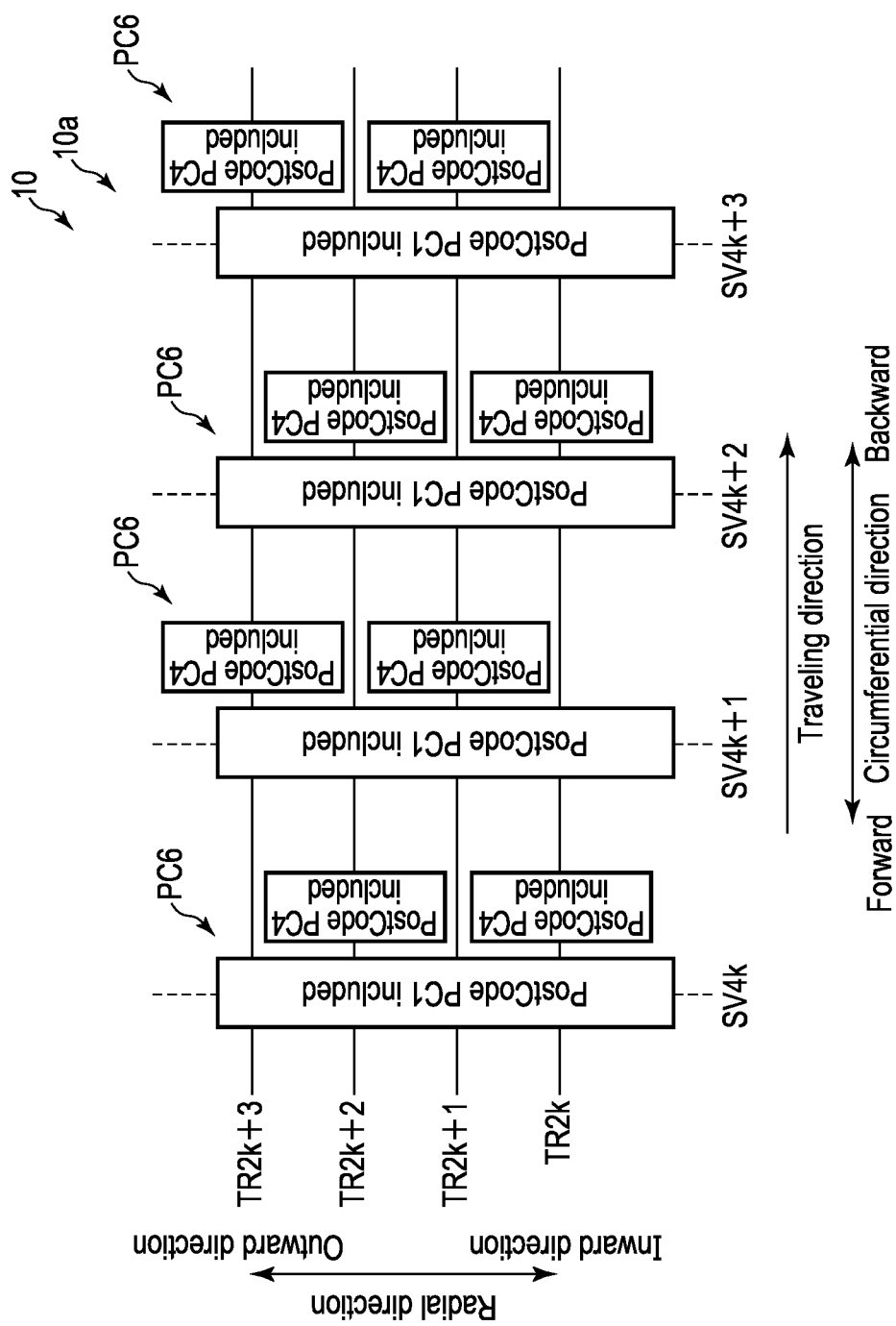
FIG. 25B is a schematic diagram illustrating an example of the arrangement of the hybrid recording mode postcode illustrated in FIG. 25A.

FIG. 25B is a schematic diagram illustrating an example of the arrangement of the hybrid recording mode postcode PC6 illustrated in FIG. 25A. In FIG. 25B, the servo regions SV4$k$ to SV4$k$+3 correspond to normal servo regions. In FIG. 25B, the servo regions SV4$k$ to SV4$k$+3 include the postcodes PC6. The tracks TR2$k$ to TR2$k$+3 of the servo region SV4$k$ have the postcode PC1. The tracks TR2$k$ and TR2$k$+2 of the servo region SV4$k$ have the postcode PC4. The tracks TR2$k$ to TR2$k$+3 of the servo region SV4$k$+1 have the postcode PC1. The tracks TR2$k$+1 and TR2$k$+3 of the servo region SV4$k$+1 have the postcode PC4. The tracks TR2$k$ to TR2$k$+3 of the servo region SV4$k$+2 have the postcode PC1. The tracks TR2$k$ and TR2$k$+2 of the servo region SV4$k$+2 have the postcode PC4. The tracks TR2$k$ to TR2$k$+3 of the servo region SV4$k$+3 have the postcode PC1. The tracks TR2$k$+1 and TR2$k$+3 of the servo region SV4$k$+3 have the postcode PC4. Although not illustrated in the drawings, the data track from which the postcode PC1 is read and the data track from which the postcode PC4 is read may be different.

In the example illustrated in FIG. 25B, the servo pattern management unit 620 writes the postcode PC1 in the servo regions SV4$k$ and SV4$k$+2 of the tracks TR2$k$ to TR2$k$+3, in the hybrid recording region of the disk 10. The servo pattern management unit 620 writes the postcode PC4 in the servo regions SV4$k$ and SV4$k$+2 of the track TR2$k$ and the track $k$+2 in the hybrid recording region of the disk 10.

In the example illustrated in FIG. 25B, the servo pattern management unit 620 writes the postcode PC1 in the servo regions SV4$k$+1 and 4$k$+3 of the tracks TR2$k$ to TR2$k$+3, in the hybrid recording region of the disk 10. The servo pattern management unit 620 writes the postcode PC4 in the servo regions SV4$k$+1 and SV4$k$+3 of the track TR2$k$+1 and the track $k$+3 in the hybrid recording region of the disk 10.

Figure 26A:
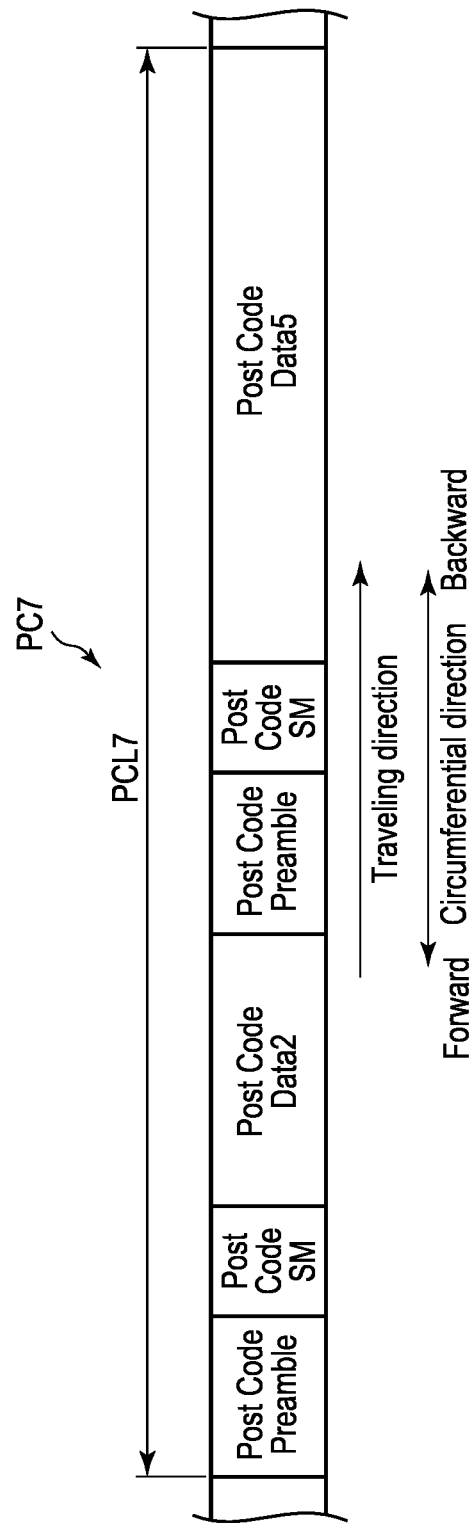
FIG. 26A is a schematic diagram illustrating an example of a hybrid recording mode postcode according to the first embodiment.

FIG. 26A is a schematic diagram illustrating an example of a hybrid recording mode postcode PC7 according to the present embodiment. FIG. 26A illustrates a length PCL7 of the hybrid recording mode postcode (or postcode) PC7.

In the example illustrated in FIG. 26A, the hybrid recording mode postcode PC7 includes the conventional recording mode postcode PC2 and the shingled recording mode postcode PC5. In the hybrid recording mode postcode PC7, the shingled recording mode postcode PC5 is adjacent to the conventional recording mode postcode PC2 in the traveling direction. In the hybrid recording mode postcode PC7, the conventional recording mode postcode PC2 and the shingled recording mode postcode PC5 may be arranged with a gap provided in between in the circumferential direction. The hybrid recording mode postcode PC7 for the hybrid recording mode includes a postcode preamble, a postcode sync mark, postcode data 2, a postcode preamble, a postcode sync mark, and postcode data 5. In the example illustrated in FIG. 26A, in the hybrid recording mode postcode PC7, the postcode preamble, the postcode sync mark, the postcode data 2, the postcode preamble, the postcode sync mark, and the postcode data 5 are continuously arranged in the traveling direction, in this described order. The hybrid recording mode postcode PC7 is a postcode arranged in a servo sector used for write processing on a shingled recording region and used for the short servo processing. The data length of the hybrid recording mode postcode data 7 is, for example, 87 bits. The data length of the hybrid recording mode postcode data 7 corresponds to the sum of the data length of the conventional recording mode postcode PC2 and the data length of the shingled recording mode postcode PC5. The length PCL7 of the hybrid recording mode postcode data 7 corresponds to, for example, the sum of the length PCL2 of the conventional recording mode postcode PC2 and the length PCL5 of the shingled recording mode postcode PC5. The length PCL7 of the hybrid recording mode postcode data 7 is six times as long as the length PCL1 of the conventional recording mode postcode PC1, for example.

For example, the servo pattern management unit 620 sets a particular region to be the hybrid recording region, and writes the hybrid recording mode postcode PC7 in a normal servo sector in this region. For example, the servo pattern management unit 620 sets a particular region of the disk 10 to be the hybrid recording region, and writes the hybrid recording mode postcode PC7 in the normal servo sectors SVS3 and SVS7, as the postcodes X3 and X7, in particular region of the disk 10.

FIG. 26B is a schematic diagram illustrating an example of the arrangement of the hybrid recording mode postcode PC7 illustrated in FIG. 26A. In FIG. 26B, the servo regions SV4$k$ and SV4$k$+2 correspond to normal servo regions. In FIG. 26B, the servo regions SV4$k$+1 and SV4$k$+3 correspond to short servo regions. The servo regions SV4$k$ and SV4$k$+2 include the postcode PC7. The tracks TR2$k$ to TR2$k$+3 of the servo region SV4$k$ have the postcode PC2. The tracks TR2$k$ and TR2$k$+2 of the servo region SV4$k$ have the postcode PC5. The tracks TR2$k$ to TR2$k$+3 of the servo region SV4$k$+2 have the postcode PC2. The tracks TR2$k$ and TR2$k$+2 of the servo region SV4$k$+2 have the postcode PC5. The servo regions SV4$k$+1 and SV4$k$+3 do not include a postcode.

In the example illustrated in FIG. 26B, the servo pattern management unit 620 writes the postcode PC2 in the servo regions SV4$k$ and SV4$k$+2 of the tracks TR2$k$ to TR2$k$+3, in the hybrid recording region of the disk 10. The servo pattern management unit 620 writes the postcode PC5 in the servo regions SV4$k$ and SV4$k$+2 of the track TR2$k$ and the track $k$+2 in the hybrid recording region of the disk 10.

In the example illustrated in FIG. 26B, the servo pattern management unit 620 writes no postcode in the servo regions SV4$k$+1 and SV4$k$+3 of the tracks TR2$k$ to TR2$k$+3, in the hybrid recording region of the disk 10.

In the examples illustrated in FIGS. 20A to 26B, the servo pattern management unit 620 writes the postcode PC1 in the servo region SV of the zone servo boundary ZB with the zone servo boundary ZB set to be the conventional recording region, and writes the postcode PC2 in the servo region SV other than the zone servo boundary ZB of the disk 10 with the region other than the zone servo boundary ZB of the disk 10 set to be the conventional recording region. Thus, the zone servo gap can be made smaller than that in a case where the postcode PC2 is written to the servo region SV of the entire surface of the disk 10 with the entire surface of the disk 10 set to be the conventional recording region, whereby the format efficiency of the disk 10 can be improved.

In the examples illustrated in FIGS. 20A to 26B, the servo pattern management unit 620 writes the postcode PC1 or the postcode PC2 in the servo region SV of the zone servo boundary ZB with the zone servo boundary ZB set to be the conventional recording region, and writes the additional pattern and the postcode PC3 in the servo region SV other than the zone servo boundary ZB of the disk 10 with the region other than the zone servo boundary ZB of the disk 10 also set to be the conventional recording region. Thus, the zone servo gap can be made smaller than that in a case where the additional pattern and the postcode PC3 are written to the servo region SV of the entire surface of the disk 10 with the entire surface of the disk 10 set to be the conventional recording region, whereby the format efficiency of the disk 10 can be improved.

In the examples illustrated in FIGS. 20A to 26B, the servo pattern management unit 620 writes the postcode PC1, the postcode PC2, or the postcode PC4 in the servo region SV of the zone servo boundary ZB with the zone servo boundary ZB set to be the conventional recording region or the shingled recording region, and writes the postcode PC5 in the servo region SV other than the zone servo boundary ZB of the disk 10 with the region other than the zone servo boundary ZB of the disk 10 also set to be the shingled recording region. Thus, the zone servo gap can be made smaller than that in a case where the postcode PC5 is written to the servo region SV of the entire surface of the disk 10 with the entire surface of the disk 10 set to be the conventional recording region, whereby the format efficiency of the disk 10 can be improved.

In the examples illustrated in FIGS. 20A to 26B, the servo pattern management unit 620 sets the zone servo boundary ZB as the conventional recording region, the shingled recording region, or the hybrid recording region, writes the postcode PC1, the postcode PC2, the postcode PC4, or the postcode PC6 in the servo region SV of the zone servo boundary ZB, sets the region other than the zone servo boundary ZB of the disk 10 as the shingled recording region, and writes the postcode PC7 in the servo region SV other than the zone servo boundary ZB of the disk 10, so that the zone servo gap can be made smaller than when the entire surface of the disk 10 is set as the shingled recording region and the postcode PC7 is written to the servo region SV of the entire surface of the disk 10, and thus the format efficiency of the disk 10 can be improved.

In the examples illustrated in FIGS. 20A to 26B, the servo pattern management unit 620 writes the conventional recording mode postcode or the shingled recording mode postcode in the servo region SV of the zone servo boundary ZB with the zone servo boundary ZB set to be the conventional recording region or the shingled recording region, and writes the conventional recording mode postcode, the shingled recording mode postcode, or the hybrid recording mode postcode in the servo region SV of the region of the disk 10 other than the zone servo boundary ZB with the region of the disk 10 other than the zone servo boundary ZB set to be the conventional recording region, the shingled recording region, or the hybrid recording region.

In the examples illustrated in FIGS. 20A to 26B, when accessing a region other than the region using the forward zone servo sector in the conventional recording region, the servo pattern management unit 620 reads the postcode in the even-numbered servo region SV since the postcode is written to the even-numbered servo region SV. When accessing a region using the forward zone servo sector in the conventional recording region, the servo pattern management unit 620 reads the postcode in all the servo regions SV of the disk 10 since the postcode is written to all the servo regions SV of the disk 10.

In the examples illustrated in FIGS. 20A to 26B, when accessing a region other than the region using the forward zone servo sector in the shingled recording region, the servo pattern management unit 620 reads the postcode in the servo region SV4$k$+2 since the postcode is written to the servo region SV4$k$+2 in the odd-numbered track, and reads the postcode in the servo region SV4$k$ since the postcode is written to the servo region SV4$k$ in the even-numbered track. When accessing the region using the forward zone servo sector in the shingled recording region, the servo pattern management unit 620 reads the postcode in an odd-numbered servo region SV since the postcode is written to the odd-numbered servo region SV in the odd-numbered track, and reads the postcode in the even-numbered servo region SV since the postcode is written to the even-numbered servo region SV in the even-numbered track.

In the examples illustrated in FIGS. 20A to 26B, when accessing a region other than the region using the forward zone servo sector in the hybrid recording region, the servo pattern management unit 620 determines whether this region is the conventional recording region or the shingled recording region, reads the postcode PC2 when the region is the conventional recording region, and reads the postcode PC5 when the region is the shingled recording region. When accessing the region using the forward zone servo sector in the hybrid recording region, the servo pattern management unit 620 determines whether this region is the conventional recording region or the shingled recording region, reads the postcode PC1 when the region is the conventional recording region, and reads the postcode PC4 when the region is the shingled recording region.

The servo pattern management unit 620 may record the postcode format set in each region of the disk 10, in a particular recording region such as, for example, the system area 10$c$ of the disk 10, the nonvolatile memory 80, or the like. Note that the servo pattern management unit 620 may define the postcode format set in each region of the disk 10 in advance as a fixed value in firmware.

FIG. 27 is a schematic diagram illustrating an example of a change in format loss in the radial direction of the disk 10. In FIG. 27, the magnetic disk device 1 has two zone servo boundaries ZB in the radial direction of the disk 10. In FIG. 27, the horizontal axis represents a radial position, and the vertical axis represents format loss M. In the vertical axis of FIG. 27, the format loss increases toward the direction of the tip of the arrow indicating large and decreases toward the direction of the tip of the arrow indicating small. In the horizontal axis of FIG. 27, a point closer to the tip of the arrow indicating outward indicates a radial position more on the outer side, and a point closer to the tip of the arrow indicating inward indicates a radial position more on the inner side. FIG. 27 illustrates a change FLL1 in format loss relative to a radial position.

In the example illustrated in FIG. 27, the zone servo boundary ZB (for example, a zone data pattern) has a larger format loss than other regions due to the length of the zone servo gap and the like. That is, the zone servo boundary ZB has lower format efficiency than other regions.

In the example illustrated in FIG. 27, at the time of SSW, the servo pattern management unit 620 uniquely determines the zone servo boundary ZB from the servo pattern and the zone division design, and selects and writes a postcode that shortens the zone servo gap in the servo region SV of the zone servo boundary ZB to improve the format efficiency of the two zone servo boundaries ZB. Such a postcode is, for example, a postcode having a length shorter than the length of the postcode in the area other than the zone servo boundary ZB or the forward zone servo sector.

FIG. 28 is a schematic diagram illustrating an example of a change in format loss in the radial direction of the disk 10. In FIG. 28, the magnetic disk device 1 has six zone servo boundaries ZB in the radial direction of the disk 10. In FIG. 28, the horizontal axis represents a radial position, and the vertical axis represents format loss [%]. In the vertical axis of FIG. 28, the format loss increases toward the direction of the tip of the arrow indicating large and decreases toward the direction of the tip of the arrow indicating small. In the horizontal axis of FIG. 28, a point closer to the tip of the arrow indicating outward indicates a radial position more on the outer side, and a point closer to the tip of the arrow indicating inward indicates a radial position more on the inner side. FIG. 28 illustrates a change FLL2 in format loss relative to a radial position.

In the example illustrated in FIG. 28, the zone servo boundary ZB (for example, a zone data pattern) has a larger format loss than other regions due to the length of the zone servo gap and the like. That is, the zone servo boundary ZB has lower format efficiency than other regions.

At the time of SSW, the servo pattern management unit 620 uniquely determines the zone servo boundary ZB from the servo pattern and the zone division design, and selects and writes a postcode that shortens the zone servo gap in the servo region SV of the zone servo boundary ZB to improve the format efficiency of the five zone servo boundaries ZB. Such a postcode is, for example, a postcode having a length shorter than the length of the postcode in the area other than the zone servo boundary ZB or the forward zone servo sector.

FIG. 29 is a flowchart illustrating an example of a method of write processing of a postcode according to the present embodiment.

When writing a postcode, the system controller 130 determines whether the current zone servo sector is the forward zone servo sector or not (B2901). Upon determining that the current zone servo sector is not the forward zone servo sector (No in B2901), the system controller 130 selects a first postcode (B2902), writes the selected postcode in a particular region of the disk 10 (B2904), and terminates the processing. The first postcode includes, for example, the postcode PC2, the postcode PC3, the postcode PC5, and the postcode PC7. Upon determining that the current zone servo sector is the forward zone servo sector (Yes in B2901), the system controller 130 selects a second postcode smaller than the first postcode (B2903), writes the selected postcode in the zone servo boundary ZB (B2904), and terminates the processing. The second postcode includes the postcode PC1, the postcode PC2, the postcode PC3, the postcode PC4, the postcode PC5, and the postcode PC6.

FIG. 30 is a flowchart illustrating an example of a method for read processing of a postcode according to the present embodiment.

When reading a postcode, the system controller 130 determines whether the current zone servo sector is the forward zone servo sector or not (B3001). Upon determining that the current zone servo sector is not the forward zone servo sector (No in B3001), the system controller 130 selects a first postcode (B3002), reads the selected postcode (B3004), and terminates the processing. The first postcode includes, for example, the postcode PC2, the postcode PC3, the postcode PC5, and the postcode PC7. Upon determining that the current zone servo sector is the forward zone servo sector (Yes in B3001), the system controller 130 selects a second postcode (B3003), reads the selected postcode (B3004), and terminates the processing. The second postcode includes, for example, the postcode PC1, the postcode PC2, the postcode PC3, the postcode PC4, the postcode PC5, and the postcode PC6.

According to the present embodiment, the magnetic disk device 1 sets a write mode improving format efficiency of a particular region, and writes, in this region, a postcode improving format efficiency of this region, among a plurality of postcodes corresponding to the set write mode. In a case where the magnetic disk device 1 uses the forward zone servo sector of the zone servo boundary, the magnetic disk device 1 can shorten the zone servo gap during SSW and can improve format efficiency, by selecting a postcode format having a length shorter than that of postcodes of other regions. Thus, the magnetic disk device 1 can improve format efficiency.

Next, a magnetic disk device according to another embodiment of the first embodiment will be described. In another embodiment according to the first embodiment, the same parts as those of the first embodiment described above are denoted by the same reference numerals, and the detailed description thereof will be omitted.

Second Embodiment

The magnetic disk device 1 according to a second embodiment is different from the magnetic disk device 1 according to the first embodiment described above in the configuration of the servo region SV of the disk 10.

FIG. 31 is a schematic diagram illustrating an example of arrangement of servo regions SV of the disk 10 according to the second embodiment.

For example, the plurality of servo regions SV may extend linearly from the inner circumference to the outer circumference and may be discretely arranged at a particular interval in the circumferential direction. For example, the plurality of servo regions SV may extend spirally from the inner circumference to the outer circumference and may be discretely arranged at a particular interval in the circumferential direction.

For example, the plurality of servo regions SV may include the normal servo regions only. For example, the plurality of servo regions SV may include a normal servo region and a short servo region. For example, an odd-numbered servo region SV among the plurality of servo regions SV may be a normal servo region, and an even-numbered servo region SV among the plurality of servo regions SV may be a short servo region. An even-numbered servo region SV among the plurality of servo regions SV may be a normal servo region, and an odd-numbered servo region SV among the plurality of servo regions SV may be a short servo region.

The system controller 130 selects and writes a postcode (postcode format) of each region of the disk 10, based on TPI (or track pitch) of each region of the disk 10. For example, when the entire surface of the disk 10 is set to be the shingled recording region (conventional recording region or hybrid recording region), the system controller 130 selects a postcode with a length shorter than that of a particular postcode, and writes the postcode to the media cache 10b or the system area 10c with a TPI (wider Track Pitch) lower than a threshold of a particular TPI, that is, with low format efficiency. For example, when the entire surface of the disk 10 is set to be the shingled recording region (conventional recording region or hybrid recording region), the system controller 130 selects a postcode with a length shorter than the length of the postcode written to the servo region SV of the user data region 10a, to the media cache 10b or the system area 10c with a TPI (wider Track Pitch) lower than the user data region 10a, that is, with lower format efficiency (smaller data capacity or a smaller number of data sectors). For example, when the user data region 10a of the disk 10 is set to be the shingled recording region and the media cache 10b and the system area 10c are sets to be the conventional recording region, the system controller 130 selects a postcode with a length shorter than that of a particular postcode, and writes the postcode to the media cache 10b or the system area 10c with a TPI (narrower Track Pitch) lower than a threshold of a particular TPI, that is, with low format efficiency. In a region where the TPI is low, it is not necessary to arrange the postcodes in a zigzag form in order to secure the read offset margin of the postcodes. For example, when the entire surface of the disk 10 is set to be the shingled recording region, the system controller 130 selects the postcode PC4 instead of the postcode PC5 in the region where the TPI is low (the region where the track pitch is narrow) and writes the postcode PC4 in this region. In this case, the length of the postcode can be made short, and the format efficiency of this region can be improved. If the format efficiency of the media cache region is improved, the data capacity of the HDD can be increased with such a region reallocated to the user data region. Note that, although the media cache is described as an example in the above description, the same applies to the user data region as long as the region has a low TPI (data zone).

FIG. 32 is a flowchart illustrating an example of a method of write processing of a postcode according to the second embodiment.

When writing the postcode, the system controller 130 determines whether the TPI of the particular region is smaller than the particular threshold or equal to or larger than the particular threshold (B3201). Upon determining that the TPI of the particular region is equal to or larger than the particular threshold (No in B3201), the system controller 130 selects the first postcode (B3202), writes the selected postcode in the particular region of the disk 10 (B3204), and terminates the processing. The first postcode includes, for example, the postcode PC5. Upon determining that the TPI of the particular region is smaller than the particular threshold (Yes in B3201), the system controller 130 selects a second postcode smaller than the first postcode (B3203), writes the selected postcode in the zone servo boundary ZB (B3204), and terminates the processing. The second postcode includes the postcode PC4.

FIG. 33 is a flowchart illustrating an example of a method for read processing of a postcode according to the second embodiment.

When writing the postcode, the system controller 130 determines whether the TPI of the particular region is smaller than the particular threshold or equal to or larger than the particular threshold (B3301). Upon determining that the TPI of the particular region is equal to or larger than the particular threshold (No in B3301), the system controller 130 selects the first postcode (B3302), reads the selected postcode in the particular region of the disk 10 (B3304), and terminates the processing. The first postcode includes, for example, the postcode PC5. Upon determining that the TPI of the particular region is smaller than the particular threshold (Yes in B3301), the system controller 130 selects a second postcode smaller than the first postcode (B3303), writes the selected postcode in the zone servo boundary ZB (B3304), and terminates the processing. The second postcode includes the postcode PC4.

According to the second embodiment, the magnetic disk device 1 selects and writes a postcode (format) of each region of the disk 10, based on TPI (or track pitch) of each region of the disk 10. For example, when the entire surface of the disk 10 is set to be the shingled recording region (conventional recording region or hybrid recording region), the magnetic disk device 1 selects a postcode with a length shorter than that of a particular postcode, and writes the postcode to the media cache 10b or the system area 10c with a TPI (wider Track Pitch) lower than a threshold of a particular TPI. Thus, the magnetic disk device 1 can improve format efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk including a first region with a first format efficiency and a second region with a second
format efficiency lower than the first format efficiency;
a head that writes data to the disk and reads data from the disk; and
a controller that selects a first postcode to be written to the first region from a plurality of postcodes with different lengths and writes the first postcode to the first region, and selects a second postcode to be written to the second region from a plurality of postcodes with different lengths and writes the second postcode to the second region.

2. The magnetic disk device according to claim 1, wherein the controller selects the second postcode having a second length shorter than a first length of the first postcode and writes the second postcode to the second region.

3. The magnetic disk device according to claim 2, wherein in the second region, a first servo sector in a first servo region including servo data extending in a radial direction of the disk, a gap, and a second servo sector in a second servo region including servo data extending in the radial direction are arranged in this order in a first direction of a circumferential direction of the disk.

4. The magnetic disk device according to claim 3, wherein the controller writes the second postcode having the second length to the first servo sector in the first servo region in the second region.

5. The magnetic disk device according to claim 4, wherein the controller determines a length of the gap based on the second length of the second postcode.

6. The magnetic disk device according to claim 5, wherein the controller writes a third postcode having a third length equal to the first length of the first postcode to the second servo sector in the second servo region in the second region.

7. The magnetic disk device according to claim 3, wherein the controller writes data under a conventional recording mode in which writing is performed at an interval in the radial direction to the second region.

8. The magnetic disk device according to claim 3, wherein the controller writes data under a shingled recording mode in which writing is performed on a plurality of tracks in an overlapping manner in the radial direction to the second region.

9. The magnetic disk device according to claim 3, wherein the controller writes data under a recording mode selected from a conventional recording mode in which writing is performed at an interval in the radial direction to the first region and a shingled recording mode in which writing is performed on a plurality of tracks in an overlapping manner in the radial direction to the second region.

10. The magnetic disk device according to claim 2, wherein the second region is a system area that is disposed in an outward direction of the radial direction of the disk in the first region in the disk and in which information necessary for system management is written, or a media cache that temporarily holds data before the data is written to the first region.

11. The magnetic disk device according to claim 10, wherein the controller writes data under a shingled recording mode in which writing is performed on a plurality of tracks in an overlapping manner in the radial direction to the first region.

12. A magnetic disk device comprising:
a disk including a first region with a first format efficiency and a second region with a second format efficiency lower than the first format efficiency, wherein
the first region includes a first postcode, and
the second region includes a second postcode that improves format efficiency more than the first postcode,
wherein a second length of the second postcode is shorter than a first length of the first postcode.

13. A method of write processing of a postcode applied to a magnetic disk device comprising a disk including a first region with a first format efficiency and a second region with a second format efficiency lower than the first format efficiency, and a head that writes data to the disk and reads data from the disk, the method comprising:
selecting a first postcode to be written to the first region from a plurality of postcodes with different lengths and writing the first postcode to the first region, and
selecting a second postcode to be written to the second region from a plurality of postcodes with different lengths and writing the second postcode to the second region.

14. The method of write processing according to claim 13, further comprising:
selecting the second postcode having a second length shorter than a first length of the first postcode; and
writing the second postcode to the second region.

15. The method of write processing according to claim 14, wherein in the second region, a first servo sector in a first servo region including servo data extending in a radial direction of the disk, a gap, and a second servo sector in a second servo region including servo data extending in the radial direction are arranged in this order in a first direction of a circumferential direction of the disk.

16. The method of write processing according to claim 15, further comprising:
writing the second postcode having the second length to the first servo sector in the first servo region in the second region.

17. The method of write processing according to claim 16, further comprising:
determining a length of the gap based on the second length of the second postcode.

18. The method of write processing according to claim 17, further comprising:
writing a third postcode having a third length equal to the first length of the first postcode to the second servo sector in the second servo region in the second region.

19. The method of write processing according to claim 15, further comprising:
writing data under a conventional recording mode in which writing is performed at an interval in the radial direction to the second region.

* * * * *